United States Patent
Tokusho et al.

(10) Patent No.: US 9,201,779 B2
(45) Date of Patent: Dec. 1, 2015

(54) MANAGEMENT SYSTEM AND MANAGEMENT METHOD

(75) Inventors: Yoshitaka Tokusho, Yokohama (JP); Yuuki Miyamoto, Yokohama (JP)

(73) Assignee: HITACHI, LTD., Tokyo (JP)

(*) Notice: Subject to any disclaimer, the term of this patent is extended or adjusted under 35 U.S.C. 154(b) by 550 days.

(21) Appl. No.: 13/639,162

(22) PCT Filed: Jun. 27, 2012

(86) PCT No.: PCT/JP2012/066371
§ 371 (c)(1),
(2), (4) Date: Oct. 3, 2012

(87) PCT Pub. No.: WO2014/002213
PCT Pub. Date: Jan. 3, 2014

(65) Prior Publication Data
US 2014/0006740 A1    Jan. 2, 2014

(51) Int. Cl.
*G06F 12/00* (2006.01)
*G06F 12/02* (2006.01)
*G06F 3/06* (2006.01)

(52) U.S. Cl.
CPC .............. *G06F 12/02* (2013.01); *G06F 3/0608* (2013.01); *G06F 3/0647* (2013.01); *G06F 3/0683* (2013.01)

(58) Field of Classification Search
CPC ................................ G06F 3/0647; G06F 12/02
See application file for complete search history.

(56) References Cited

U.S. PATENT DOCUMENTS

| | | |
|---|---|---|
| 2007/0055713 A1 | 3/2007 | Nagai et al. |
| 2008/0177947 A1 | 7/2008 | Eguchi et al. |
| 2011/0060885 A1 | 3/2011 | Satoyama et al. |
| 2011/0192269 A1 | 8/2011 | Voorhees et al. |

FOREIGN PATENT DOCUMENTS

WO    2010/122674 A1    10/2010

*Primary Examiner* — Reginald Bragdon
*Assistant Examiner* — Mehdi Namazi
(74) *Attorney, Agent, or Firm* — Mattingly & Malur, PC

(57) ABSTRACT

A management system manages a computer system having multiple storage apparatuses, which provide a virtual volume to a host. The computer system includes a pool, and the storage apparatus allocates a physical page in the pool to a write destination when writing to the virtual volume. The management system stores logical volume management information for managing a corresponding relationship between a storage apparatus in which a logical volume resides and a physical page forming the logical volume, and virtual volume management information for managing the corresponding relationship between a virtual segment in a virtual volume and a page allocated to the virtual segment, and based on the logical volume management information and the virtual volume management information identifies a first page migration, which is affected in a case where either a determination-target storage apparatus is stopped or a first storage area is blocked, and displays the first page migration information.

15 Claims, 29 Drawing Sheets

| ST-side RAID group management information ||||
| 2221 | 2222 | 2223 | 2224 |
| RAID group ID | Device type | RAID level | PDEV-ID |
| RG1 | SSD | RAID5(3D+1P) | PDEV1 |
| | | | PDEV2 |
| | | | PDEV3 |
| | | | PDEV4 |
| RG2 | FC | RAID5(3D+1P) | PDEV5 |
| | | | PDEV6 |
| | | | PDEV7 |
| | | | PDEV8 |
| RG3 | SATA | RAID0 | PDEV9 |
| | | | PDEV10 |
| ... | ... | ... | ... |

ST-side physical page management information

| RAID group ID | Physical page ID | RAID group LBA range | Allocation status |
|---|---|---|---|
| RG1 | SEG1 | 0-999 | Allocated |
| | SEG2 | 1000-1999 | Allocated |
| | SEG3 | 2000-2999 | Allocated |
| RG2 | SEG4 | 0-999 | Allocated |
| | SEG5 | 1000-1999 | Unallocated |
| RG3 | SEG6 | 0-999 | Allocated |
| | SEG7 | 1000-1999 | Unallocated |
| ... | ... | ... | ... |

ST-side logical volume management information

| LVOL-ID | Real segment ID | External storage apparatus ID | Mapping-source LVOL-ID | Mapping-source physical page ID |
|---|---|---|---|---|
| LVOL1 | SEG1 | n/a | n/a | n/a |
| | SEG2 | | | |
| | SEG3 | | | |
| EVOL2 | ESEG1 | ST2 | LVOL2 | SEG1 |
| EVOL3 | ESEG2 | ST3 | LVOL3 | SEG2 |
| ... | ... | ... | ... | ... |

ST-side virtual volume management information

| VVOL-ID | Virtual segment ID | VVOL LBA range | Segment ID | Number of accesses | Monitoring period | Reallocation destination determination result |
|---|---|---|---|---|---|---|
| VVOL1 | VSEG1 | 0-999 | SEG1 | 28800 | 0:00—23:59 | Tier1 |
| | VSEG2 | 1000-1999 | ESEG1 | 68400 | 0:00—23:59 | Tier2 |
| | VSEG3 | 2000-2999 | ESEG2 | 12960 | 0:00—23:59 | Tier3 |
| VVOL2 | VSEG4 | 0-999 | SEG2 | 111600 | 0:00—23:59 | Tier2 |
| VVOL3 | VSEG5 | 0-999 | SEG3 | 158400 | 0:00—23:59 | Tier3 |
| ... | ... | ... | ... | ... | ... | ... |

Column IDs: 2251, 2252, 2253, 2254, 2255, 2256, 2257

ST-side pool management information

| Pool-ID | Pool configuration LVOL-ID | Storage apparatus | Inter-tier page migration | Migration cycle | Monitoring time period |
|---|---|---|---|---|---|
| P1 | LVOL1 | ST1 | ON | 1Day | 00:00—23:59 |
| | EVOL2 | ST2 | | | |
| | EVOL3 | ST3 | | | |
| P2 | LVOL2 | ST1 | OFF | n/a | n/a |
| ... | ... | ... | ... | ... | ... |

Column IDs: 2261, 2262, 2263, 2264, 2265, 2266

| Management-side RAID group management information |||| 
|---|---|---|---|
| 1251 | 1252 | 1253 | 1254 |
| RAID group ID | Storage apparatus ID | Device type | RAID level |
| RG1 | ST1 | SSD | RAID5(3D+1P) |
| RG2 | | FC | RAID5(3D+1P) |
| RG3 | | SATA | RAID0 |
| RG1 | ST2 | SATA | RAID5(4D+1P) |
| ... | ... | ... | ... |

Fig. 11

Management-side virtual volume management information

| VVOL-ID | Storage apparatus ID | Virtual segment ID | VVOL LBA range | Real segment ID | IOPS | Reallocation destination determination result |
|---|---|---|---|---|---|---|
| VVOL1 | ST1 | VSEG1 | 0-999 | SEG1 | 8 | Tier1 |
| | | VSEG2 | 1000-1999 | ESEG1 | 19 | Tier2 |
| | | VSEG3 | 2000-2999 | ESEG2 | 3.6 | Tier3 |
| VVOL2 | | VSEG4 | 0-999 | SEG2 | 31 | Tier2 |
| VVOL3 | | VSEG5 | 0-999 | SEG3 | 44 | Tier3 |
| VVOL4 | ST4 | VSEG5 | 0-999 | SEG1 | 30 | Tier2 |
| ... | ... | ... | ... | ... | ... | ... |

Tier management information

| Storage apparatus ID (1241) | Tier ID (1242) | Performance condition (1243) | Allocation condition (IOPS) (1244) |
|---|---|---|---|
| ST1 | Tier1 | Device type = SSD, RAID level = RAID5 | Equal to or larger than 100 |
| | Tier2 | Device type = FC, RAID level = RAID5 | Equal to or larger than 30 but less than 100 |
| | Tier3 | Device type = SATA, external volume | Less than 30 |
| ST4 | ... | ... | ... |

Host management information

| Host (1201) | Allocated volume (1202) | Storage apparatus (1203) |
|---|---|---|
| Host 1 | VVOL1 | ST1 |
| Host 2 | ... | ... |
| Host 3 | ... | ... |

User-specified migration task management information

| Task ID | Migration -source volume | Migration-source storage apparatus | Migration -destination volume | Migration -destination storage apparatus | Sub-task status | Task status | Execution start date/time | Execution complete date/time |
|---|---|---|---|---|---|---|---|---|
| VM1 | LVOL1 | ST1 | LVOL10 | ST2 | Normal completion | Executing | 2012/1/4 10:00 | ... |
|  | LVOL2 |  | LVOL11 |  | Executing |  |  |  |
|  | LVOL3 |  | LVOL12 |  | Waiting |  |  |  |
| VM2 | EVOL | ST1 | LVOL4 | ST1 | Waiting | Waiting | 2012/2/1 00:30 | ... |
| ... | ... | ... | ... | ... | ... | ... | ... | ... |

User-specified migration execution history information

| Storage apparatus ID | Total value of execution time periods | Total value of migration data amounts |
|---|---|---|
| ST1 | 10 hours 20 minutes 54 seconds | 842.45 GB |
| ST2 | ... | ... |
| ST3 | ... | ... |

MANAGEMENT SYSTEM AND MANAGEMENT METHOD

TECHNICAL FIELD

The present invention relates to a management system for managing a computer system comprising a storage apparatus, and a management method therefor.

BACKGROUND ART

As a technology related to a storage apparatus, an external storage connection technology for connecting an external storage apparatus to an internal storage apparatus, which receives a request from a host, and for providing a logical volume, which exists in the external storage apparatus, to the host via the internal storage apparatus is known (refer to Patent Literature 1). In the external storage connection technology, when an I/O (Input/Output) request with respect to a logical volume has been received from the host, the internal storage apparatus determines whether the access-target logical volume is a logical volume, which exists in the internal storage apparatus, or a logical volume, which exists in the external storage apparatus, and based on the result of the determination, assigns the I/O request to the storage apparatus in which the access-target logical volume exists.

Furthermore, as a technology related to a storage apparatus, a volume migration technology for migrating data in a migration-source logical volume to a migration-destination logical volume in a state in which an I/O request from a host application can be processed as-is known (refer to Patent Literature 1). In the volume migration technology, the data of the migration-source logical volume is copied to the migration-destination logical volume, and configuration control information is configured for the migration-destination logical volume. The migration-source logical volume and the migration-destination logical volume may be logical volumes in the same storage apparatus, or may be logical volumes in different storage apparatuses.

As another technology related to a storage apparatus, a storage virtualization technology for forming a hierarchical pool using multiple types of storage devices each having a different performance, and for allocating a real storage area (hereinafter referred to as either "physical page" or "page") registered in the hierarchical pool to a virtual volume in accordance with a write access from a host is known (refer to Patent Literature 2). In the storage virtualization technology, a virtual storage area in a virtual volume is partitioned into multiple partial areas (hereinafter referred to as "virtual segment"), and a determination is made as to the tier of the hierarchical pool from which a page is to be allocated for each virtual segment. The storage apparatus, for example, either regularly or irregularly revises the tier to which a page for allocation to a virtual segment belongs (page reallocation) based on the number of I/Os with respect to the virtual segment. For example, a page belonging to a high-performance tier formed using a high-performance storage device is allocated to a virtual segment having a large number of I/Os, and a page belonging to a low-performance tier formed using a low-performance storage device is allocated to a virtual segment having a small number of I/Os.

In addition, a technology, which combines the external storage connection technology and the storage virtualization technology, creates a virtual volume in a storage apparatus in which the external storage connection technology is being applied by using multiple types of storage devices each having a different performance to form a hierarchical pool, and revising the tier to which a page for allocation to the virtual segment belongs based on the number of I/Os to the virtual segment is known. In addition to a physical page of a storage device of an internal storage apparatus, a physical page of a storage device of an external storage apparatus can also be registered in a hierarchical pool of a storage apparatus in which the external storage connection technology is being applied.

CITATION LIST

Patent Literature

PTL 1

US Patent Application Publication No. 2008/0177947

PTL 2

US Patent Application Publication No. 2007/0055713

SUMMARY OF INVENTION

Technical Problem

In a storage apparatus in which the external storage connection technology and the storage virtualization technology are being applied, it may be desirable to stop an external storage apparatus in a state in which an I/O request from a host application is able to be processed as-is for the purpose of performing maintenance on a new version of firmware or the like. Before stopping the external storage apparatus at this time, it is necessary to suspend regular page reallocation processing performed in the hierarchical pool (hereinafter referred to simply as "reallocation process" or "inter-tier page migration"). As a process for suspending an inter-tier page migration, for example, a process in which a storage apparatus-provided Stop Migration command is executed is known.

However, in the process for suspending an inter-tier page migration on the basis of the Stop Migration command, there are cases in which the physical page in the stop-target storage device is allocated as-is to the virtual segment to be accessed by the host at the point in time when the inter-tier page migration is suspended. For this reason, after suspending the inter-tier page migration, the administrator must identify the virtual segment to which the segment in the stop-target storage device is allocated as-is from among the virtual segments accessed from the host, and change the physical page allocated to the identified virtual segment to a physical page in the storage device, which is not a stop target. This work takes a lot of time, and puts a burden on the administrator.

As a separate case, in a storage apparatus to which the external storage connection technology and the storage virtualization technology are applied, there are cases where a physical malfunction or other such failure occurs in either hardware for controlling a portion of a storage device comprising a hierarchical pool (for example, a physical drive, disk processor or the like), or hardware for controlling access to a storage device (for example, a port controller). In a portion of the high-end storage apparatuses being used in a corporate enterprise system for which business continuity is a high requirement, the hardware in the storage apparatus may be duplexed. In accordance with this, even when a failure occurs in one piece of hardware, processing can be continued using the other piece of hardware. That is, even in a state in which a failure has occurred in a single piece of hardware, an I/O request from the host can continue to be processed, and, in addition, an inter-tier page migration in the hierarchical pool can be allowed to continue.

However, in the unlikely event that a failure occurs in the other same piece of hardware while a failure is occurring in the one piece of hardware, there is the danger that an I/O request from the host will not be able to continue to be processed. Thus, it is preferable to avoid using a storage area of a storage device controlled by hardware in which a failure has occurred until the storage apparatus recovers from the failure. Making it impossible for a storage area to be used by the host is called blocking the storage area.

Similar to a case in which the external storage apparatus is to be stopped, it is necessary to suspend an inter-tier page migration prior to blocking a storage area, but in the process for suspending the inter-tier page migration on the basis of the Stop Migration command, there are cases where the block-target storage area is allocated as-is to the virtual segment to be accessed by the host at the point in time when the inter-tier page migration has been suspended. For this reason, the administrator, after suspending the inter-tier page migration, must identify the virtual segment to which the block-target storage area has been allocated as-is from among the virtual segments to be accessed from the host, and change the physical page allocated to the identified virtual segment to a storage area, which is not a block target. This work takes a lot of time, and puts a burden on the administrator.

The above-described problems can occur in a volume-unit migration (volume migration) as well as in a page-unit migration performed in accordance with the inter-tier page migration. For example, when multiple volume migrations are implemented collectively, in a case where a volume migration, which has as the migration destination either a logical volume, which exists in a stop-target storage apparatus, or a logical volume comprising a block-target storage area, is included among the multiple volume migrations, when the collective implementation of the volume migrations is suspended part way through, data in a portion of the logical volumes may be migrated as-is to either the logical volume existing in a stop-target storage apparatus, or the logical volume comprising the block-target storage area. Thus, the administrator must identify the logical volume from which the data has been migrated to either the logical volume existing in the stop-target storage apparatus, or the logical volume comprising the block-target storage area, and migrate the data in the identified logical volume to either a logical volume, which exists in a storage apparatus not targeted for a stop, or a logical volume, which does not comprise a block-target storage area, placing a burden on the administrator.

Problems like those described above are not limited to the case of a hierarchized pool, which is configured using multiple physical pages of multiple logical volumes, and, in addition, in which physical pages are hierarchized in accordance with the performance of the segment, but rather can also occur in the case of a pool in which physical pages are not hierarchized. Specifically, in the case of a pool in which physical pages are not hierarchized, the revision of tiers allocated to virtual segments is not regularly or irregularly performed based on the number of I/Os as described above, and there are cases in which a bias occurs in the allocation of physical pages between multiple storage devices in multiple storage devices to which belong physical pages (pages), which comprise a pool and are allocated to virtual segments pursuant to an I/O request from a host application, and to solve for this bias, the storage apparatus may perform a page reallocation process (hereinafter "in-pool page migration") in the pool.

In a pool in which the physical pages are not hierarchized, similar problems can occur in a case where the storage apparatus is stopped or a storage area comprising a pool is blocked during implementation of the above-mentioned in-pool page migration.

Solution to Problem

A management system is a system for managing a computer system. The computer system comprises: multiple storage apparatuses, which, upon receiving a write request with respect to a virtual volume formed of multiple virtual segments, allocate the page to a write-destination virtual segment from a pool comprising multiple pages of multiple logical volumes and write write-target data to this page; and a host computer, which sends a data write request to a virtual volume.

The management system comprises a storage device, and a control device, which is coupled to the storage device.

The storage device stores logical volume management information and virtual volume management information. The logical volume management information is for managing a corresponding relationship between a storage apparatus in which a logical volume exists and a page comprising the logical volume with respect to a logical volume in the computer system. The virtual volume management information is for managing a corresponding relationship between a virtual segment in a virtual volume and a page allocated to the virtual segment with respect to the relevant virtual volume in the computer system.

The control device receives a selection of either a determination-target storage apparatus, which is regarded as a determination target from among multiple storage apparatuses, or a determination-target first storage area from a storage area, which comprises the page of the storage apparatus. The control device, based on the logical volume management information and the virtual volume management information, identifies from among either one or multiple page migrations, which is/are the migration of data between pages, a first page migration, which will be affected by either the determination-target storage apparatus being stopped or the first storage area being blocked, and displays information related to the first page migration.

Advantageous Effects of the Invention

The present invention makes it possible to alleviate the affects of either a storage apparatus being stopped or a storage area being blocked.

BRIEF DESCRIPTION OF DRAWINGS

FIG. 4 is a block diagram of an example of ST-side RAID group management information related to the example 1.

FIG. 5 is a block diagram of an example of ST-side physical page management information related to the example 1.

FIG. 6 is a block diagram of an example of ST-side logical volume management information related to the example 1.

FIG. 7 is a block diagram of an example of ST-side virtual volume management information related to the example 1.

FIG. 8 is a block diagram of an example of ST-side pool management information related to the example 1.

FIG. 10 is a block diagram of an example of management-side RAID group management information related to the example 1.

FIG. 11 is a block diagram of an example of management-side virtual volume management information related to the example 1.

FIG. 12 is a block diagram of an example of tier management information related to the example 1.

FIG. 13 is a block diagram of an example of host management information related to the example 1.

FIG. 14 is a block diagram of an example of user-specified migration task management information related to the example 1.

FIG. 15 is a block diagram of an example of user-specified migration execution historical information related to the example 1.

DESCRIPTION OF THE EMBODIMENT

Figure 1:
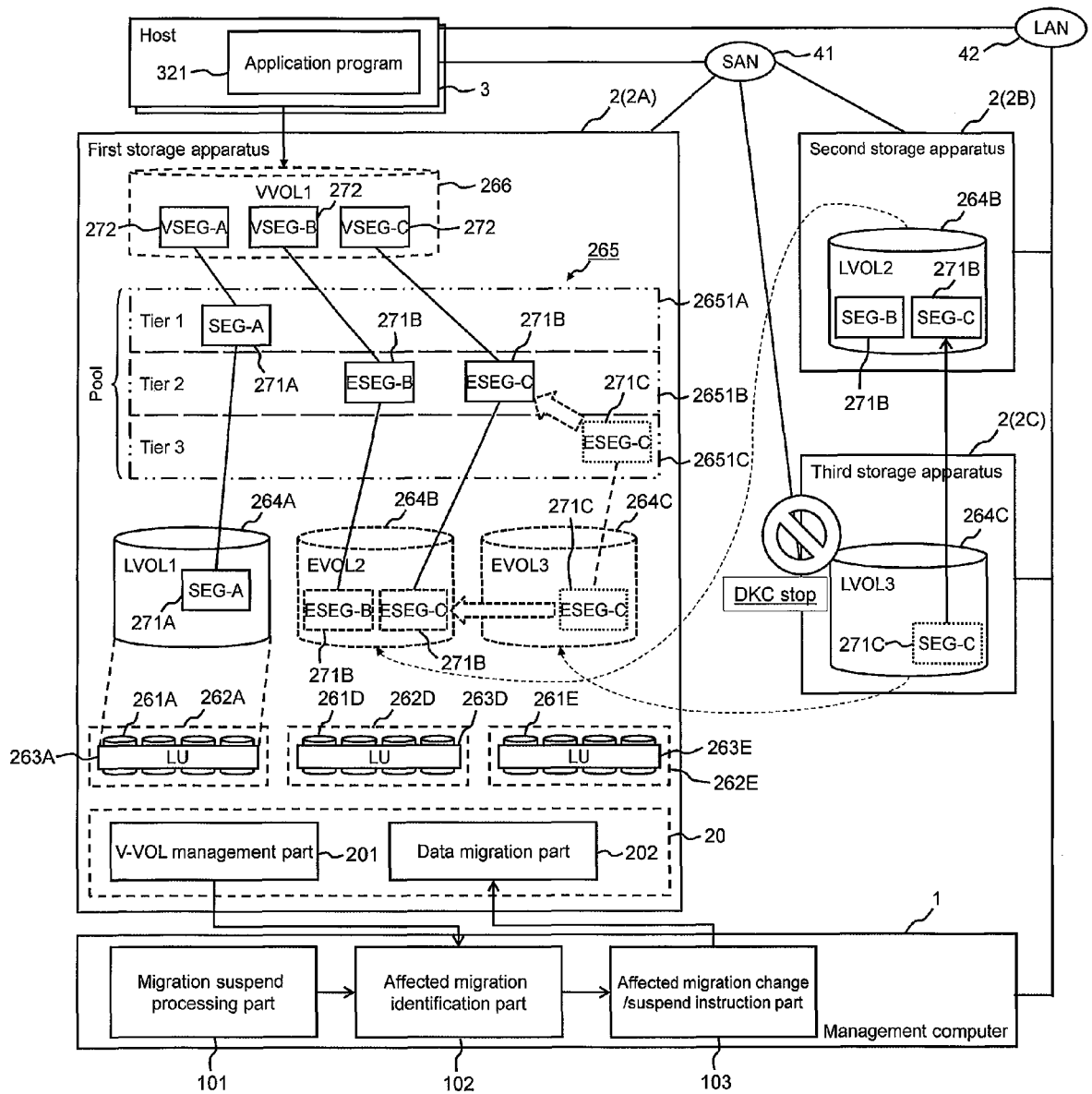
FIG. 1 is a block diagram of an example of a computer system related to an example 1.

Examples will be explained by referring to the drawings. The examples explained below do not limit the invention related to the claims, and not all of the various elements and combinations thereof explained in the examples are necessarily essential as means for solving the invention. In the drawings, the same reference sign throughout multiple drawings refers to the same component.

In the following explanation, a table is used as one example of information, but information may also be expressed using a data structure other than a table.

When explaining the content of the respective information, expressions such as "identification information", "identifier", "name", and "ID" are used, but these terms are interchangeable.

In the following explanation, there may be cases where an explanation is given using a "program" as the doer of the action, but since the stipulated processing is performed in accordance with a program being executed by a processor while using a memory and a communication port (a SAN port, or a LAN port), the explanation may also give the processor as the doer of the action. A process, which is disclosed as having the program as the doer of the action, may be regarded as a process performed by a computer (a management computer, a storage apparatus, or a host). Furthermore, either all or a portion of a program may be realized in accordance with dedicated hardware. Various types of programs may be installed in respective computers using a program distribution server or computer readable storage media.

Hereinbelow, a set of one or more computers, which manage the computer system and display information for display, will be called a management system. In a case where a management computer displays the information for display, the management computer is the management system. A combination of the management computer and a display computer is also a management system. Furthermore, similar processing to that of the management computer may be realized using multiple computers to increase the speed and enhance the reliability of management processing, and in this case the relevant multiple computers (to include a display computer in a case where a display computer performs a display) are the management system.

Example 1

FIG. 1 is a block diagram of an example of a computer system related to an example 1.

The computer system comprises a management computer 1, multiple (three in the drawing) storage apparatuses 2 (a first storage apparatus 2A, a second storage apparatus 2B, and a third storage apparatus 2C), one or more hosts 3, a SAN (Storage Area Network) 41, and a LAN (Local Area Network) 42. The multiple storage apparatuses 2 and the host 3 are coupled together via the SAN 41. The management computer 1, the multiple storage apparatuses 2, and the host 3 are coupled together via the LAN 42. The SAN 41 may be a FC (Fibre Channel)-based network, or may be an iSCSI (Internet Small Computer System Interface)-based network.

The management computer 1 manages the computer system. The management computer 1 comprises a migration suspend processing part 101, an affected migration identification part 102, and an affected migration change/suspend instruction part 103. The migration suspend processing part 101, the affected migration identification part 102, and the affected migration change/suspend instruction part 103 are functional parts built in accordance with a CPU 11, which will be explained further below, executing a migration suspend program 123.

The host 3 is a computer (a server), which executes a server program and so forth, and provides a prescribed service. The host 3 comprises an application program 321. The host 3 application program 321 accesses either a virtual volume (VVOL) 266 or a logical volume (LVOL) 264 (264A, 264B, 264C, and so forth) provided by the storage apparatus 2.

The storage apparatus 2 provides a storage area to the host 3. The storage apparatus 2 comprises a controller 20 for controlling the storage apparatus 2, and multiple storage devices 261 (storage devices 261A, 261D, 261E, and so forth) for storing and reading data. The storage apparatus 2 provides the host 3 with a storage area in the form of a logical volume 264 (logical volume 264A, logical volume 264B, and so forth). The logical volume 264 is created from an unused storage area of the storage device 261. The host 3 uses the storage area via the logical volume 264.

In this example, a first storage apparatus 2A is an internal storage apparatus, a second storage apparatus 2B and a third storage apparatus 2C are external storage apparatuses, which are externally coupled to the first storage apparatus 2A. The first storage apparatus 2A comprises a logical volume 264A (LVOL 1), the second storage apparatus 2B comprises a logical volume 264B (LVOL 2), and the third storage apparatus 2C comprises a logical volume 264C (LVOL 3). In this example, the external storage apparatuses do not comprise controllers 20, and the logical volumes 264B and 264C (hereinafter referred to as "external volumes") of the external storage apparatuses are provided to the host 3 via the first storage apparatus, which is the internal storage apparatus. In the drawing, the external volumes, for example, are written as "EVOL 2" and "EVOL 3". The "EVOL 2" corresponds to the "LVOL 2", which exists in the second storage apparatus 2B, and the "EVOL 3" corresponds to the "LVOL 3", which exists in the third storage apparatus 2C.

The first storage apparatus 2A also provides the host 3 with the virtual volume 266. Only the volume size and access method of the virtual volume 266 are defined; it does not comprise a physical page 271 (physical page 271A, physical page 271B, physical page 271C) for storing data. The virtual volume 266 is associated with a pool 265. Briefly explained, in a case where data is written from the host 3 to a virtual segment (VSEG) 272 inside the virtual volume 266, a physical page (SEG) 271 selected from the pool 265 is allocated to the virtual volume 266. Data from the host 3 is written to the physical page 271 allocated to the virtual segment 272. In the drawing, physical pages 271 included in the external volume, for example, are written as "ESEG-B" and "ESEG-C". The "ESEG-B" corresponds to the "SEG-B" included in "LVOL 2", and the "ESEG-C" corresponds to the "SEG-C" included in "LVOL 3".

In this example, the pool 265 is a hierarchical pool, and comprises multiple storage tiers 2651 (a first tier 2651A, a second tier 2651B, and a third tier 2651C) having different performance. The first tier 2651A (tier 1) is configured from multiple physical pages 271A of the highest performance storage device 261A. The first tier 2651A can also be called the high-level tier. The second tier 2651B (tier 2) is configured from multiple physical pages 271B of a medium-performance storage device 261B (not shown in the drawing). The second tier 2651B can also be called the mid-level tier. The third tier 2651C (tier 3) is configured from multiple physical pages 271C of a low-performance storage device 261C (not shown in the drawing). The third tier 2651C can also be called the low-level tier. Each physical page 271 belonging to the multiple storage tiers 2651 of the pool 265, for example, becomes usable in accordance with the logical volume 264 comprising the physical pages 271 corresponding to the respective tiers 2651 being registered in the pool 265. The pool 265 related to this example is configured from the logical volume 264A of the internal storage apparatus (hereinafter referred to as "internal volume") and the external volumes 265B and 264C. In the pool 265, an inter-tier page migration is implemented on a regular or irregular basis.

The embodiment will be explained premised on the pool of the storage apparatus being a hierarchical pool, but the method of the embodiment can be applied in the same way even in a case where the above-mentioned in-pool page migration is implemented in a pool, which is not hierarchized.

In a case where the host 3 writes data to an unallocated virtual segment 272 in the virtual volume 266, any of the tiers 2651 in the pool 265 is selected, and a physical page 271 belonging to the selected tier 2651 is allocated to the write-target virtual segment 272. Write data from the host 3 is written to the physical page 271, which has been allocated to the write-target virtual segment 272.

In the configuration of FIG. 1, for example, in a case where the third storage apparatus 2C, which is an external storage apparatus, is stopped for maintenance or the like, the host 3 is no longer able to access the physical page 271C inside the third storage apparatus 2C. Since the pool 265 of the first storage apparatus 2A comprises the physical page 271C, which has become inaccessible due to the stoppage of the third storage apparatus 2C, the management computer 1 suspends (invalidates) the inter-tier page migration involving the physical page 271C. This is because letting this inter-tier page migration remain valid as-is could result in the inaccessible physical page 271C being automatically allocated to a virtual segment 272. There are also cases in which the inaccessible physical page 271C is allocated to a virtual segment 272 at the point in time when the inter-tier page migration is stopped. To deal with this, the management computer 1 changes the physical page 271 allocated to the virtual segment 272 from the inaccessible physical page 271C to another physical page 271, which is accessible.

The external storage apparatuses (the second storage apparatus 2B and the third storage apparatus 2C) need not comprise controllers 20, or the external storage apparatuses may comprise controllers 20. In a case where the external storage apparatuses both comprise a controller 20, the host 3 is able to directly access both the second storage apparatus 2B and the third storage apparatus 2C. That is, the second storage apparatus 2B and the third storage apparatus 2C can also directly receive an I/O request with respect to their own storage apparatus 2 from the host 3, and the first storage apparatus 2A can receive an I/O request with respect to its own storage apparatus 2 via either the second storage apparatus 2B or the third storage apparatus 2C. In accordance with this, the processing explained hereinbelow can be performed the same way in a case where any of the first storage apparatus 2A, the second storage apparatus 2B, or the third storage apparatus 2C is stopped.

Figure 2:
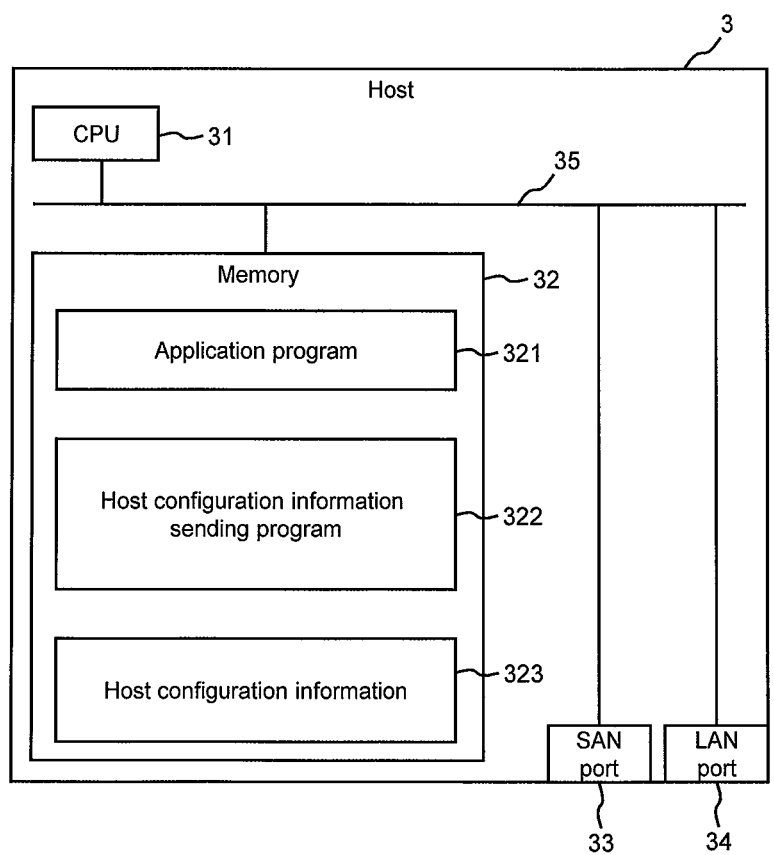
FIG. 2 is a block diagram of an example of a host related to the example 1.

FIG. 2 is a block diagram of an example of a host related to the example 1.

The host 3 comprises a CPU (Central Processing Unit) 31, a memory 32, a SAN port 33, a LAN port 34, and an internal bus 35. The CPU 31, the memory 32, the SAN port 33, and the LAN port 34 are coupled to one another via the internal bus 35. The SAN port 33 is an interface device for coupling to the SAN 41. The LAN port 34 is the interface device for coupling to the LAN 42.

The memory 32 stores an application program 321, a host configuration information sending program 322, and host configuration information 323. The host configuration information 323 is for managing a corresponding relationship between the host 3, and the virtual volume 266 and the logical volume 264, which the host 3 accesses. For example, the host configuration information 323 stores an identifier of either the logical volume 264 or the virtual volume 266, which is allocated to the host 3, that is, which the host 3 accesses, and the identifier of the storage apparatus 2 in which the allocated either logical volume 264 or virtual volume 266 exists. The host configuration information sending program 322 is for sending the host configuration information 323 to the management computer 1 based on a request by the management computer 1.

Figure 3:
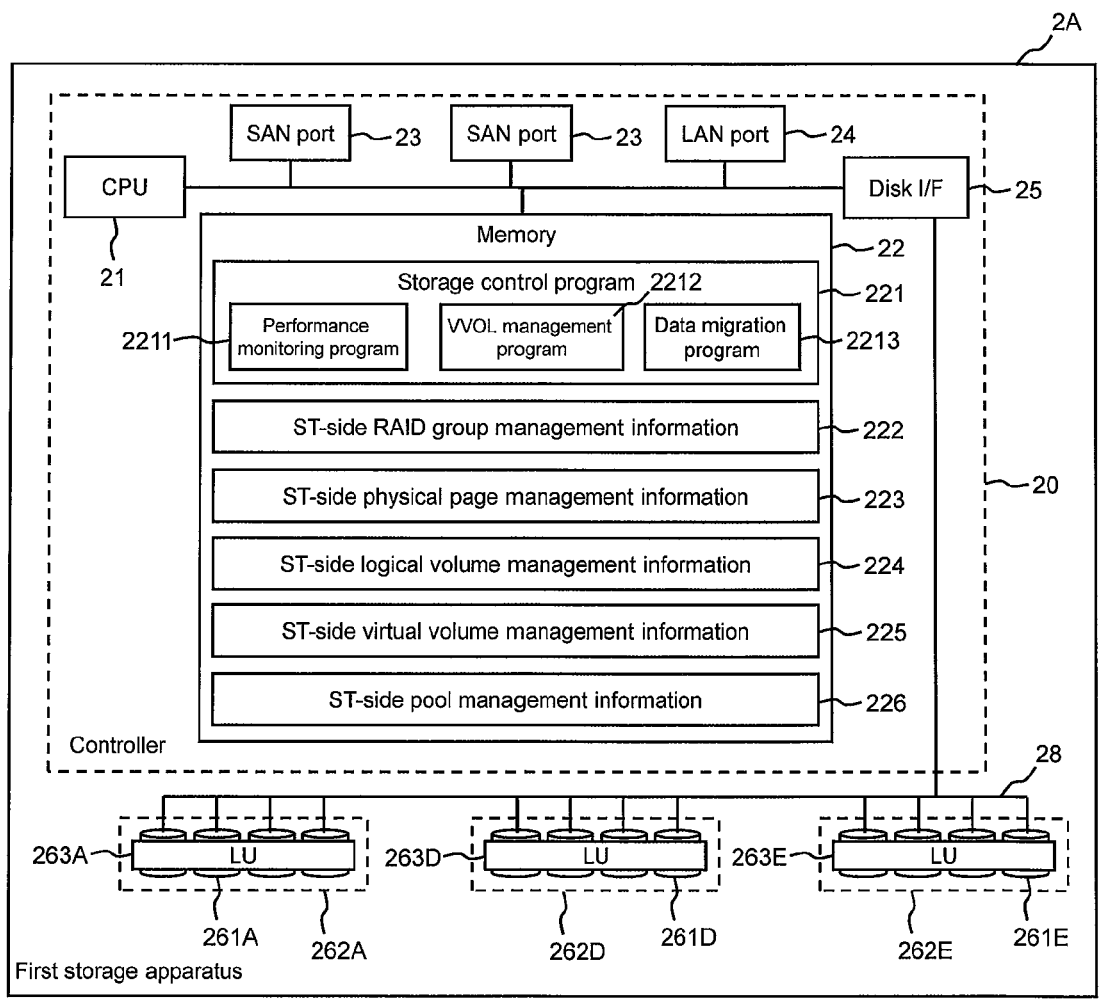
FIG. 3 is a block diagram of an example of a first storage apparatus related to the example 1.

FIG. 3 is a block diagram of an example of a first storage apparatus related to the example 1.

The first storage apparatus 2A comprises a controller 20, multiple physical storage devices 261 with different performance (storage device 261A, storage device 261D, and storage device 261E in the drawing), and an internal bus 28. The controller 20 and the storage devices 261 are coupled to one another via the internal bus 28.

For example, various types of devices capable of reading and writing data can be used as the storage device 261, such as a hard disk device, a semiconductor memory device, an optical disk device, a magneto-optical disk device, a magnetic tape device, and a flexible disk device. In a case where a hard disk device is used as the storage device 261, for example, a FC (Fibre Channel) disk, a SCSI (Small Computer System Interface) disk, a SATA (serial ATA) disk, an ATA (AT Attachment) disk, and a SAS (Serial Attached SCSI) disk may be used. For example, a flash memory, a FeRAM (Ferroelectric Random Access Memory), a MRAM (Magnetoresistive Random Access Memory), a phase-change memory (Ovonic Unified Memory), a RRAM (registered trademark) (Resistance RAM) or other such storage device may also be used. In addition, for example, the configuration may be such that different types of storage devices 261, like a flash memory device and a hard disk device, are intermixed. In this example, the storage device 261A is a relatively high-performance SSD (flash memory device), the storage device 261D is a medium-performance SAS disk, and the storage device 261E is a relatively low-performance SATA disk.

A RAID group 262 (RAID group 262A, RAID group 262D, and RAID group 262E) is created by grouping together storage devices 261 of the same type. The RAID group 262A is configured from physical storage areas of multiple high-performance storage devices 261A. The RAID group 262D is configured from physical storage areas of multiple medium-performance storage devices 261D. The RAID group 262E is configured from physical storage areas of multiple low-performance storage devices 261E.

An LU 263 corresponding to a logical volume 264 (LU 263A, LU 263D, and LU 263E) can be provided by segmenting the physical storage areas of the respective RAID groups 262 into either fixed sizes or variable sizes. The LU 263A is disposed on the high-performance RAID group 262A. The LU 263D is disposed on the medium-performance RAID group 262D. The LU 263E is disposed on the low-performance RAID group 262E. Therefore, the LU 263A is a high-performance logical storage device, the LU 263D is a medium-performance logical storage device, and the LU 263E is a low-performance logical storage device. The LU 263A corresponds to the logical volume 264A (refer to FIG. 1), and LUs 263D and 263E each correspond to a different logical volume than the logical volume 264A. The fact that the LU corresponds to the logical volume here denotes that the LU and the logical volume share the same physical storage area inside the storage apparatus. In this example, the LU and the logical volume are regarded as separate components, but the LU and the logical volume may be expressed as the same component (that is, the LU and the logical volume may be regarded as identical).

The controller 20 comprises a CPU 21, a memory 22, one or more SAN ports 23, a LAN port 24, and a disk I/F (interface) 25. The SAN port 23 is the interface device for coupling to the SAN 41. The LAN port 24 is the interface device for coupling to the LAN 42.

The memory 22 stores a storage control program 221, ST-side RAID group management information 222, ST-side physical page management information 223, ST-side logical volume management information 224, ST-side virtual volume management information 225, and ST-side pool management information 226. The ST-side RAID group management information 222, the ST-side physical page management information 223, the ST-side logical volume management information 224, the ST-side virtual volume management information 225, and the ST-side pool management information 226 will be explained further below. In the explanation of the embodiment, "ST" is the abbreviation for storage apparatus.

The storage control program 221 comprises a performance monitoring program 2211, a virtual volume (VVOL) management program 2212, and a data migration program 2213 as sub-programs. The storage control program 221, in accordance with being executed by the CPU 21, performs processing for controlling access to the storage device 261, processing for monitoring performance, and processing for managing the virtual volume.

The performance monitoring program 2211 collects performance with respect to the virtual volume 266. The performance monitoring program 2211 tabulates the access frequencies for the respective virtual volumes 266 in the storage apparatus 2, and records these access frequencies in the ST-side virtual volume management information 225. The access frequency for the virtual volume 266, for example, is a set of the number of times the host 3 has accessed the respective virtual segments 272 in the virtual volume 266, and is tabulated for each virtual segment 272.

The number of accesses to a virtual segment 272 refers to the number of access requests for which processing has been completed (or may also include processing, which is currently in progress) from among the access requests, which specify either all or a portion of the virtual segments 272 as a range of addresses. For example, in a case where the address range of an access request is either all or a portion of a certain virtual segment 272 (in other words, the virtual segment 272 comprises the range of addresses of the access request), the performance monitoring program 2211 increases the number of accesses of the relevant virtual segment 272 in proportion to the number of relevant access requests. As another example, in a case where the address range of an access request comprises either all or a portion of each of multiple virtual segments 272, the performance monitoring program 2211 increases the number of accesses of each of the multiple virtual segments 272 in proportion to the number of relevant access requests. The latter does not occur very often in the case of a virtual segment 272 that is large in size. Therefore, the performance monitoring program 2211 may increase the number of accesses by the count number of the virtual segment 272 comprising the head of the address range specified by the access request.

Figure 9:
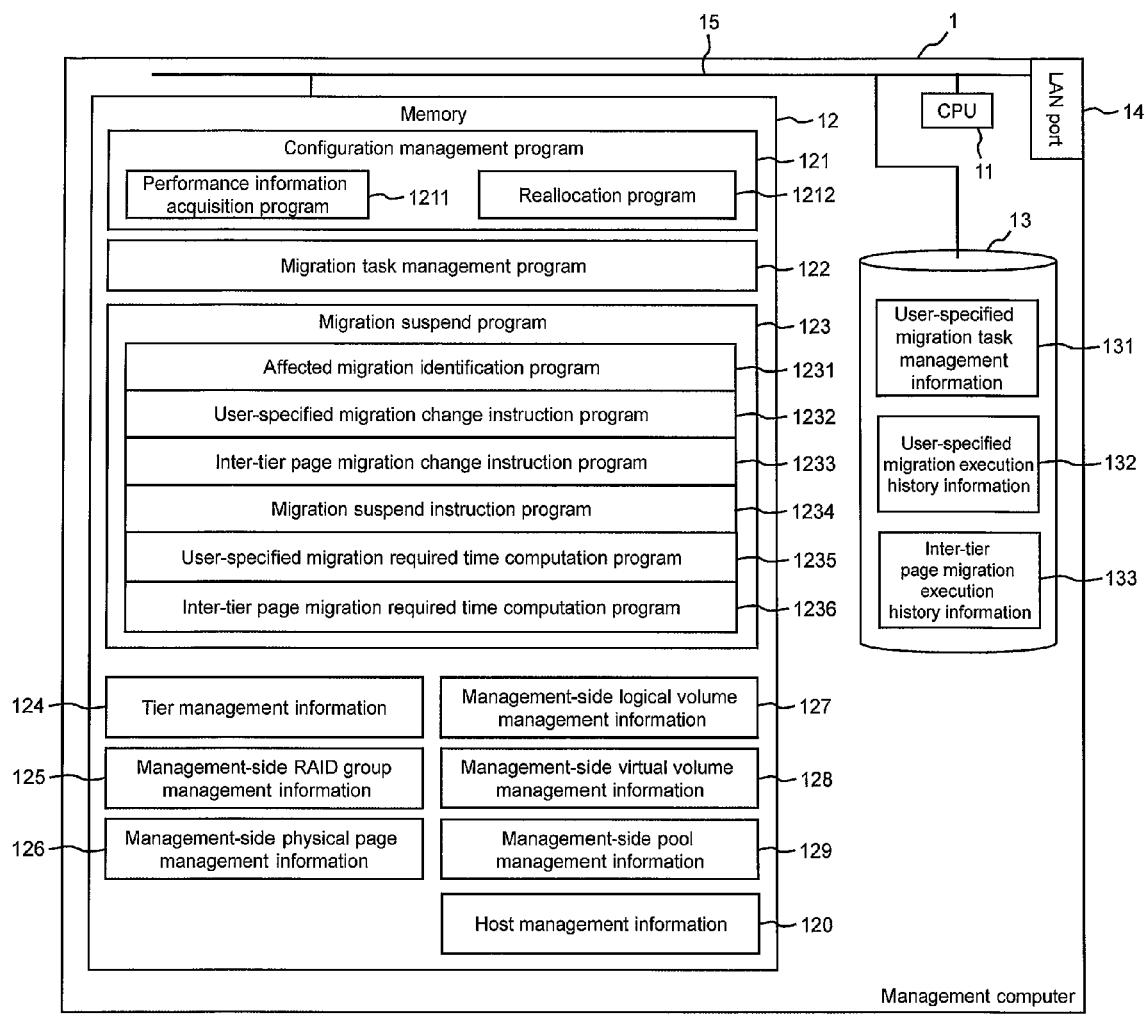
FIG. 9 is a block diagram of an example of a management computer related to the example 1.

The virtual volume management program 2212 revises the allocation of a physical page 271 to a virtual segment 272 in the virtual volume 266 based on an instruction from the reallocation program 1212 of the management computer 1 (refer to FIG. 9).

The data migration program 2213 performs a data migration (volume migration) to a migration-destination logical volume 264 (hereinafter referred to as "migration-destination volume") from a migration-source logical volume 264 (hereinafter referred to as "migration-source volume") based on an instruction from the migration task management program 122 (refer to FIG. 9) of the management computer 1.

Specifically, the data migration program 2213 copies data inside the migration-source volume to the migration-destination volume, and either overwrites the configuration control information of the migration-destination volume with the configuration control information of the migration-source volume, or interchanges the configuration control information of the migration-destination volume with the configuration control information of the migration-source volume. As used here, the configuration control information of the logical volume 264, for example, is the identifier (for example, the volume number) of the logical volume 264. The migration-source volume and the migration-destination volume, for example, are specified by the administrator via the management computer 1.

Next, the configurations of the second storage apparatus and the third storage apparatus will be explained.

The configurations of the second storage apparatus 2B and the third storage apparatus 2C are substantially the same as that of the first storage apparatus 2A with the exception of the programs stored in the memories 22. The second storage apparatus 2B and the third storage apparatus 2C related to this example do not store the storage control program 221, the ST-side virtual volume management information 225, and the ST-side pool management information 226.

The second storage apparatus 2B and the third storage apparatus 2C, like the first storage apparatus 2A, may store the storage control program 221, the ST-side virtual volume management information 225, and the ST-side pool management information 226. In accordance with this, the host 3 is also able to directly access the second storage apparatus 2B and the third storage apparatus 2C. That is, the second storage apparatus 2B and the third storage apparatus 2C can also directly receive an I/O request with respect to their own storage apparatus 2 from the host 3, and the first storage apparatus 2A can receive an I/O request with respect to its own storage apparatus 2 via the second storage apparatus 2B or the third storage apparatus 2C. This makes it possible to lessen setting changes and other such work and to reduce the time and effort of the administrator even in a case where it becomes necessary to stop the first storage apparatus 2A.

In this example, the second storage apparatus 2B comprises multiple storage devices, which are examples of medium-performance SAS disks (hereinafter, medium-performance storage device), and comprises a RAID group configured from multiple medium-performance storage devices (hereinafter, medium-performance RAID group). A LU is disposed on the medium-performance RAID group as a medium-performance logical storage device (hereinafter, medium-performance LU), and the medium-performance LU corresponds to the logical volume 264B (refer to FIG. 1). The third storage apparatus 2C comprises multiple storage devices, which are examples of relatively low-performance SATA disks (hereinafter, low-performance storage device), and comprises a RAID group configured from multiple low-performance storage devices (hereinafter, low-performance RAID group). A LU is disposed on the low-performance RAID group as a low-performance logical storage device (hereinafter, low-performance LU), and the low-performance LU corresponds to the logical volume 264C (refer to FIG. 1).

The second storage apparatus 2B and the third storage apparatus 2C, as external storage apparatuses with respect to the first storage apparatus 2A, provide the host 3 with the logical volume 264B and the logical volume 264C via the first storage apparatus 2A. That is, the host 3 reads/writes data from/to the logical volume 264B or the logical volume 264C via the first storage apparatus 2A.

FIG. 4 is a block diagram of an example of ST-side RAID group management information related to the example 1.

The ST-side RAID group management information 222 is for the storage apparatus 2 to manage the configuration of the RAID group 262, which exists in the relevant storage apparatus 2. The ST-side RAID group management information 222, for example, is configured as a table, and comprises the information items RAID group ID 2221, device type 2222, RAID level 2223, and storage device ID (PDEV-ID) 2224.

An identifier of a RAID group 262 is stored in the RAID group ID 2221. Data showing the type of storage device 261 comprising the RAID group 262 is stored in the device type 2222. Data showing the RAID level and combination of the RAID group 262 is stored in the RAID level 2223. The identifiers of the storage devices 261 comprising the RAID group 262 are stored in the storage device ID 2224.

A portion of the information items shown in the drawing may be changed to other information items, and new information items may be added; the same holds true for the respective information (tables) described hereinbelow. In addition, one table may be managed by being partitioned into multiple tables.

FIG. 5 is a block diagram of an example of ST-side physical page management information related to the example 1.

The ST-side physical page management information 223 is for the storage apparatus 2 to manage whether or not the physical pages 271 of the respective RAID groups 262, which exist in the relevant storage apparatus 2, have been allocated to a virtual volume 266. The ST-side physical page management information 223, for example, is configured as a table, and comprises the information items RAID group ID 2231, physical page ID 2232, RAID group LBA range 2233, and allocation status 2234.

The identifier of a RAID group 262 is stored in the RAID group ID 2231. The identifier of a physical page 271 of the RAID group 262 is stored in the physical page ID 2232. Data showing an LBA range of the RAID group 262 corresponding to the physical page 271 is stored in the RAID group LBA range 2233. LBA is the abbreviation for logical block address. Data showing whether or not the physical page 271 has been allocated to a virtual volume 266 is stored in the allocation status 2234. In addition to the virtual volume 266, the logical volume 264 is also an allocation destination of the physical page 271. The storage control program 221 exercises control so that one physical page 271 is not allocated to different virtual volumes 266, and exercises control so that one physical page 271 is not allocated to different logical volumes 264.

FIG. 6 is a block diagram of an example of ST-side logical volume management information related to the example 1.

The ST-side logical volume management information 224 is for the storage apparatus 2 to manage a physical page 271 included in a logical volume 264 with respect to the logical volume 264, which exists in the relevant storage apparatus 2, and the external volume (the logical volume 264) of the relevant storage apparatus 2. The ST-side logical volume management information 224, for example, is configured as a table, and comprises the information items logical volume ID (LVOL-ID) 2241, physical page ID 2242, external storage apparatus ID 2243, mapping-source logical volume ID 2244, and mapping-source physical page ID 2245.

The identifier of a logical volume 264 is stored in the logical volume ID 2241. The identifier stored in the logical volume ID 2241 is not an identifier specified by the host 3, but rather is an identifier, which is recognized internally in the storage apparatus 2. In a case where the logical volume 264 is an external volume, an identifier given to the internal storage apparatus side (EVOL 2, EVOL 3, and so forth) is stored in the logical volume ID 2241. The identifier of a physical page 271 included in the logical volume 264 is stored in the physical page ID 2242. In a case where the logical volume 264 is an external volume, an identifier given to the internal storage apparatus side (ESEG 1, ESEG 2, and so forth) is stored in the physical page ID 2242.

The identifier of the storage apparatus 2 in which exists a logical volume 264, which is an external volume, is stored in the external storage apparatus ID 2243. In a case where the logical volume 264 is the internal volume, "n/a" is stored in the external storage apparatus ID 2243. The external storage apparatus-side identifier (LVOL 2, LVOL 3, and so forth) of a logical volume 264, which is an external volume, is stored in the mapping-source logical volume ID 2244. The external storage apparatus-side identifier (SEG 1, SEG 2, and so forth) of a physical page 271 included in the logical volume 264, which is an external volume, is stored in the mapping-source physical page ID 2245.

FIG. 7 is a block diagram of an example of ST-side virtual volume management information related to the example 1.

The ST-side virtual volume management information 225 is for the storage apparatus 2 to manage information related to a virtual segment 272 and a physical page 271 allocated to this virtual segment 272 with respect to a virtual volume 266 provided by the relevant storage apparatus 2. The ST-side virtual volume management information 225, for example, is configured as a table, and comprises the information items virtual volume ID (VVOL-ID) 2251, virtual segment ID 2252, virtual volume LBA range (VVOL LBA range) 2253, physical page ID 2254, number of accesses 2255, monitoring period 2256, and reallocation destination determination result 2257.

The identifier of a virtual volume 266 is stored in the virtual volume ID 2251. The identifier stored in the virtual volume ID 2251 is not an identifier specified by the host 3, but rather is an identifier recognized internally in the storage apparatus 2. The identifier of a virtual segment 272 included in the virtual volume 266 is stored in the virtual segment ID 2252. Data showing the LBA range corresponding to the virtual segment 272 in the virtual volume 266 is stored in the virtual volume LBA range 2253. The identifier of the physical page 271 allocated to the virtual segment 272 in the virtual volume 266 is stored in the physical page ID 2254.

A value showing the number of accesses from the host 3 (cumulative number of I/Os) with respect to the virtual segment 272 in the virtual volume 266 is stored in the number of accesses 2255. Monitoring of the number of accesses by the storage apparatus 2 is performed within a time range configured in the monitoring period 2256. In a case where a value showing a specified period of time is not configured in the monitoring period 2256, the storage apparatus 2, for example, constantly monitors the number of accesses. The storage apparatus 2 resets the value of the number of accesses 2255 to 0 at the time at which monitoring starts. In a case where the monitoring result is not stored during the monitoring period, the value of the number of accesses 2255 is reset to 0 at fixed time periods, for example, every 24 hours.

Data showing the monitoring period by the performance monitoring program 2211, that is, the time range during which the performance monitoring program 2211 monitors the number of accesses with respect to the virtual volume 266 and stores the monitoring result, is stored in the monitoring period 2256. The monitoring period value may be given beforehand as a fixed value, or may be an arbitrary value configured via the management computer 1. Data showing a data reallocation-destination tier 2651 determined in accordance with a reallocation process, which will be explained further below (refer to FIG. 30), is stored in the reallocation destination determination result 2257. A tier 2651, which supplies the physical page 271 allocated to the virtual segment 272 in the virtual volume 266, is decided in the reallocation process.

FIG. 8 is a block diagram of an example of ST-side pool management information related to the example 1.

The ST-side pool management information 226 is for the storage apparatus 2 to manage the configuration of the pool 265, which exists inside the relevant storage apparatus 2, and setting contents related to an inter-tier page migration performed in this pool 265. The ST-side pool management information 226, for example, is configures as a table, and comprises the information items pool ID (Pool-ID) 2261, pool configuration logical volume ID (Pool configuration LVOL-ID) 2262, storage apparatus 2263, inter-tier page migration 2264, migration cycle 2265, and monitoring time period 2266.

The identifier of a pool 265 is stored in the pool ID 2261. The identifier of a logical volume 264 comprising the pool 265 is stored in the pool configuration logical volume ID 2262. The identifier of the storage apparatus 2 in which the logical volume 264 comprising the pool 265 exists is stored in the storage apparatus 2263. Data showing whether or not an inter-tier page migration is to be performed, that is, whether an inter-tier page migration is valid or invalid, is stored in the inter-tier page migration 2264. For example, in a case where an inter-tier page migration is valid, "ON" is stored in the inter-tier page migration 2264, and in a case where an inter-tier page migration is invalid, "OFF" is stored in the inter-tier page migration 2264. Data showing a cycle for performing inter-tier page migrations is stored in the migration cycle 2265. Data showing a performance monitoring time period for acquiring an access frequency referenced by the reallocation process is stored in the monitoring time period 2266.

FIG. 9 is a block diagram of an example of a management computer related to the example 1.

The management computer 1 comprises a CPU 11, a memory 12, an auxiliary storage device 13, a LAN port 14, and an internal bus 15. The CPU 11, the memory 12, the auxiliary storage device 13, and the LAN port 14 are coupled to one another via the internal bus 15. The LAN port 14 is the interface device for coupling to the LAN 42.

The memory 12 stores a configuration management program 121, a migration task management program 122, a migration suspend program 123, tier management information 124, management-side RAID group management information 125, management-side physical page management information 126, management-side logical volume management information 127, management-side virtual volume management information 128, management-side pool management information 129, and host management information 120. The auxiliary storage device 13 stores user-specified migration task management information 131, user-specified migration execution history information 132, and inter-tier page migration execution history information 133. The various types of information 124 through 129, 120, and 131 through 133 will be explained further below.

The configuration management program 121 comprises a performance information acquisition program 1211 and a reallocation program 1212 as sub-programs. The performance information acquisition program 1211 acquires the number of accesses with respect to each virtual segment 272 from the storage apparatus 2, computes an average value (hereinafter, "average IOPS value") of the number of accesses per unit of time (in this example, IOPS (number of I/Os per second)), and stores this average IOPS value in the management-side virtual volume management information 128. The reallocation program 1212 is the program, which performs the reallocation process. The reallocation program 1212 decides the tier 2651 to which virtual segment 272 data is to be allocated based on the average IOPS value for each virtual segment 272.

The migration task management program 122 instructs the start of execution for a volume migration specified by the user (hereinafter, referred to as "user-specified migration") at a specified date and time based on the contents of the user-specified migration task management information 131.

The migration suspend program 123 (hereinafter written as "suspend program 123") comprises an affected migration identification program 1231, a user-specified migration change instruction program 1232, an inter-tier page migration change instruction program 1233, a migration suspend instruction program 1234, a user-specified migration required time computation program 1235, and an inter-tier page migration required time computation program 1236. The suspend program 123, based on input information specifying either a stop-target storage apparatus 2 or a block-target storage area (either a determination-target storage apparatus, which is regarded as a determination target, or a first storage area), identifies a user-specified migration and an inter-tier page migration, which will be affected by either a storage apparatus 2 being stopped or a storage area being blocked, and, for example, based on an instruction from the administrator, performs setting changes for the identified user-specified migration and inter-tier page migration, and suspends the suspend-target migration from among the identified user-specified migration and inter-tier page migration.

A user-specified migration (first volume migration) affected by either a storage apparatus 2 being stopped or a storage area being block may be called "affected user-specified migration", an inter-tier page migration (first page migration) affected by either a storage apparatus 2 being stopped or a storage area being blocked may be called "affected inter-tier page migration", and the affected user-specified migration and the affected inter-tier page migration may be called "affected migration".

The affected migration identification program 1231 (hereinafter written as "identification program 1231") identifies an affected migration based on input information, which specifies either a stop-target storage apparatus 2 or a block-target storage area.

The user-specified migration change instruction program 1232 (hereinafter written as "UM change instruction program 1232"), for example, performs a setting change with respect to the affected user-specified migration based on input data from the administrator.

The inter-tier page migration change instruction program 1233 (hereinafter written as "PM change instruction program 1233"), for example, performs a setting change with respect to the affected inter-tier page migration based on input data from the administrator.

The migration suspend instruction program 1234 (hereinafter written as "suspend instruction program 1234") suspends an affected migration, which is regarded as a suspend target.

The user-specified migration required time computation program 1235 (hereinafter written as "UM required time computation program 1235") estimates the time required for an affected user-specified migration, and computes an expected date and time for the completion of the task, which executes the affected user-specified migration.

The inter-tier page migration required time computation program 1236 (hereinafter written as "PM required time computation program 1236") estimates the time required until the completion of the execution of each cycle of the affected inter-tier page migration, and computes an expected date and time for the completion of the affected inter-tier page migration for each cycle.

The respective processing performed by the management computer 1 may be executed by the controller 20 of the storage apparatus 2. That is, computer system management functions may be provided in the storage apparatus 2. The functions of the management computer 1 may also be loaded into the host 3.

The management-side physical page management information 126 is for the management computer 1 to manage whether or not the physical pages 271 of the respective RAID groups 262, which exist in the computer system, have been allocated to the virtual volume 266, and to consolidate the ST-side physical page management information 223 of the multiple storage apparatuses 2, which exist in the computer system. The management-side physical page management information 126 comprises the information item storage apparatus ID 1261 in addition to the information items of the ST-side physical page management information 223. The identifier of the storage apparatus 2 in which the RAID group 262 exists is stored in the storage apparatus ID 1261 of the management-side physical page management information 126. The management computer 1 acquires the ST-side physical page management information 223 from each storage apparatus 2, and creates the management-side physical page management information 126. In the following explanation, each information item (other than the storage apparatus ID 1261) of the management-side physical page management information 126 is identified using a reference number given to an information item of the ST-side physical page management information 223 for descriptive purposes.

The management-side logical volume management information 127 is for the management computer 1 to manage a relationship between a logical volume 264, which exists in the computer system, and a physical page 271 included in this logical volume 264, and to consolidate the ST-side logical volume management information 224 of the multiple storage apparatuses 2, which exist in the computer system. The management-side logical volume management information 127 comprises the information item storage apparatus ID 1271 in addition to the information items of the ST-side logical volume management information 224. The identifier of the storage apparatus 2 in which the logical volume 264 exists is stored in the storage apparatus ID 1271 of the management-side logical volume management information 127. The management computer 1 acquires the ST-side logical volume management information 224 from each storage apparatus 2, and creates the management-side logical volume management information 127. In the following explanation, each information item (other than the storage apparatus ID 1271) of the management-side logical volume management information 127 is identified using a reference number given to an information item of the ST-side logical volume management information 224 for descriptive purposes.

The management-side pool management information 129 is for the management computer 1 to manage the configuration of the pool 265, which exists inside the computer system, and setting contents related to an inter-tier page migration performed in this pool 265, and to consolidate the ST-side pool management information 226 of the multiple storage apparatuses 2, which exist in the computer system. The information items included in the management-side pool management information 129 are substantially the same as the information items included in the ST-side pool management information 226. The management computer 1 acquires the ST-side pool management information 226 from each storage apparatus 2, and creates the management-side pool management information 129. In the following explanation, the management computer 1 uses a reference number given to an each information item of the ST-side pool management information 226 is identified using a reference number given to an information item of the management-side pool management information 129 for descriptive purposes.

FIG. 10 is a block diagram of an example of management-side RAID group management information related to the example 1.

The management-side RAID group management information 125 is for the management computer 1 to manage the configuration of the RAID group 262, which exists in the computer system, and to consolidate the ST-side RAID group management information 222 of the multiple storage apparatuses 2, which exist in the computer system. The management-side RAID group management information 125, for example, is configured as a table, and comprises the information items RAID group ID 1251, storage apparatus ID 1252, device type 1253, and RAID level 1254.

The RAID group ID 1251, the device type 1253, and the RAID level 1254 correspond to the RAID group ID 2221, the device type 2222, and the RAID level 2223, respectively, of the ST-side RAID group management information 222. The identifier of the storage apparatus 2 in which the RAID group 262 exists is stored in the storage apparatus ID 1252. The management computer 1 acquires the ST-side RAID group management information 222 from each storage apparatus 2, and creates the management-side RAID group management information 125.

FIG. 11 is a block diagram of an example of management-side virtual volume management information related to the example 1.

The management-side virtual volume management information 128 is for the management computer 1 to manage information related to the virtual segment 272 of the virtual volume 266, which exists in the computer system, and the physical page 271 allocated to this virtual segment 272, and to consolidate the ST-side virtual volume management information 225 of the multiple storage apparatuses 2, which exist in the computer system. The management-side virtual volume management information 128, for example, is configured as a table, and comprises the information items virtual volume ID (VVOL-ID) 1281, storage apparatus ID 1282, virtual segment ID 1283, virtual volume LBA range (VVOL LBA range) 1284, physical page ID 1285, IOPS 1286, and reallocation destination determination result 1287.

The virtual volume ID 1281, the virtual segment ID 1283, the virtual volume LBA range 1284, the physical page ID 1285, and the reallocation destination determination result 1287 correspond to the virtual volume ID 2251, the virtual segment ID 2252, the virtual volume LBA range 2253, the physical page ID 2254, and the reallocation destination determination result 2257, respectively, of the ST-side virtual volume management information 225. The identifier of the storage apparatus 2, which provides the virtual volume 266, is stored in the storage apparatus ID 1282. An average IOPS value for the virtual segment 272 is stored in the IOPS 1286.

FIG. 12 is a block diagram of an example of tier management information related to the example 1.

The tier management information 124 is for managing the performance of each tier 2651 and a condition when allocating data to each tier 2651. The tier management information 124, for example, is updated in accordance with a request from the administrator. The tier management information 124, for example, is configured as a table, and comprises the information items storage apparatus ID 1241, tier ID 1242, performance condition 1243, and allocation condition 1244.

The identifier of a storage apparatus 2 in which there exists a pool 265 comprising a tier 2651 is stored in the storage apparatus ID 1241. The identifier of a tier 2651 is stored in the tier ID 1242. In this example, the identifier of the high-level tier 2651A (tier 1) is "Tier 1", the identifier of the mid-level tier 2651B (tier 2) is "Tier 2", and the identifier of the low-level tier 2651C (tier 3) is "Tier 3". Data showing a performance condition of a tier 2651 is stored in the performance condition 1243. For example, data showing the type of the storage device 261 comprising the tier 2651, the RAID level of the RAID group 262 comprising the tier 2651, and whether or not the logical volume 264 comprising the tier 2651 is an external volume is included in the data showing the performance condition of the tier 2651. Another performance parameter, such as access speed, may also be included in the data showing the performance condition of the tier 2651.

Data showing a condition (hereinafter referred to as "allocation condition") for allocating data to a tier 2651 is configured in the allocation condition 1244. The allocation condition, for example, is regarded as the range of the number of accesses per unit of time with respect to data allocated to this tier 2651. In the example shown in FIG. 12, data in which the average IOPS value is equal to or larger than 100 is allocated to the high-level tier 2651A. Data in which the average IOPS value is equal to or larger than 30 but less than 100 is allocated to the mid-level tier 2651B. Data in which the average IOPS value is less than 30 is allocated to the low-level tier 2651C. The value of the allocation condition 1244 may be a fixed value or a variable value. In this example, IOPS is used to determine the allocation condition, but as long as an allocation destination can be determined based on a data access frequency per unit of time, any performance index (for example, IOPH or the like) is acceptable.

FIG. 13 is a block diagram of an example of host management information related to the example 1.

The host management information 120 is for managing a corresponding relationship between the host 3 and the virtual volume 266 and logical volume 264 accessed by the host 3. The host management information 120, for example, is configured as a table, and comprises the information items host 1201, allocated volume 1202, and storage apparatus 1203.

The identifier of the host 3 is stored in the host 1201. The identifier of either the logical volume 264 or the virtual volume 266, which is allocated to the host 3, that is, which is accessed by the host 3, is stored in the allocated volume 1202. The identifier of the storage apparatus 2 in which either the logical volume 264 or the virtual volume 266 allocated to the host 3 exists is stored in the storage apparatus 1203. The host management information 120 is created based on host configuration information 323 acquired from the host 3.

FIG. 14 is a block diagram of an example of user-specified migration task management information related to the example 1.

The user-specified migration task management information 131 is for managing a task (hereinafter referred to as "user-specified migration task") for executing a user-specified migration. The user-specified migration task management information 131, for example, is configured as a table, and comprises the information items task ID 1311, migration-source volume 1312, migration-source storage apparatus 1313, migration-destination volume 1314, migration-destination storage apparatus 1315, sub-task status 1319, task status 1316, execution start date/time 1317, and execution complete date/time 1318.

The identifier of a user-specified migration task is stored in the task ID 1311. The identifier of a migration-source volume of the user-specified migration executed by the user-specified migration task is stored in the migration-source volume 1312. The identifier of the storage apparatus 2 (hereinafter referred to as "migration-source storage apparatus") in which exists the migration-source volume of the user-specified migration executed by the user-specified migration task is stored in the migration-source storage apparatus 1313. The identifier of a migration-destination volume of the user-specified migration executed by the user-specified migration task is stored in the migration-destination volume 1314. The identifier of the storage apparatus 2 (hereinafter referred to as "migration-destination storage apparatus") in which exists the migration-destination volume of the user-specified migration executed by the user-specified migration task is stored in the migration-destination storage apparatus 1315. Data showing the state of a sub-task of the user-specified migration task is stored in the sub-task status 1319. The type of data showing the sub-task status is the same as the type of data showing the status of the task. Data, for example, "executing", "waiting", "execution complete", and so forth, which shows the status of the user-specified migration task, is stored in the task status 1316. Data showing the date and time at which the execution of the user-specified migration task started is stored in the execution start date/time 1317. Data showing the date and time at which the execution of the user-specified migration task was completed is stored in the execution completion date/time 1318.

The user-specified migration task is able to collectively execute multiple related user-specified migrations. In the example of the drawing, a user-specified migration task having the task ID 1311 of "VM1" is a task for collectively performing three user-specified migrations, that is, a user-specified migration from the logical volume "LVOL 1" to the logical volume "LVOL 10", a user-specified migration from the logical volume "LVOL 2" to the logical volume "LVOL 11", and a user-specified migration from the logical volume "LVOL 3" to the logical volume "LVOL 12".

In this example, an individual user-specified migration included in the user-specified migration task is regarded as the above-mentioned "sub-task". That is, in the example of the drawing, the task having the task ID "VM1" in comprises three sub-tasks. In the user-specified migration task management information in this example, the task execution status is managed in sub-task units.

FIG. 15 is a block diagram of an example of user-specified migration execution history information related to the example 1.

The user-specified migration execution history information 132 is for managing the execution history of user-specified migrations executed in the past for each storage apparatus 2, specifically, a total value of the execution time for the user-specified migrations and a total value of the amount of data migrated in accordance with the user-specified migrations. The user-specified migration execution history information 132 is referenced when the UM required time computation program 1235 estimates the time, which will be required for a user-specified migration. The user-specified migration execution history information 132, for example, is configured as a table, and comprises the information items storage apparatus ID 1321, total value of execution time periods 1322, and total value of migration data amounts 1323.

The identifier of a storage apparatus 2 is stored in the storage apparatus ID 1321. A total value of the execution time of user-specified migrations executed within a specified period in the past in the storage apparatus 2 is stored in the total value of execution time periods 1322. As used here, a specified period in the past may be the total time period after an initial user-specified migration was executed in the storage apparatus 2 until the most recently performed user-specified migration was completed, for example, may be a one-year period in the past calculated from the point in time at which the execution of a migration suspend process, which will be explained further below, was started. A total value of the amount of data migrated in accordance with the user-specified migrations executed within a specified period in the past in the storage apparatus 2 is stored in the total value of migration data amounts 1323.

Next, the inter-tier page migration execution history information 133 related to the example 1 will be explained.

The inter-tier page migration execution history information 133 is for managing the execution history of inter-tier page migrations executed in the past for each storage apparatus 2, specifically, a total value of the execution time for the inter-tier page migrations and a total value of the amount of data migrated in accordance with the inter-tier page migrations. The inter-tier page migration execution history information 133 is referenced when the PM required time computation program 1236 estimates the time needed for an inter-tier page migration. The information items comprising the inter-tier page migration execution history information 133 are substantially the same as the information items comprising the user-specified migration execution history information 132. In the following explanation, each information item of the inter-tier page migration execution history information 133 is identified using a reference number given to an information item of the user-specified migration execution history information 132 for descriptive purposes.

A total value of the execution time of inter-tier page migrations executed within a specified period in the past in the storage apparatus 2 is stored in the total value of execution time periods 1322 of the inter-tier page migration execution history information 133. A total value of the amount of data migrated in accordance with the inter-tier page migrations executed within a specified period in the past in the storage apparatus 2 is stored in the total value of migration data amounts 1323 of the inter-tier page migration execution history information 133.

Next, the operation of the storage apparatus 2 related to the example 1 will be explained. In the drawings, the storage apparatus 2 may be written as "DKC".

(1-1) Virtual Volume Read Process

Figure 16:
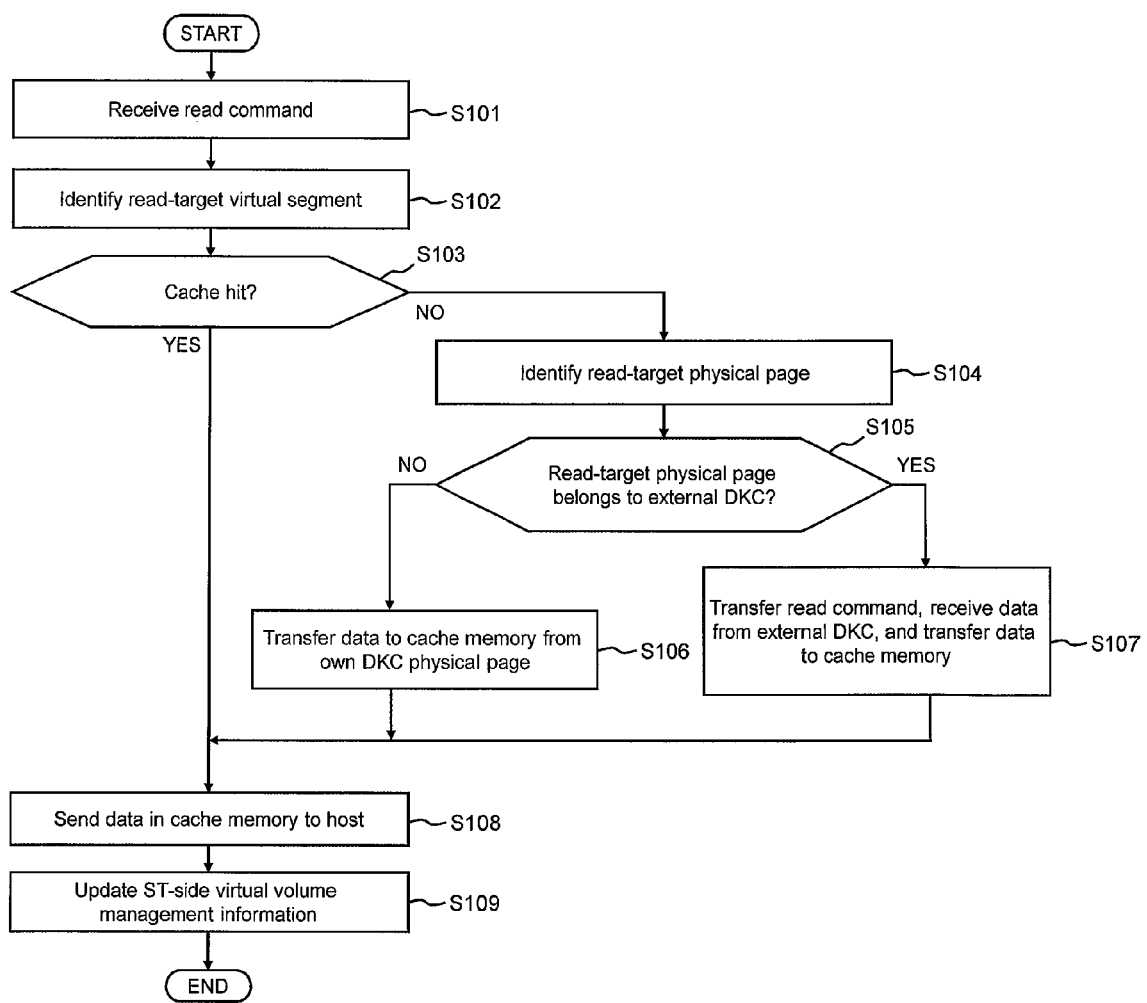
FIG. 16 is a flowchart of a read process with respect to a virtual volume related to the example 1.

FIG. 16 is a flowchart of a read process with respect to a virtual volume related to the example 1.

First, the storage control program 221 receives a read request (read command) with respect to the virtual volume 266 from the host 3 (Step S101). The storage control program 221 identifies a virtual segment 272 (hereinafter referred to as "read-target virtual segment"), which is the data read target, based on access destination information included in the read request (Step S102).

Next, the storage control program 221 determines whether or not the read-target data, that is, the data in the read-target virtual segment exists in the cache memory (Step S103).

In a case where the read-target data exists in the cache memory (Step S103: YES), the storage control program 221 sends the read-target data in the cache memory to the host 3 (Step S108) and advances the processing to Step S109.

Alternatively, in a case where the read-target data does not exist in the cache memory (Step S103: NO), the storage control program 221 identifies the physical page 271 (hereinafter referred to as "read-target physical page") allocated to the read-target virtual segment identified in Step S102 based on the ST-side virtual volume management information 225 (Step S104).

Thereafter, the storage control program 221 references the ST-side logical volume management information 224 and determines whether or not the read-target physical page belongs to an external storage apparatus, that is, belongs to either the second storage apparatus 2B or the third storage apparatus 2C (Step S105).

In a case where the read-target segment does not belong to an external storage apparatus, that is, a case in which the read-target physical page belongs to the first storage apparatus 2A (Step S105: NO), the storage control program 221 reads data from the read-target physical page of the first storage apparatus 2A, and writes the data, which has been read, to the cache memory (Step S106). Thereafter, the storage control program 221 sends the data, which was written to the cache memory, to the host 3 (Step S108) and advances the processing to Step S109.

Alternatively, in a case where the read-target physical page belongs to an external storage apparatus, that is, belongs to either the second storage apparatus 2B or the third storage apparatus 2C (Step S105: YES), the storage control program 221 transfers the read command to the storage apparatus 2 to which the read-target physical page belongs, and waits until the data of the read-target physical page is received from the relevant storage apparatus 2. The storage control program 221, upon receiving the read-target physical page data, writes the received read-target physical page data to the cache memory (Step S107). Thereafter, the storage control program 221 sends the data, which was written to the cache memory, to the host 3 (Step S108) and advances the processing to Step S109.

After sending the read-target data to the host 3 in Step S108, the storage control program 221 updates the number of accesses 2255 corresponding to the read-target virtual segment in the ST-side virtual volume management information 225 (Step S109). Thereafter, the storage control program 221 ends the read process with respect to the virtual volume.

(1-2) Logical Volume Read Process

A read process with respect to the logical volume related to the example 1 will be explained below.

First, the storage control program 221 receives a read request (read command) with respect to the logical volume 264 from the host 3 (Step S2101). The storage control program 221 identifies a physical page 271 (hereinafter referred to as "read-target physical page"), which is the data read target, based on access destination information included in the read request (Step S2102).

Next, the storage control program 221 determines whether or not the read-target data, that is, the data of the read-target physical page exists in the cache memory (Step S2103).

In a case where the read-target data exists in the cache memory (Step S2103: YES), the storage control program 221 sends the read-target data in the cache memory to the host 3 (Step S2104). Thereafter, the storage control program 221 ends the read process with respect to the logical volume.

Alternatively, in a case where the read-target data does not exist in the cache memory (Step S2103: NO), the storage control program 221 references the ST-side logical volume management information 224 and determines whether or not the read-target physical page belongs to an external storage apparatus, that is, either the second storage apparatus 2B or the third storage apparatus 2C (Step S2105).

In a case where the read-target physical page does not belong to an external storage apparatus, that is, a case in which the read-target physical page belongs to the first storage apparatus 2A (Step S2105: NO), the storage control program 221 reads data from the read-target physical page of the first storage apparatus 2A, and writes the data, which has been read, to the cache memory (Step S2106). Thereafter, the storage control program 221 sends the data, which was written to the cache memory, to the host 3 (Step S2107). Thereafter, the storage control program 221 ends the read process with respect to the logical volume.

Alternatively, in a case where the read-target physical page belongs to an external storage apparatus, that is, belongs to either the second storage apparatus 2B or the third storage apparatus 2C (Step S2105: YES), the storage control program 221 transfers the read command to the storage apparatus 2 to which the read-target physical page belongs, and waits until the data of the read-target physical page is received from the relevant storage apparatus 2. The storage control program 221, upon receiving the read-target physical page data, writes the received read-target physical page data to the cache memory (Step S2108). Thereafter, the storage control program 221 sends the data, which was written to the cache memory, to the host 3 (Step S2109). Thereafter, the storage control program 221 ends the read process with respect to the logical volume.

(2-1) Virtual Volume Write Process

Figure 17:
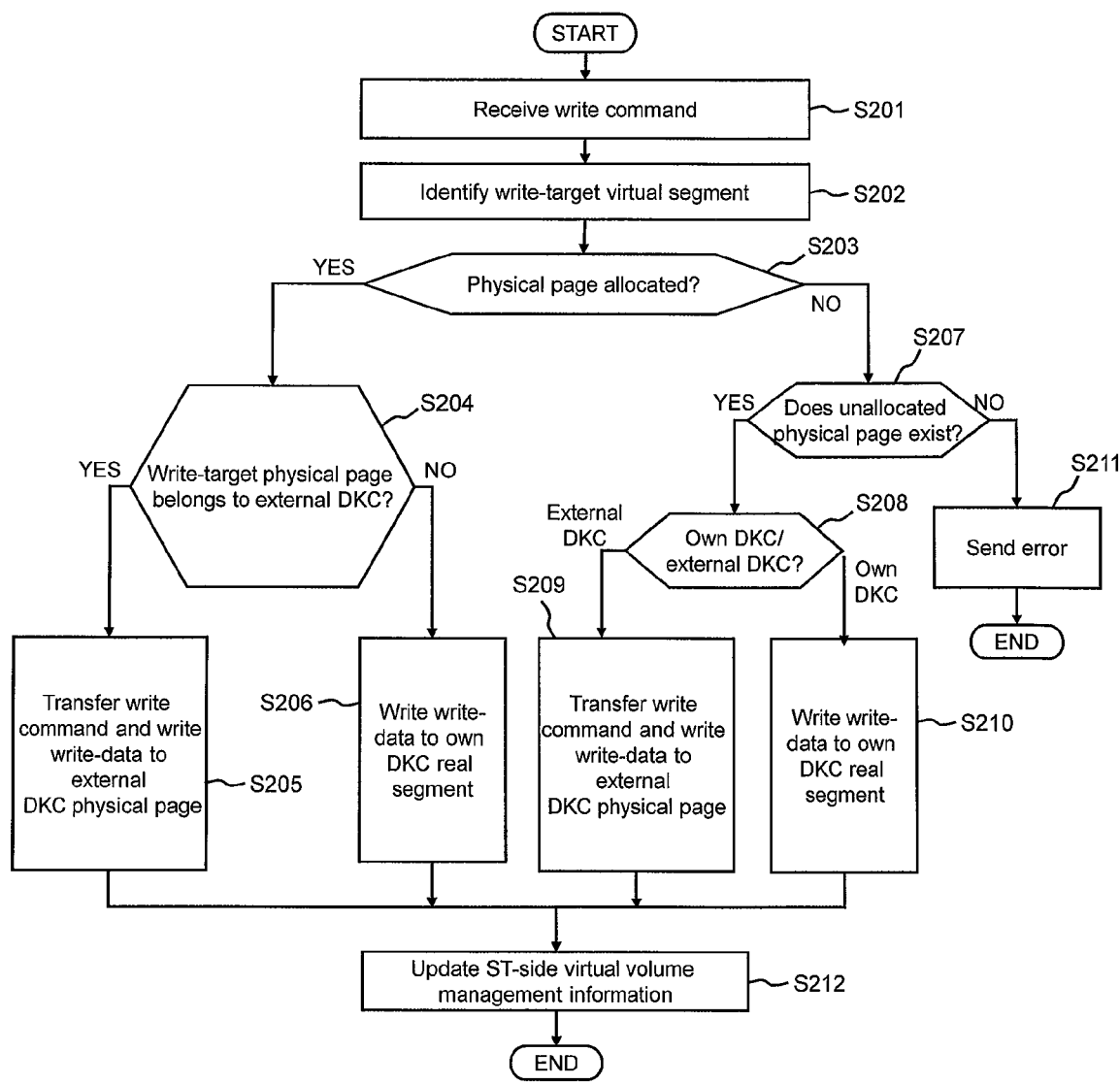
FIG. 17 is a flowchart of a write process with respect to a virtual volume related to the example 1.

FIG. 17 is a flowchart of a write process with respect to the virtual volume related to the example 1.

First, the storage control program 221, upon receiving a write request with respect to the virtual volume 266 from the host 3 (Step S201), identifies the virtual segment 272 (hereinafter referred to as "write-target virtual segment"), which is the destination for writing the data, based on access destination information included in the write request (Step S202).

Next, the storage control program 221 determines whether or not a physical page 271 is allocated to the write-target virtual segment (Step S203). Specifically, the storage control program 221 determines whether or not an entry related to the write-target virtual segment is registered in the ST-side virtual volume management information 225.

In a case where a physical page 271 is allocated to the write-target virtual segment (Step S203: YES), the storage control program 221 references the ST-side virtual volume management information 225 and the ST-side logical volume management information 224, and determines whether or not the physical page 271 (hereinafter referred to as "write-target physical page") allocated to the write-target virtual segment belongs to an external storage apparatus, that is, belongs to either the second storage apparatus 2B or the third storage apparatus 2C (Step S204).

In a case where the write-target physical page does not belong to an external storage apparatus, that is, a case in which the write-target physical page belongs to the first storage apparatus 2A (Step S204: NO), the storage control program 221 writes the write-target data to the write-target physical page (Step S206) and advances the processing to Step S212.

Alternatively, in a case where the write-target physical page belongs to an external storage apparatus, that is, belongs to either the second storage apparatus 2B or the third storage apparatus 2C (Step S204: YES), the storage control program 221 transfers the write command to the storage apparatus 2 to which the write-target physical page belongs, has the write-target data written to the write-target physical page of the relevant storage apparatus 2 (Step S205) and advances the processing to Step S212.

In a case where a physical page 271 is not allocated to the write-target virtual segment (Step S203: NO), the storage control program 221 determines whether or not a physical page 271 capable of being allocated to the write-target virtual segment, that is, an unallocated physical page 271 exists (Step S207). Specifically, the storage control program 221 determines whether or not there exists a physical page 271 for which the allocation status 2234 of the ST-side physical page management information 223 is configured to "unallocated".

In a case where a physical page 271 capable of being allocated to the write-target virtual segment exists (Step S207: YES), the storage control program 221 determines whether the unallocated physical page 271 belongs to the internal storage apparatus or an external storage apparatus (Step S208).

In a case where the unallocated physical page 271 belongs to the internal storage apparatus (Step S208: own DKC), the storage control program 221 allocates the unallocated physical page 271 to the write-target virtual segment, writes the write-target data to this physical page 271 (Step S210), and advances the processing to Step S212.

Alternatively, in a case where the unallocated physical page 271 belongs to an external storage apparatus (Step S208: other DKC), after allocating the unallocated physical page 271 to the write-target virtual segment, the storage control program 221 transfers the write command to the storage apparatus 2 to which the relevant allocated physical page 271 belongs, has the write-target data written to the relevant allocated physical page 271 (Step S209), and advances the processing to Step S212.

After writing the write-target data in Steps S205, S206, S209 or S210, the storage control program 221 updates the value of the number of accesses 2255 corresponding to the write-target virtual segment in the ST-side virtual volume management information 225 (Step S212). Thereafter, the storage control program 221 ends the write process with respect to the virtual volume.

In a case where a physical page 271 capable of being allocated to the write-target virtual segment does not exist in Step S207 (Step S207: NO), the storage control program 221 sends an error to the host 3 (Step S211) and ends the processing with respect to the virtual volume.

(2-2) Logical Volume Write Process

A write process with respect to the logical volume related to the example 1 will be explained below. In the following explanation, step numbers will be given to the processes as needed to make for easier reading. The number 2201 and subsequent numbers are not given in the drawings as step numbers.

First, the storage control program 221, upon receiving a write request with respect to the logical volume 264 from the host 3 (Step S2201), identifies the physical page 271 (write-target physical page), which is the destination for writing the data, based on access destination information included in the write request (Step S2202).

Next, the storage control program 221 references the ST-side logical volume management information 224, and determines whether or not the write-target physical page belongs to an external storage apparatus, that is, belongs to either the second storage apparatus 2B or the third storage apparatus 2C (Step S2203).

In a case where the write-target physical page does not belong to an external storage apparatus, that is, a case in which the write-target physical page belongs to the first storage apparatus 2A (Step S2203: NO), the storage control program 221 writes the write-target data to the write-target physical page (Step S2204). Thereafter, the storage control program 221 ends the write process with respect to the logical volume.

Alternatively, in a case where the write-target physical page belongs to an external storage apparatus, that is, belongs to either the second storage apparatus 2B or the third storage apparatus 2C (Step S2203: YES), the storage control program 221 transfers the write command to the storage apparatus 2 to which the write-target physical page belongs and has the write-target data written to the write-target physical page of the relevant storage apparatus 2 (Step S2205). Thereafter, the storage control program 221 ends the processing with respect to the logical volume.

(3) Volume Migration Process

A volume migration process related to the example 1 will be explained below.

The data migration program 2213, upon receiving an instruction from the management computer 1 to execute a volume migration (for example, a user-specified migration) in which a migration-source volume and a migration-destination volume are specified, copies data of the migration-source volume to the migration-destination volume (Step S2301).

Next, the data migration program 2213 interchanges the configuration control information of the migration-source volume with the configuration control information of the migration-destination volume (Step S2302). The volume configuration control information here, for example, is the identifier of the logical volume 264.

Thereafter, the data migration program 2213 notifies the management computer 1 that the volume migration has been completed (Step S2303), and ends the volume migration process.

According to the volume migration, the data of the migration-source volume is migrated to the migration-destination volume in a state in which an I/O request from the host 3 can be processed as-is. The migration-source volume and the migration-destination volume may be logical volumes 264 inside the same storage apparatus 2, or may be logical volumes 264 inside different storage apparatuses 2. That is, a data migration may be performed between two logical volumes 264 inside a certain one storage apparatus 2, or a data migration may be performed between logical volumes 264 respectively inside two different storage apparatus 2 (for example, either an external storage apparatus and the internal storage apparatus, or the two external storage apparatuses).

Next, the operation of the management computer 1 related to the example 1 will be explained.

(4) Migration Task Management Process

Figure 18:
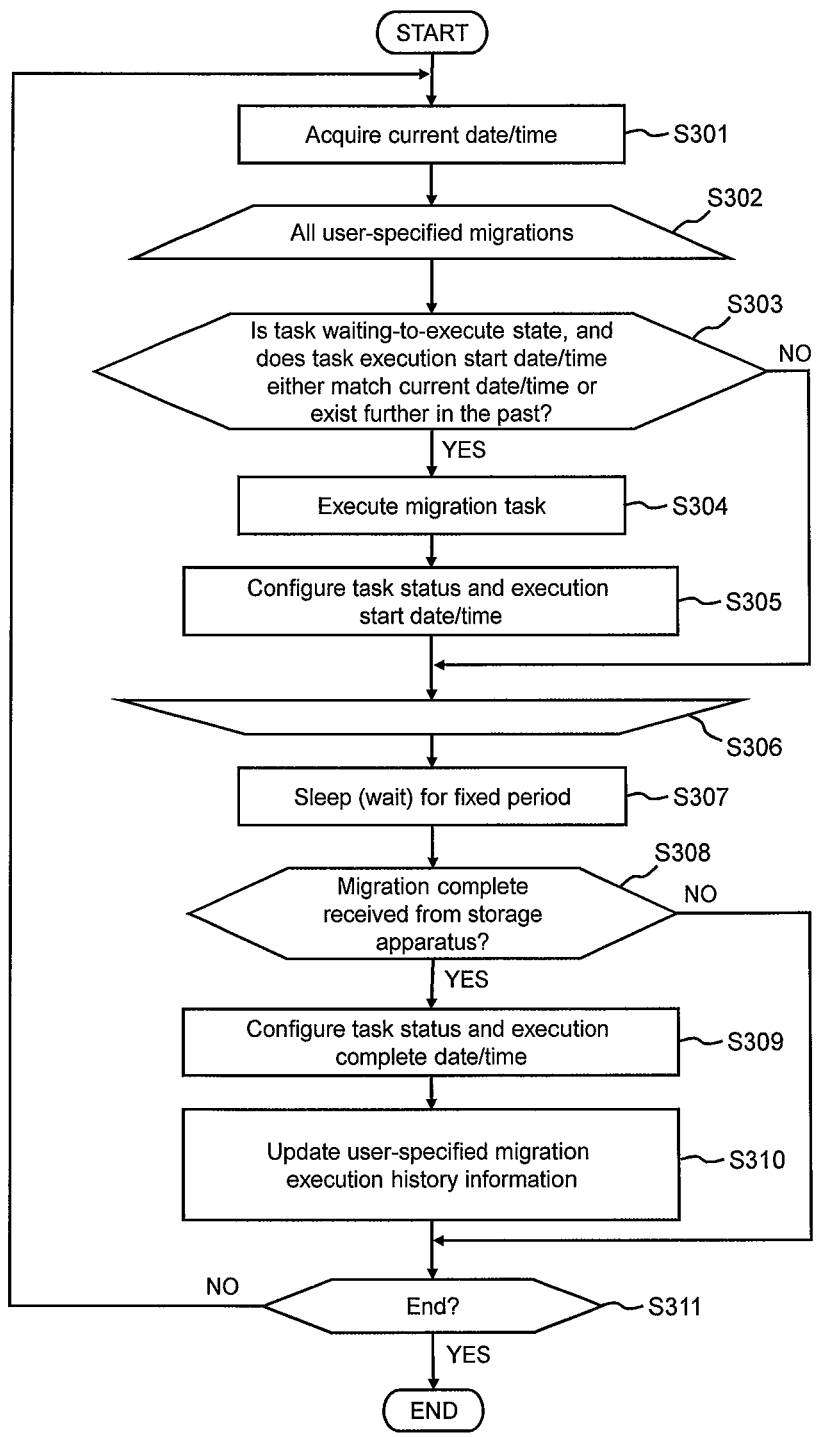
FIG. 18 is a flowchart of a migration task management process related to the example 1.

FIG. 18 is a flowchart of the migration task management process related to the example 1.

First, the migration task management program 122 acquires the current date and time (Step S301).

The migration task management program 122 executes the processing of Steps S302 through S306 for each user-specified migration task registered in the user-specified migration task management information 131. A processing-target user-specified migration task will be called "target task" hereinbelow.

The migration task management program 122 references the user-specified migration task management information 131 and determines whether or not the target task is a waiting-to-execute state, that is, the task status 1316 of the target task is configured to "waiting", and, in addition, the value of the target task execution start date/time 1317 is showing either the current date/time or a date/time prior to the current date/time (Step S303).

In a case where the target task is a waiting-to-execute state, and, in addition, the value of the target task execution start date/time 1317 is showing either the current date/time or a date/time prior to the current date/time (Step S303: YES), the migration task management program 122 executes the target task (Step S304). Specifically, the migration task management program 122 references the user-specified migration task management information 131, identifies information (migration-source volume, migration-source storage apparatus, migration-destination volume, and migration-destination storage apparatus) related to the user-specified migration to be executed in accordance with the target task, and instructs the migration-source storage apparatus and/or the migration-destination storage apparatus to execute the user-specified migration from the migration-source volume to the migration-destination volume. In a case where the target task collectively executes multiple user-specified migrations, the migration task management program 122 instructs the execution thereof to the target storage apparatus (es) 2 for each of the multiple user-specified migrations.

Thereafter, the migration task management program 122 configures the task status 1316 of the target task to "executing" and configures the current date/time in the execution start date/time 1317 of the target task in the user-specified migration management information 131 (Step S305).

Alternatively, in a case where either the target task is not in the waiting-to-execute state, or the value of the execution start date/time 1317 of the target task shows a date/time after the current date/time (Step S303: NO), the migration task management program 122 does not execute the target task.

The migration task management program 122 waits for a fixed period of time after ending the execution of the processing of Steps S302 through S306 for each user-specified migration task registered in the user-specified migration task management information 131 (Step S307).

Thereafter, when the executed user-specified migration task has been completed, that is, when a notification indicating that the task-executed user-specified migration (all of the user-specified migrations in the case of multiple user-specified migration,) is complete has been received from the storage apparatus 2 (Step S308: YES), the migration task management program 122 acquires the current date and time. Then the migration task management program 122 changes the task status 1316 of the completed task to "execution complete" in the user-specified migration task management information 131, and configures the acquired current date/time in the execution completion date/time 1318 for the completed task (Step S309). "When the user-specified migration task has been completed" signifies a case in which at the least one sub-task of multiple sub-tasks (for example, all sub-tasks) has been completed when the user-specified migration task comprises multiple sub-tasks. In Step S309, in a case where the sub-task status 1319 of a completed sub-task is changed to "normal completion", and, in addition, the statuses 1319 of all the sub-tasks comprising the user-specified migration task transition to "normal completion" for a single user-specified migration task, the task status 1316 of the relevant user-specified migration task changes to "execution completion".

Thereafter, the migration task management program 122 reflects the actual value of the user-specified migration(s) for which execution has been completed in the user-specified execution history information 132 (Step S310). Specifically, the migration task management program 122 adds the time required for the execution-completed user-specified migration(s) to the total value of execution time periods 1322, and adds the amount of data migrated in accordance with the execution-completed user-specified migration to the total value of migration data amounts 1323. The amount of data migrated in accordance with the user-specified migration, for example, is computed by multiplying the storage size of one LBA (for example, 512 bytes) by the total number of LBAs of the physical page 271 included in the migration-source volume. The time required for the user-specified migration, for example, is computed by subtracting the date/time shown in the execution start date/time 1317 from the date/time shown in the execution completion date/time 1318 of the corresponding user-specified migration task. In a case where the user-specified migration task comprises multiple sub-tasks, the date/time shown in the execution completion date/time 1318 of the user-specified migration task may be the execution completion date/time of the sub-task for which execution was completed last among the multiple sub-tasks, and the date/time shown in the execution start date/time 1317 may be the execution start date/time of the sub-task for which execution was started first among the multiple sub-tasks.

Either after ending the processing of Step S310, or when a notification indicating that a task-executed user-specified migration has been completed is not received from the storage apparatus 2 (Step S308: NO), the migration task management program 122 determines whether or not an end-program instruction has been received (Step S311).

In a case where an end-program instruction has not been received (Step S311: NO), the migration task management program 122 moves the processing to Step S301. That is, the migration task management program 122 once again performs the processing of Steps S301 through S311. The migration task management program 122 repeatedly executes the processing of Steps S301 through 311 until the end-program instruction is received, for example, for a fixed time interval.

Alternatively, in a case where the end-program instruction has been received (Step S311: YES), the migration task management program 122 ends the migration task management process.

Figure 19:
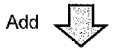
FIG. 19 is a block diagram of an example of a user-specified migration registration screen related to the example 1.

FIG. 19 is a block diagram of an example of a user-specified migration registration screen related to the example 1.

The user-specified migration registration screen 51 is a screen for receiving from the administrator the registration of a user-specified migration task to be executed in the migration task management process. The management computer 1 registers the contents of the registered user-specified migration task in the user-specified migration task management information 131 via the user-specified migration registration screen 51.

The user-specified migration registration screen 51 comprises an area 511 for receiving the input of a setting item related to a user-specified migration task, and an area 512 for displaying the contents of the user-specified migration to be executed in accordance with the user-specified migration task. The setting items related to the user-specified migration task, for example, comprise a task name, a task execution start date/time, and information related to a user-specified migration to be executed in accordance with the task (migration-source volume, migration-source storage apparatus, migration-destination volume, and migration-destination storage apparatus).

(5) Migration Suspend Process

A migration suspend process related to the example 1 will be explained below.

The suspend program 123 starts the execution of migration suspend processing in a case where a specification of either a stop-target storage apparatus 2 or a block-target storage area and an instruction to execute the migration suspend process has been received from the administrator on a migration suspend screen (refer to FIG. 20), which will be explained further below.

First, the suspend program 123 has the identification program 1231 execute an affected migration identification process (refer to FIG. 21) (Step S2401). An affected migration is identified in accordance with the affected migration identification process.

Next, the suspend program 123 has the UM required time computation program 1235 execute a user-specified migration required time computation process (Step S2402). An expected completion date/time for a user-specified migration task for executing an affected user-specified migration is computed in accordance with the user-specified migration required time computation process (refer to FIG. 28).

Next, the suspend program 123 has the PM required time computation program 1236 execute a inter-tier page migration required time computation process, which will be explained further below (Step S2403). An expected completion date/time for an affected inter-tier page migration is computed in accordance with the inter-tier page migration required time computation process.

Thereafter, the suspend program 123 displays information related to the affected migration on the migration suspend screen (refer to FIG. 20) (Step S2404). The suspend program 123 can receive an instruction to change a setting with respect to the affected migration via a change action screen (refer to FIGS. 23 and 25), which is booted from the migration suspend screen and will be explained further below.

As a setting change with respect to the affected migration, for example, there is the changing of an action with respect to the affected migration, and the changing of a post-suspend migration policy of the affected migration (at least one of a user-specified migration and an inter-tier page migration, which will be affected). As an action with respect to the affected migration, for example, there is a "suspend", which suspends the affected migration, and a "resume", which resumes the processing by changing the processing contents of the affected migration (for example, the migration-destination volume). For example, the memory 12 stores data showing an action with respect to each affected migration. The initial value of the action with respect to each affected migration may be uniformly set to "suspend" for all the actions, or, for example, an affected migration of high importance may be set to "resume" and an affected migration, which is not so important, may be set to "suspend". In this example, the importance of each migration (user-specified migration and inter-tier page migration), for example, is stored in the memory 12. The post-suspend migration policy of the affected inter-tier page migration refers to a policy showing how data stored in a storage area, which has become inaccessible in a case where a storage apparatus 2 has been stopped or a storage area has been blocked, is to be migrated to an accessible area. In this example, as the setting change with respect to the affected user-specified migration, it is supposed that an action is changed, and as the setting change with respect to the affected inter-tier page migration, it is supposed that the post-suspend migration policy is changed.

The "migration importance" here, for example, is based either on the importance of a host, which has an allocation to the migration-target volume (migration-source volume) of the user-specified migration (that is, the host, which accesses the migration-target volume), or the importance of a host, which has an allocation to a virtual volume related to an inter-tier pool, which is the implementation target of the inter-tier page migration. Then, "host importance", for example, may be the importance of an application running on the relevant host, and the host importance (for example, the importance of the application running on the relevant host) may be configured via a management screen of the management computer.

In a case where an instruction to change a setting with respect to the affected user-specified migration has been received, the suspend program 123 has the UM change instruction program 1232 execute a user-specified migration change instruction process (refer to FIG. 22) (Step S2405). A setting change with respect to the target affected user-specified migration (an action change) is performed in accordance with the user-specified migration change instruction process.

In a case where an instruction to change a setting with respect to the affected inter-tier page migration has been received, the suspend program 123 has the PM change instruction program 1233 execute an inter-tier page migration change instruction process (refer to FIG. 24) (Step S2406). A setting change with respect to the target affected inter-tier page migration (a post-suspend migration policy change) is performed in accordance with the inter-tier page migration change instruction process.

Thereafter, in a case where an instruction to execute an action with respect to the affected migration has been received from the administrator via the migration suspend screen (FIG. 20), the suspend program 123 executes the action with respect to the affected migration, that is, suspends the affected migration, which is regarded as the suspend target.

Specifically, the suspend program 123 has the suspend instruction program 1234 execute a user-specified migration suspend instruction process (refer to FIG. 26) (Step S2407). The affected user-specified migration regarded as the suspend target, that is, the affected user-specified migration for which the action is configured to "suspend" is suspended in accordance with the user-specified migration suspend instruction process.

The suspend program 123 has the suspend instruction program 1234 execute an inter-tier page migration suspend instruction process (refer to FIG. 27) (Step S2408). The affected inter-tier page migration regarded as the stop target, that is, the affected inter-tier page migration for which the action is configured to "suspend" is suspended in accordance with the inter-tier page migration suspend instruction process.

Figure 20:
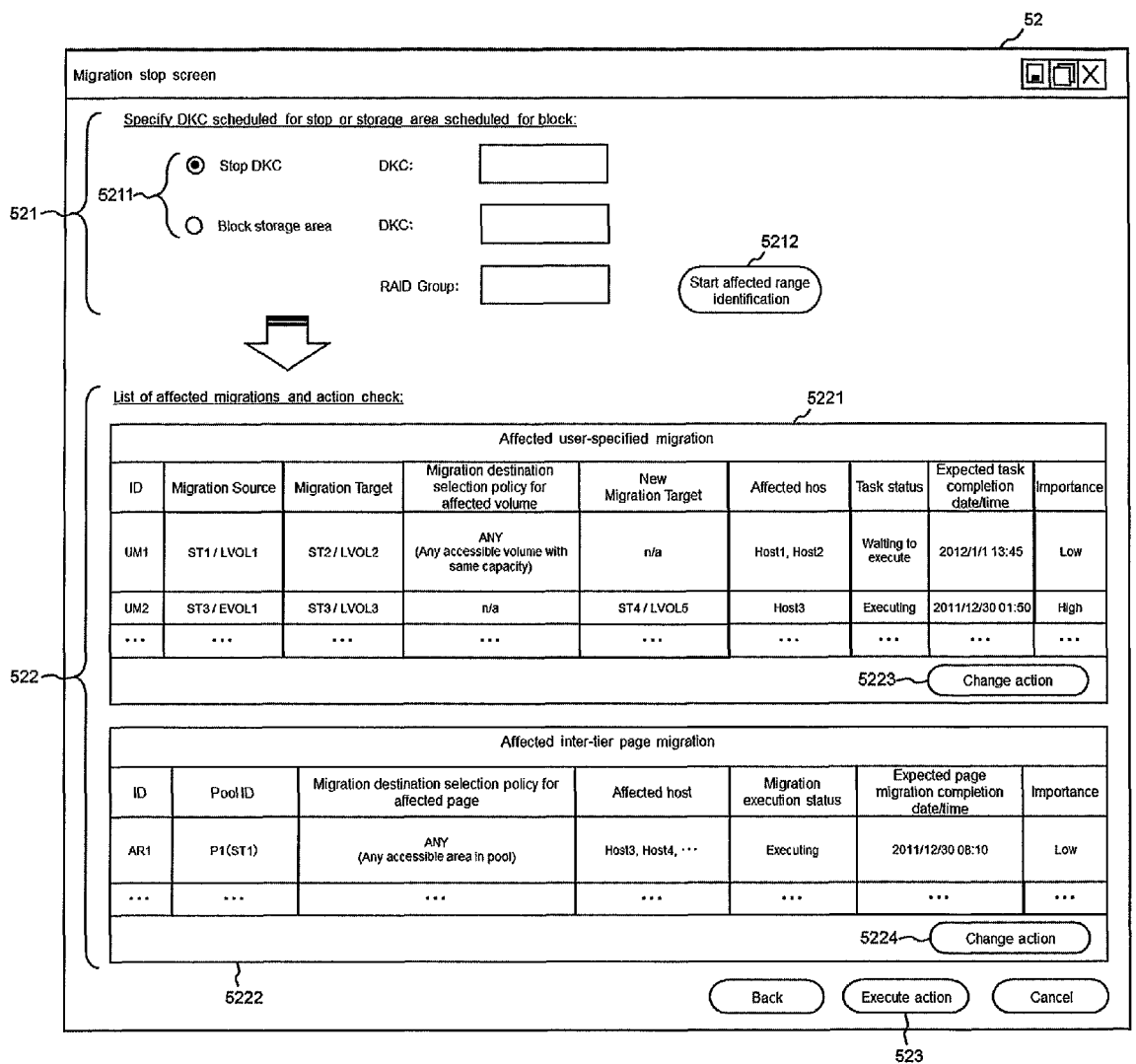
FIG. 20 is a block diagram of an example of a migration suspend screen related to the example 1.

FIG. 20 is a block diagram of an example of a migration suspend screen related to the example 1.

The migration suspend screen 52 is a screen for displaying various information related to migration suspend processing and receiving an instruction from the administrator. The management computer 1 receives a specification of either a stop-target storage apparatus 2 or a block-target storage area, and an instruction for executing a migration suspend process via the migration suspend screen 52. The management computer 1 displays information related to an affected migration on the migration suspend screen 52.

The migration suspend screen 52 comprises an area 521 for receiving a specification of either a stop-target storage apparatus 2 or a block-target storage area, and an instruction for executing an affected migration identification process, an area 522 for displaying information related to the affected migration, and an action execution button 523 for receiving an instruction to execute an action with respect to the affected migration. In this example, the specification of a block-target storage area, for example, is performed in RAID group 262 units. That is, the entire storage area included in a RAID group 262 specified in the area 521 constitutes the target of a block.

The specification of the block-target storage area in this example is performed in RAID group units, but as another specification method, this specification may be performed in storage device units or logical volume units.

When either a stop-target storage apparatus 2 or a block-target storage area is specified in the area 521 and an affected range identification start button 5212 is pressed, the management computer 1 starts to execute affected migration identification process. Thereafter, the management computer 1 displays information related to the affected migration in the area 522 in the Step S2404 of the migration suspend processing.

In the area 522, information 5221 related to an affected user-specified migration and information 5222 related to an affected inter-tier page migration, for example, are displayed using tables. The information 5221 related to the affected user-specified migration comprises a migration-source storage apparatus and a migration-source volume (Migration Source), a migration-destination storage apparatus and a migration-destination volume (Migration Target), migration destination selection policy for the affected volume, a post-change new migration-destination storage apparatus and migration-destination volume when resuming the affected user-specified migration (New Migration Target), an affected host 3, a task status, an expected task completion date/time, and an importance of the affected user-specified migration. The information 5222 related to the affected inter-tier page migration comprises a related pool 265 identifier, migration destination selection policy for the affected physical page 271, an affected host 3, an execution status of the affected inter-tier page migration, an expected completion date-time for the affected inter-tier page migration, and an importance of the affected inter-tier page migration. The expected task completion date/time is computed in a user-specified migration required time computation process for each task executing an affected user-specified migration. The expected completion date/time for the inter-tier page migration is computed in an inter-tier page migration required time computation process for each affected inter-tier page migration. The affected host 3 refers to the host 3, which accesses a volume related to an affected migration, and is identified based on the host management information 120. The volume related to an affected migration includes a migration-source volume of an affected user-specified migration, and a virtual volume 266 associated with the pool 265 in which an affected inter-tier page migration is performed.

Figure 23:
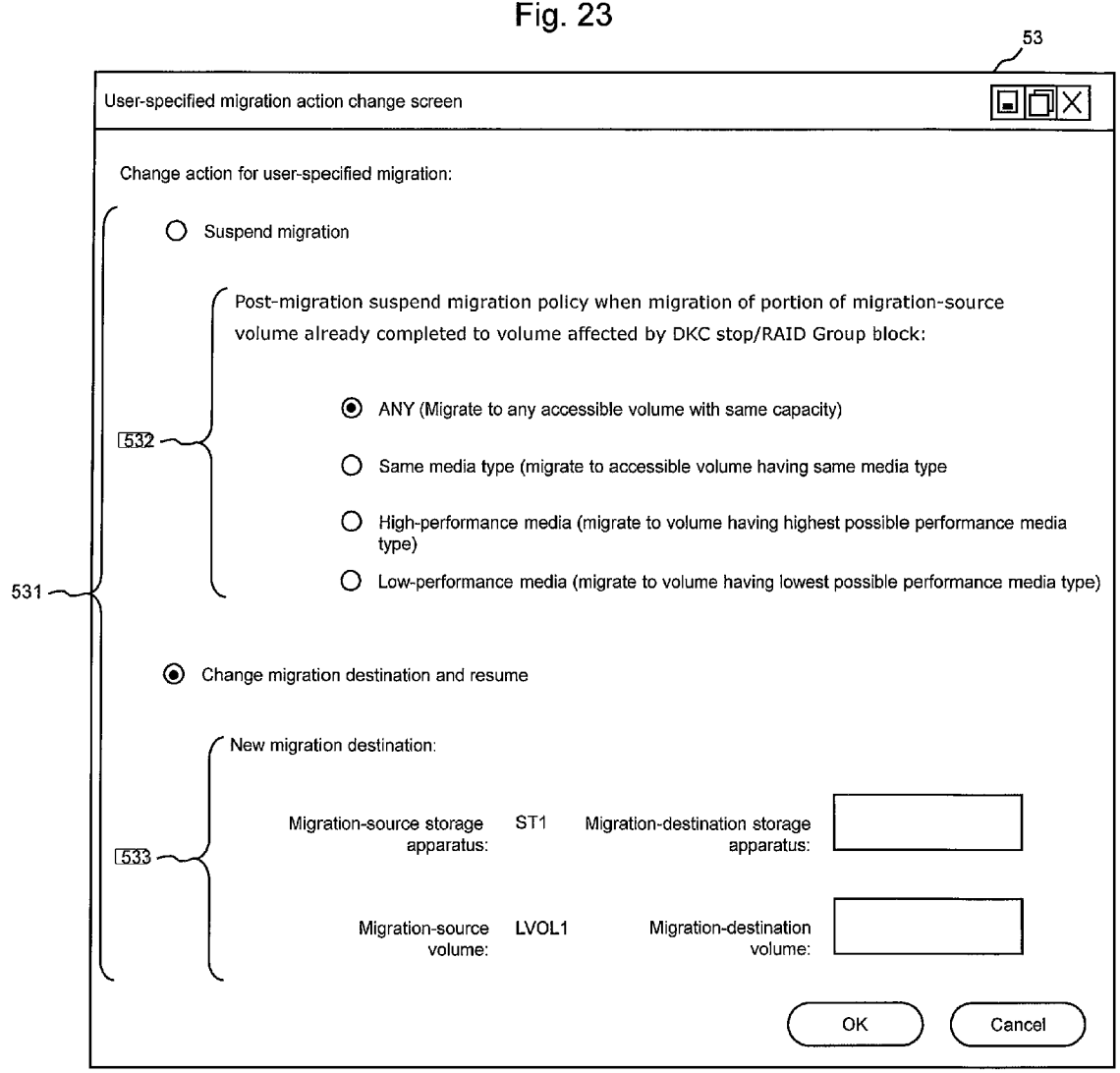
FIG. 23 is a block diagram of an example of a user-specified migration action change screen related to the example 1.
Figure 25:
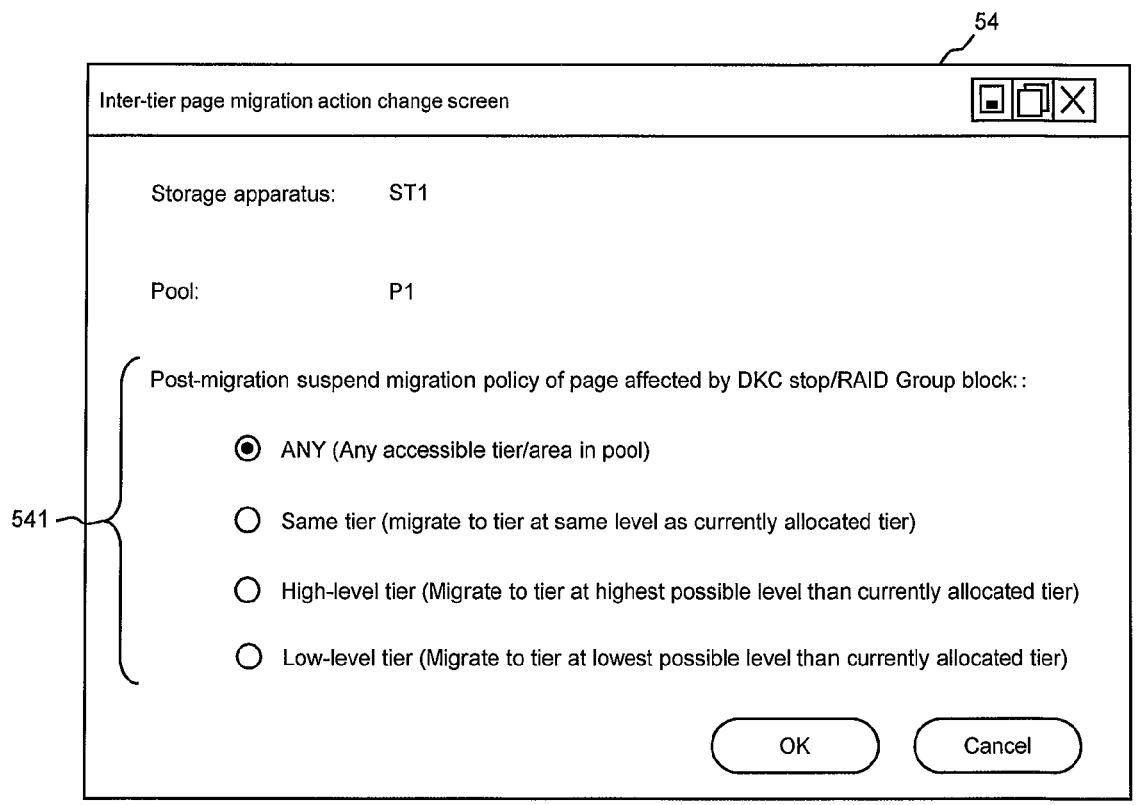
FIG. 25 is a block diagram of an example of an inter-tier page migration action change screen related to the example 1.

When the change action button 5223 is pressed in the area 522, the suspend program 123 displays a user-specified migration action change screen 53 (FIG. 23). The management computer 1 receives an instruction from the administrator to change a setting with respect to the affected user-specified migration via the user-specified migration action change screen 53. When the change action button 5224 is pressed in the area 522, the suspend program 123 displays an inter-tier page migration action change screen 54 (FIG. 25). The management computer 1 receives an instruction from the administrator to change a setting with respect to the affected inter-tier page migration via the inter-tier page migration action change screen 54.

When the execute action button 523 is pressed, the management computer 1 executes the action with respect to the affected migration, that is, suspends the affected migration, which is regarded as the suspend target.

Thus, in accordance with the information related to the affected migration being displayed on the migration suspend screen 52, the administrator is able to check the contents of the affected migration prior to stopping the storage apparatus 2 or blocking the storage area. For example, the contents of the action with respect to each affected migration may be displayed in the area 522. In accordance with displaying the contents of the action with respect to each affected migration, the administrator is able to check the contents of the action with respect to each affected migration, and to review whether or not to change the action based on the checked contents.

In accordance with the expected task completion date/time and the expected completion date/time of the inter-tier page migration being displayed in the area 522, the administrator, for example, is able to learn about how long to wait in a case where either the storage apparatus 2 will be stopped or the storage area will be blocked after waiting for the affected migration to be completed. That is, the administrator is able to either stop the storage apparatus 2 or block the storage area systematically. In accordance with the importance of an affected migration being displayed in the area 522, it is possible to either stop the storage apparatus 2 or block the storage area after waiting for the affected migration to be completed with respect to a highly important affected migration in particular.

(5-1) Affected Migration Identification Process

Figure 21:
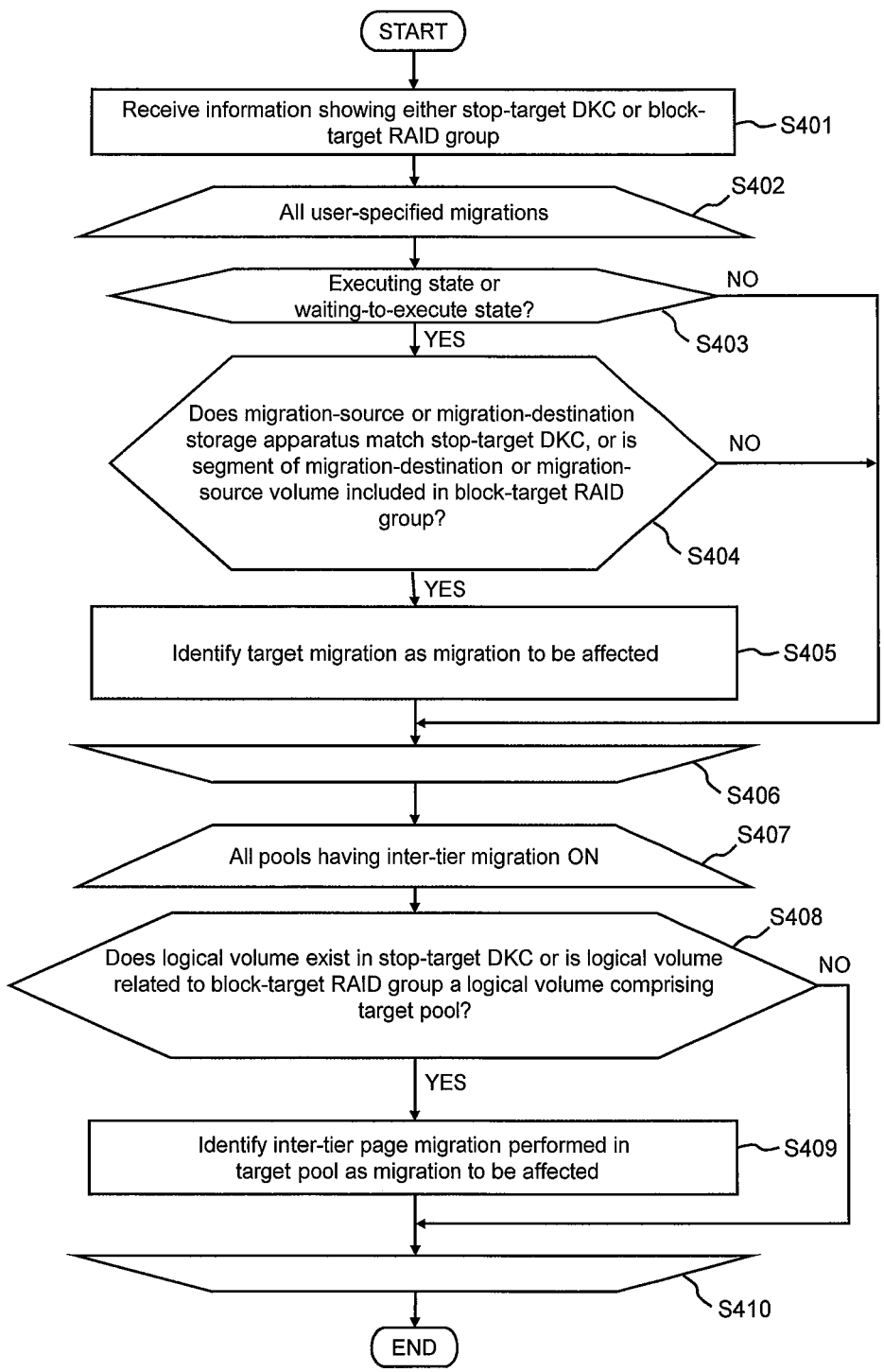
FIG. 21 is a flowchart of an affected migration identification process related to the example 1.

FIG. 21 is a flowchart of an affected migration identification process related to the example 1.

The identification program 1231 receives a parameter showing either a stop-target storage apparatus 2 or a block-target RAID group 262 specified by the administrator at the start of affected migration identification process execution (Step S401).

The identification program 1231 executes the processing of Steps S402 through S406 with respect to each user-specified migration task registered in the user-specified migration task management information 131. The user-specified migration task, which is the target of the processing, will be called the "target task" hereinbelow.

The identification program 1231 references the user-specified migration task management information 131 and determines whether or not the target task is an executing state or a waiting-to-execute state, that is, whether or not the task status 1316 of the target task is configured to "executing" or "waiting" (Step S403).

In a case where the target task is either an executing state or a waiting-to-execute state (Step S403: YES), the identification program 1231 determines whether or not the user-specified migration to be executed in accordance with the target task (hereinafter referred to as "target user-specified migration") is related to a stop-target storage apparatus 2 or a block-target RAID group 262 (Step S404). As used here, the expression user-specified migration is related to stop-target storage apparatus 2 refers to the fact that either the migration-source storage apparatus or the migration-destination storage apparatus of the user-specified migration corresponds to the stop-target storage apparatus 2. Furthermore, the expression user-specified migration is related to block-target RAID group 262 refers to the fact that any of the physical pages 271 comprising either the migration-source volume or the migration-destination volume of the user-specified migration are included in the block-target RAID group 262. The identification program 1231, in a case where the parameter received in Step S401 shows a stop-target storage apparatus 2, determines whether or not the target user-specified migration is related to the stop-target storage apparatus 2, and in a case where the parameter received in Step S401 shows a block-target RAID group 262, determines whether or not the target user-specified migration is related to the block-target RAID group 262.

Specifically, the identification program 1231 references the migration-source storage apparatus 1313 and the migration-destination storage apparatus 1315 of the user-specified migration task management information 131, identifies the migration-source storage apparatus and the migration-destination storage apparatus related to the target user-specified migration, and determines whether or not these storage apparatuses correspond to the stop-target storage apparatus 2. The identification program 1231 references the migration-source volume 1312 and the migration-destination volume 1314 of the user-specified migration task management information 131 and identifies the migration-source volume and the migration-destination volume related to the target user-specified migration. Then, the identification program 1231 references the logical volume ID 2241 and the physical page ID 2242 of the management-side logical volume management information 127, and the RAID group ID 2231 and the physical page ID 2232 of the management-side physical page management information 126, and, in accordance with determining whether or not any of the physical pages 271 comprising either the identified migration-source volume or migration-destination volume correspond to any of the physical pages 271 included in the block-target RAID group 262, determines whether or not any of the physical pages 271 comprising either the identified migration-source volume or migration-destination volume are included in the block-target RAID group 262.

In a case where the target user-specified migration is related to either the stop-target storage apparatus 2 or the block-target RAID group 262 (Step S404: YES), the identification program 1231 identifies the target user-specified migration as an affected user-specified migration (Step S405).

Alternatively, in a case where the target task is neither an executing state nor a waiting-to-execute state (Step S403: NO), or the parameter received in Step S401 shows a stop-target storage apparatus 2 but the target user-specified migration is not related to the stop-target storage apparatus 2, or the parameter received in Step S401 shows a block-target RAID group 262 but the target user-specified migration is not related to the block-target RAID group 262 (Step S404: NO), the identification program 1231 does not identify the target user-specified migration as an affected user-specified migration.

The identification program 1231, after ending the execution of the processing of Steps S402 through S406 for each of the user-specified migration tasks registered in the user-specified migration task management information 131, executes the processing of Steps S407 through S410 with respect to each of the pools 265 for which inter-tier page migration is valid among the pools 265 registered in the management-side pool management information 129, that is, the pools 265 for which the inter-tier page migration 2264 is configured to "ON". A processing-target pool 265 will be called "target pool" hereinbelow.

The identification program 1231 determines whether or not the target pool is related to either the stop-target storage apparatus 2 or the block-target RAID group 262. As used here, the expression pool 265 is related to the stop-target storage apparatus 2 refers to the fact that a logical volume 264 belonging to the stop-target storage apparatus 2 is included among the logical volumes 264 comprising the pool 265. Furthermore, the expression pool 265 is related to the block-target RAID group 262 refers to the fact that a logical volume 264 related to the block-target RAID group 262 is included among the logical volumes 264 comprising the pool 265. A logical volume 264 related to the block-target RAID group 262 here is a logical volume 264 corresponding to a LU 263 disposed in the block-target RAID group 262, and is a logical volume 264, which is comprised of physical pages 271 included in the block-target RAID group 262. The identification program 1231, in a case where the parameter received in Step S401 shows a stop-target storage apparatus 2, determines whether or not the target pool is related to the stop-target storage apparatus 2, and in a case where the parameter received in Step S401 shows a block-target RAID group 262, determines whether or not the target pool is related to the block-target RAID group 262.

Specifically, the identification program 1231 references the storage apparatus ID 1271 and the logical volume ID 2241 of the management-side logical volume management information 127, and identifies the logical volume 264, which exists in the stop-target storage apparatus 2. The identification program 1231 also references the logical volume ID 2241 and the physical page ID 2242 of the management-side logical volume management information 127, and the RAID group ID 2231 and the physical page ID 2232 of the management-side physical page management information 126 and identifies the logical volume 264 related to the block-target RAID group 262. Then, the identification program 1231 references the pool ID 2261 and the pool configuration logical volume ID 2262 of the management-side pool management information 129 and determines whether or not the identified logical volume 264 is a logical volume 244 comprising the target pool.

In a case where the target pool is related to either the stop-target storage apparatus 2 or the block-target RAID group 262 (Step S408: YES), the identification program 1231 identifies an inter-tier page migration performed by the target pool as an affected inter-tier page migration (Step S409).

Alternatively, in a case where the parameter received in Step S401 shows a stop-target storage apparatus 2 but the target pool is not related to the stop-target storage apparatus 2, or the parameter received in Step S401 shows a block-target RAID group 262 but the target pool is not related to the block-target RAID group 262 (Step S408: NO), the identification program 1231 does not identify the inter-tier page migration performed by the target pool as an affected inter-tier page migration.

The identification program 1231, after ending the execution of the processing of Steps S407 through S410 with respect to each pool 265 for which the inter-tier page migration is valid from among the pools 265 registered in the management-side pool management information 129, ends the affected migration identification process.

(5-2) User-Specified Migration Change Instruction Process

Figure 22:
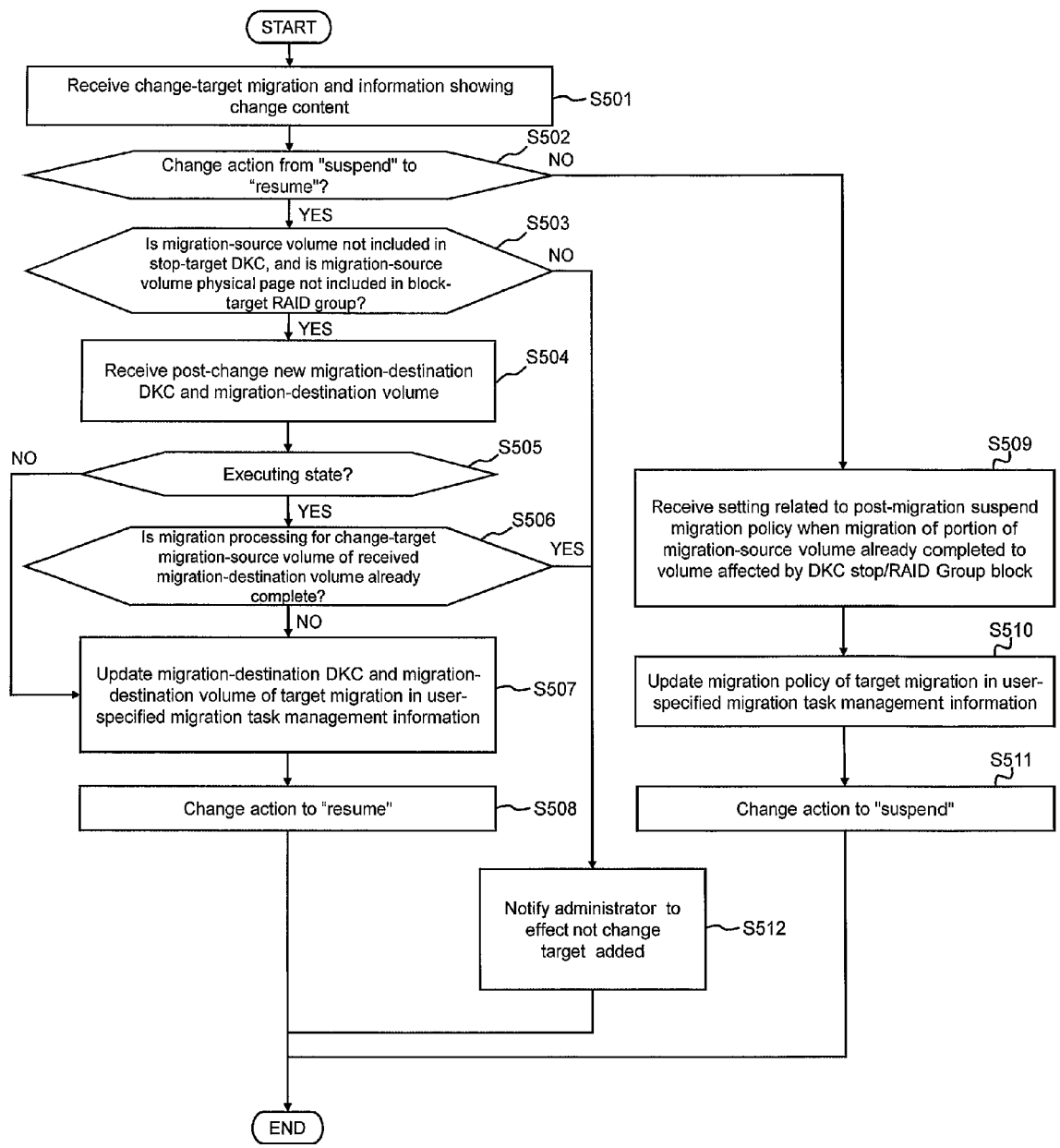
FIG. 22 is a flowchart of a user-specified migration change instruction process related to the example 1.

FIG. 22 is a flowchart of a user-specified migration change instruction process related to the example 1.

At the start of user-specified migration change instruction processing, the UM change instruction program 1232 receives a parameter, which comprises the identifier of an affected user-specified migration, which is targeted for a setting change (an action change) (hereinafter referred to as "target affected UM" in the explanation of FIG. 22), and information showing the content of a setting change inputted by the administrator in the user-specified migration action change screen 53 (refer to FIG. 23) (Step S501). The information showing the contents of the setting change, for example, comprises information showing whether the change is from "suspend" to "resume", or from "resume" to "suspend", and information for identifying the post-change migration-destination storage apparatus and the migration-destination volume in a case where the target affected UM is to resume.

First, the UM change instruction program 1232 determines whether or not the setting change with respect to the target affected UM is an action change from "suspend" to "resume" (Step S502).

In a case where the setting change with respect to the target affected UM is not an action change from "suspend" to "resume", that is, a case in which the setting change is an action change from "resume" to "suspend" (Step S502: NO), the UM change instruction program 1232 receives a setting related to a post-migration suspend migration policy when the migration of a portion of the data in the migration-source volume has already been completed to the affected volume (the logical volume to be affected by the DKC stop/RAID group block) (Step S509). Then, the UM change instruction program 1232 updates the migration-destination volume and the migration-destination storage apparatus in relation to the migration volume in the user-specified migration task management information 131 to the migration-destination volume and migration-destination storage apparatus, which conform to the migration policy of the target migration. For example, in a case where the migration policy is "same media type (migrate to accessible volume having same media type)", the UM change instruction program 1232 selects a logical volume, which is based on a storage device of the same type as the storage device constituting the basis of the migration-source volume and the storage apparatus comprising the relevant logical volume, and registers information regarding the selected migration-destination volume and migration-destination storage apparatus in the user-specified migration task management information 131. Next, the UM change instruction program 1232 changes the action with respect to the target affected UM to "suspend" (Step S511). Specifically, the UM change instruction program 1232, for example, stores data showing that the action with respect to the target affected UM is "suspend" in the memory 12. Thereafter, the UM change instruction program 1232 ends the user-specified migration change instruction process.

Alternatively, in a case where the setting change with respect to the target affected UM is an action change from "suspend" to "resume" (Step S502: YES), the UM change instruction program 1232 determines whether or not the migration-source volume is not included in the stop-target DKC, and, in addition, the physical page of the migration-source volume is not included in the block-target RAID group (Step S503).

In a case where the result of the determination in Step S503 is affirmative (Step S503: YES), the UM change instruction program 1232 references the information showing the contents of the setting change included in the parameter received in Step S501, and identifies the post-change migration-destination storage apparatus and migration-destination volume (Step S504).

Following S504, the UM change instruction program 1232 references the user-specified migration task management information 131 and determines whether or not the user-specified migration task for executing the target affected UM is the waiting-to-execute state, that is, whether or not the task status 1316 is configured to "waiting" (Step S505).

In a case where the user-specified migration task for executing the target affected UM is the waiting-to-execute state (Step S505: YES), the UM change instruction program 1232, based on the user-specified migration task management information 131, determines whether or not migration processing with respect to the change-target migration-source volume of the migration-destination volume received in S504 has already been completed (Step S506).

In a case where the user-specified migration task for executing the target affected UM is not the waiting-to-execute state (Step S505: NO), or the migration processing has not been completed yet (Step S506: NO), the UM change instruction program 1232 changes the values of the migration-destination storage apparatus 1315 and the migration-destination volume 1314 of the target affected UM to the identifiers of the migration-destination storage apparatus and the migration-destination volume identified in Step S505 in the user-specified migration task management information 131 (Step S507).

Thereafter, the UM change instruction program 1232 changes the action with respect to the target affected UM to "resume" (Step S508). Specifically, the UM change instruction program 1232, for example, stores data showing that the action with respect to the target affected UM is "resume" in the memory 12. Thereafter, the UM change instruction program 1232 ends the user-specified migration change instruction process.

In a case where the result of the determination in Step S503 is negative (Step S503: NO), or a case where the migration processing has already been completed (Step S506: YES), the UM change instruction program 1232 notifies the administrator to the effect that the target affected UM is not a target for a setting change (Step S512), and ends the user-specified migration change instruction process.

FIG. 23 is a block diagram of an example of a user-specified migration action change screen related to the example 1.

The user-specified migration action change screen 53 is a screen for receiving an instruction for changing a setting (action change) with respect to an affected user-specified migration from the administrator. The management computer 1 transfers information showing the contents of the setting change inputted via the user-specified migration action change screen 53 to the UM change instruction program 1232 as a parameter.

The user-specified migration action change screen 53 comprises an area 531 for receiving a specification as to whether the action with respect to the affected user-specified migration is to be set to "suspend" or "resume". The area 531 comprises an area 532 for receiving a post-suspend migration policy specification with respect to suspending the migration (for example, an administrator desired selection from among multiple migration policy selections), and an area 533 for receiving a specification for a post-change migration-destination storage apparatus and migration-destination volume when the affected user-specified migration is to resume.

In a case where the user-specified migration task comprises multiple volume migrations (sub-tasks), the "post-suspend migration policy" related to the area 532 is a policy for migrating data inside the affected volume to another accessible area (volume) after migration suspends in a case where a portion of the volume migrations has already been completed (normal completion) when migration suspends, and, in addition, the migration-destination volume of the normal-completion volume migration is in an area in a stop/block-target DKC. As the "migration policy", for example, as disclosed in FIG. 23, there is "ANY (Migrate to any accessible volume with same capacity)", "Same media type (migrate to accessible volume having same media type)", "High-performance media (migrate to volume having highest possible performance media type)", and "Low-performance media (migrate to volume having lowest possible performance media type)". Naturally, the migration policy is not limited to the policies mentioned above, and another policy can be used as the migration policy either instead of or in addition to at least one of the above-mentioned migration policies.

The user-specified migration action change screen 53 makes it possible for the administrator to change an action with respect to an affected user-specified migration.

Then, in a case where the affected user-specified migration is to resume, the administrator can input information to the area 533 denoting the desired migration-destination storage apparatus and migration-destination volume. For example, the administrator, in a case where the affected user-specified migration is to resume, can change the migration-destination volume to a logical volume 264, which will not be affected by the stopping of the storage apparatus 2 or the blocking of the storage area, that is, a logical volume 264, which does not exist in the stop-target storage apparatus 2 in a case where the storage apparatus is to be stopped, and a logical volume 264, which is not related to the block-target RAID group 262, in a case where the storage area is to be blocked.

According to a screen configuration like that shown in FIG. 23, a valid value is entered for only one item per UM in the columns "Policy selections for affected volume migration destination" and "New Migration Target" of the "Affected user-specified migration" 5221 of FIG. 20 in a user-specified migration setting change; other items are invalid values (n/a).

(5-3) Inter-Tier Page Migration Change Instruction Process

Figure 24:
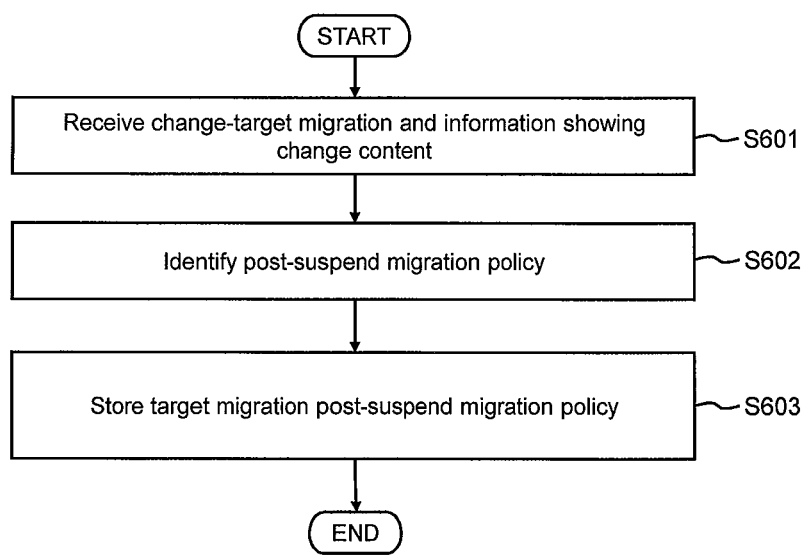
FIG. 24 is a flowchart of an inter-tier page migration change instruction process related to the example 1.

FIG. 24 is a flowchart of an inter-tier page migration change instruction process related to the example 1.

At the start of inter-tier page migration change instruction processing, the PM change instruction program 1233 receives a parameter comprising the identifier of an affected inter-tier page migration, which is targeted for a setting change (a post-suspend migration policy change) (hereinafter referred to as "target affected PM" in the explanation of FIG. 24), and information showing the content of a setting change inputted by the administrator to the inter-tier page migration action change screen 54 (FIG. 25) (Step S601). The information showing the contents of the setting change, for example, comprises information showing the post-suspend migration policy of the target affected PM.

The post-suspend migration policy of the affected inter-tier page migration here refers to a policy showing how data stored in a storage area, which has become inaccessible in a case where the storage apparatus 2 has been stopped or the storage area has been blocked, is to be migrated to an accessible area. In this example, as the post-suspend migration policy of the affected inter-tier page migration, for example, there is (a) a policy via which data may be migrated to any tier in the pool 265 where there is an accessible area, (b) a policy for migrating data as much as possible to an accessible area of a tier 2651 at the same level as the tier 2651 allocated when the inter-tier page migration is suspended, (c) a policy for migrating data to an accessible area of a tier 2651 at the highest possible level than the tier 2651 allocated when the inter-tier page migration is suspended, and (d) a policy for migrating data to an accessible area of a tier 2651 at the lowest possible level than the tier 2651 allocated when the inter-tier page migration is suspended. A policy other than the policies (a) through (d) may be used. For example, data showing the post-suspend migration policy for each affected inter-tier page migration is stored in the memory 12. The initial value of the post-suspend migration policy for each affected inter-tier page migration is configured, for example, in the policy (b).

First, the PM change instruction program 1233 references information showing the contents of the setting change included in the parameter received in Step S601, and identifies the post-suspend migration policy of the target affected PM (Step S602).

Next, the PM change instruction program 1233 stores data showing that the post-suspend migration policy of the target affected PM is the policy identified in Step S602, for example, as an entry in information for managing the post-suspend migration policy of the target affected PM in the memory 12 (Step S603). Thereafter, the PM change instruction program 1233 ends the inter-tier page migration change instruction process.

FIG. 25 is a block diagram of an example of an inter-tier page migration action change screen related to the example 1.

The inter-tier page migration action change screen 54 is the screen for receiving an instruction from the administrator to change a setting (post-suspend migration policy change) with respect to an affected inter-tier page migration. The management computer 1 transfers information showing the contents of the setting change inputted via the inter-tier page migration action change screen 54 to the PM change instruction program 1233 as a parameter.

The inter-tier page migration action change screen 54 comprises an area 541 for receiving a specification for a post-suspend migration policy for the affected inter-tier page migration. For example, multiple migration policies (for example, the policies from (a) through (d) mentioned above) are selectably displayed in the area 541.

(5-4) User-Specified Migration Suspend Instruction Process

Figure 26:
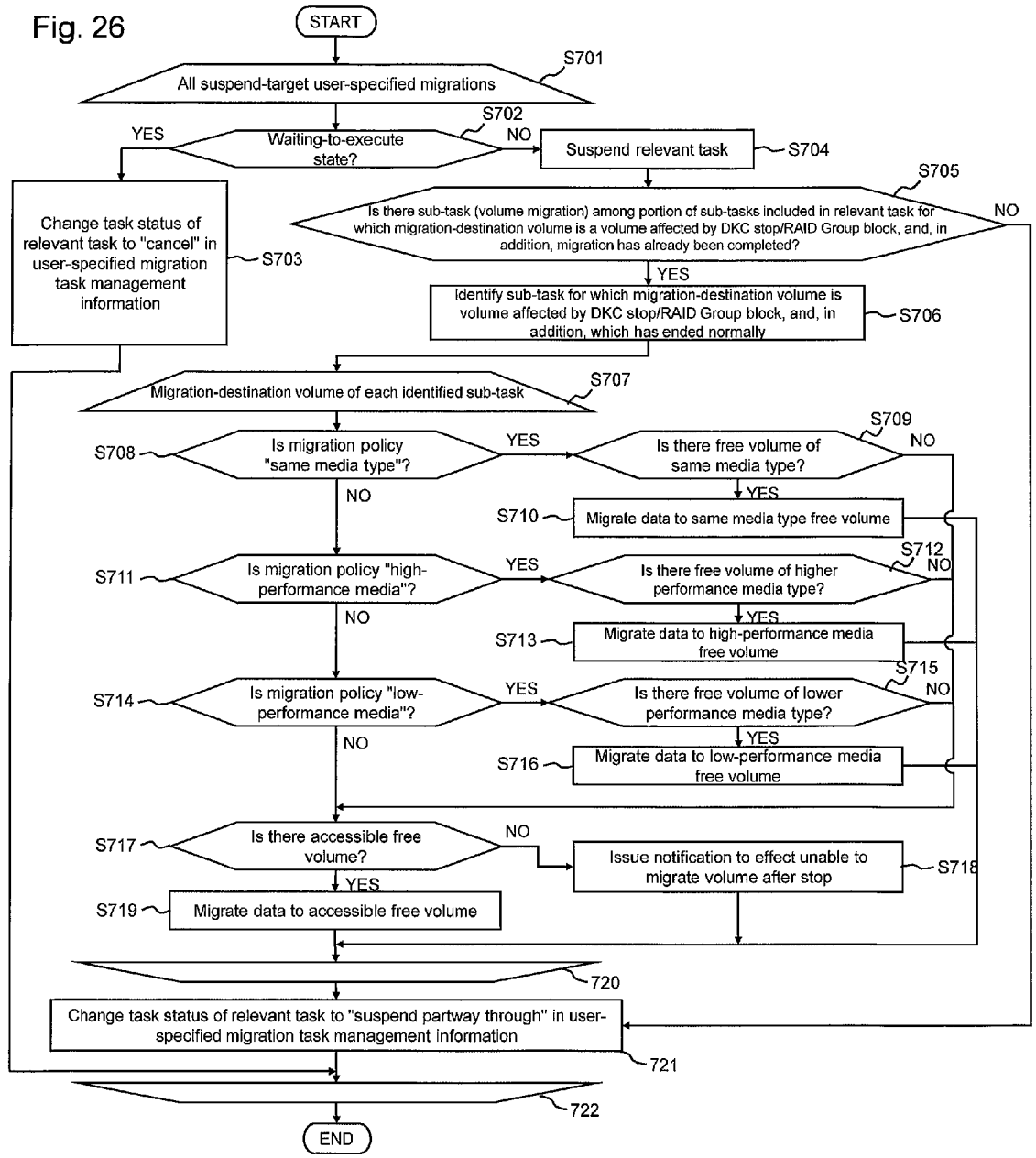
FIG. 26 is a flowchart of a user-specified migration suspend instruction process related to the example 1.

FIG. 26 is a flowchart of a user-specified migration suspend instruction process related to the example 1.

The suspend instruction program 1234 executes the processing of Steps S701 through S706 for each affected user-specified migration regarded as a suspend target, that is, each affected user-specified migration for which the action is configured to "suspend". In the explanation of FIG. 26 below, the processing-target affected user-specified migration will be called "target affected UM".

The suspend instruction program 1234 references the user-specified migration task management information 131 and determines whether or not the user-specified migration task for executing the target affected UM is the waiting-to-execute state, that is, whether or not the task status 1316 is configured to "waiting" (Step S702).

In a case where the user-specified migration task for executing the target affected UM is the waiting-to-execute state (Step S702: YES), the suspend instruction program 1234 changes the value of the task status 1316 of the user-specified migration task for executing the target affected UM to "cancel" in the user-specified migration task management information 131 (Step S703). A user-specified migration task for which the task status 1316 is configured to "cancel" like this is not executed even when the execution start date/time has elapsed.

Alternatively, in a case where the user-specified migration task for executing the target affected UM is not the waiting-to-execute state, that is, a case in which this migration task is the executing state (Step S702: NO), the suspend instruction program 1234 suspends the user-specified migration task for executing the target affected UM (Step S704). At this time, in a case where the suspended task is a task for executing multiple user-specified migrations, and there exists among the multiple user-specified migrations a user-specified migration for which processing was already completed prior to task suspension, the suspend instruction program 1234 cancels the processing of the user-specified migration for which processing was completed prior to the suspension, that is, performs a rollback.

The user-specified migration rollback, for example, is performed in accordance with canceling the interchange of configuration control information between the migration-source volume and the migration-destination volume, that is, by restoring the interchanged information to its original state. In a user-specified migration of this example, the data of the migration-source volume is unidirectionally replicated in the migration-destination volume, and the interchange of data between the migration-source volume and the migration-destination volume is not carried out. Therefore, the original data remains in the migration-source volume, and there is no need to cancel the data copy.

Thereafter, the suspend instruction program 1234, based on the user-specified migration task management information 131, determines whether or not a sub-task in which the migration-destination volume is a volume affected by the DKC stop/RAID group block, and, in addition, for which migration has already been completed exists among the portion of sub-tasks (volume migrations) included in the relevant task (Step S705). In a case where the result of the determination of Step S705 is negative (Step S705: NO), the suspend instruction program 1234 changes the value of the task status 1316 of the user-specified migration for executing the target affected UM to "suspend partway through" in the user-specified migration task management information 131 (Step S721).

Alternatively, in a case where the result of the determination of Step S705 is affirmative (Step S705: YES), the suspend instruction program 1234 identifies a sub-task in which the migration-destination volume is a volume affected by the DKC stop/RAID group block, and, in addition, for which migration has ended normally (Step S706). Then, Steps S708 through S719 are performed with respect to the migration-destination volume of each sub-task identified in Step S706 (Steps S707 and S720). That is, the suspend instruction program 1234 determines whether or not the migration policy is "same media type" (Step S708). In a case where the result of the determination of Step S708 is affirmative (Step S708: YES), the suspend instruction program 1234 determines whether or not there is a free volume (free logical volume), which is accessible, and, in addition, is based on a storage device of the same media type as the storage device constituting the basis of the migration-source volume (Step S709).

In a case where the result of the determination of Step S709 is affirmative (Step S709: YES), the suspend instruction program 1234 migrates the data from the migration-source volume to this free volume (Step S710).

In a case where the result of the determination of Step S708 is negative (Step S708: NO), the suspend instruction program 1234 determines whether or not the migration policy is "high-performance media" (Step S711).

In a case where the result of the determination of Step S711 is affirmative (Step S711: YES), the suspend instruction program 1234 determines whether or not there is a free volume, which is accessible, and, in addition, is based on a higher performance storage device than the storage device constituting the basis of the migration-source volume (Step S712).

In a case where the result of the determination of Step S712 is affirmative (Step S712: YES), the suspend instruction program 1234 migrates the data from the migration-source volume to the free volume (Step S713).

In a case where the result of the determination of Step S711 is negative (Step S711: NO), the suspend instruction program 1234 determines whether or not the migration policy is "low-performance media" (Step S714).

In a case where the result of the determination of Step S714 is affirmative (Step S714: YES), the suspend instruction program 1234 determines whether or not there is a free volume, which is accessible, and, in addition, is based on a lower performance storage device than the storage device constituting the basis of the migration-source volume (Step S715).

In a case where the result of the determination of Step S715 is affirmative (Step S715: YES), the suspend instruction program 1234 migrates the data from the migration-source volume to the free volume (Step S716).

In a case where the results of the determinations of Step S709, S712, S714, or S715 are negative (Step S709, S712, S714, or S715: NO), the suspend instruction program 1234 determines whether or not there is an accessible volume (S717).

In a case where the result of the determination of Step S717 is affirmative (Step S717: YES), the suspend instruction program 1234 migrates the data from the migration-source volume to the accessible free volume (S719).

In a case where the result of the determination of Step S717 is negative (Step S717: NO), the suspend instruction program 1234 issues a notification (for example, a display) to the effect "data inside migration-source volume cannot be migrated after suspend" (S718).

After Steps S708 through S719 have been performed for the migration-destination volume of each sub-task identified in S706 (Steps S707 and S720), the above-mentioned Step S721 is performed.

In the explanation of the embodiment, an accessible volume signifies a volume, which is not affected by the stopping of the storage apparatus or the blocking of a storage area (RAID group). That is, an accessible volume is a volume (a logical volume), which does not belong to a stop-target storage apparatus and is not comprised of a physical page belonging to a block-target RAID group. Whether or not the volume belongs to the relevant storage apparatus, and whether or not the volume comprises a physical page belonging to the relevant RAID group can be determined by referencing the logical volume management information and the physical page management information.

The suspend instruction program 1234 ends the user-specified migration suspend instruction process after ending the execution of the processing of Steps S701 through S722 for each affected user-specified migration regarded as a suspend target. In the above-described processing, any of S708, S711, and S714 may be determined beforehand.

(5-5) Inter-Tier Page Migration Suspend Instruction Process

Figure 27:
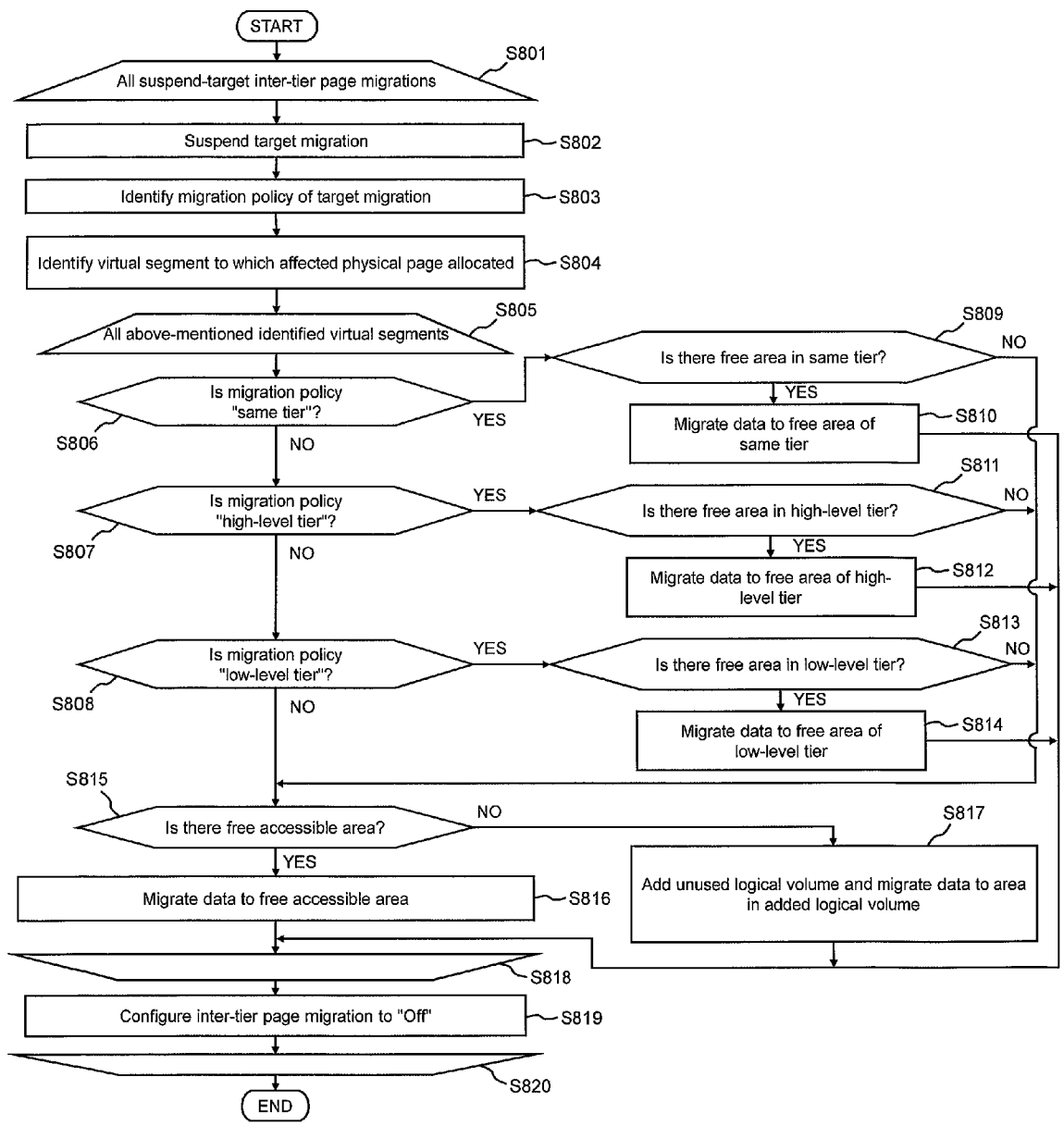
FIG. 27 is a flowchart of an inter-tier page migration suspend instruction process related to the example 1.

FIG. 27 is a flowchart of an inter-tier page migration suspend instruction process related to the example 1.

The suspend instruction program 1234 executes the processing of Steps S801 through S820 with respect to each affected inter-tier page migration for which the affected inter-tier page migration is regarded as a suspend target, that is, the action is configured to "suspend". Hereinafter, the processing-target affected inter-tier page migration will be called "target affected PM" in the explanation of FIG. 27.

First, the suspend instruction program 1234 suspends the target affected PM (Step S802). Specifically, the suspend instruction program 1234 instructs the storage apparatus 2 in which the pool 265 (hereinafter referred to as "target affected pool") in which the target affected PM is performed exists to suspend the target affected PM. The storage apparatus 2, which receives this instruction, suspends the target affected PM.

Next, the suspend instruction program 1234, for example, references data showing the migration policy stored in the memory 12 and identifies the post-suspend migration policy of the target affected PM (Step S803).

Next, the suspend instruction program 1234 references the management-side logical volume management information 127, the management-side virtual volume management information 128, and the management-side pool management information 129, and identifies a virtual segment 272 (first virtual segment) (hereinafter referred to as "target virtual segment") to which an affected physical page (first physical page) in the target affected pool is allocated (Step S804). The affected physical page here is a segment 271, which will become inaccessible in a case where either the storage apparatus 2 is stopped or a storage area is closed, and is a physical page 271 included in a logical volume 264 existing in the stop-target storage apparatus 2 in a case where the storage apparatus 2 is stopped, and is a physical page 271 included in a logical volume 264 related to the block-target RAID group 262 in a case where a storage area is blocked.

In a case where the allocation source of the affected virtual segment (the physical page 271 allocated to the affected virtual segment) is left as the affected physical page as-is, that is, the data of the affected virtual segment is stored as-is in the affected physical page, and either the storage apparatus 2 is stopped or the storage area is blocked, the host 3 will not be able to access the data in the affected virtual segment. To avoid this, the suspend instruction program 1234 performs the processing of the following Steps S805 through S818 and migrates the data of the affected virtual segment from the affected physical page to a physical page 271, which is not an affected physical page, that is, to a physical page 271, which will be accessible even after the storage apparatus 2 is stopped or the storage area is blocked.

In the explanation of the embodiment, an accessible physical page signifies a physical page, which is not affected by the storage apparatus being stopped or the storage area (RAID group) being blocked. That is, an accessible physical page is a physical page, which does not belong to the stop-target storage apparatus, and is a physical page, which does not belong to the block-target RAID group. Whether or not a physical page belongs to the relevant storage apparatus, and whether or not a physical page belongs to the relevant RAID group can be determined by referencing the physical page management information.

The suspend instruction program 1234 executes the processing of Steps S805 through S818 for each affected virtual segment identified in Step S804. The processing-target affected virtual segment will be called "target affected virtual segment" hereinbelow.

The suspend instruction program 1234 determines whether or not the post-suspend migration policy of the target effected PM is policy (b), that is, the policy for migrating data as much as possible to an accessible area of a tier 2651 at the same level as the tier 2651 allocated when the inter-tier page migration is suspended (Step S806).

In a case where the post-suspend migration policy of the target affected PM is policy (b) (Step S806:YES), the suspend instruction program 1234 determines whether or not there exists an unallocated physical page 271 (hereinafter referred to as "same tier free area"), which is not an affected physical page and which belongs to the same tier 2651 as the affected physical page allocated to the target affected virtual segment (Step S809).

In a case where a same tier free area exists (Step S809: YES), the suspend instruction program 1234 instructs the storage apparatus 2 in which the target affected pool exists to migrate the data of the target affected virtual segment to the same tier free area, and to change the allocation source of the target affected virtual segment (the physical page 271 allocated to the target affected virtual segment) to the relevant same tier free area (Step S810). The storage apparatus 2, which receives this instruction, migrates the data of the target affected virtual segment to the same tier free area. Then, this instruction-receiving storage apparatus 2 changes the allocation source of the target affected virtual segment to the same tier free area to which the data has been migrated by changing the value of the physical page ID 2254 corresponding to the target affected virtual segment in the ST-side virtual volume management information 225 to the identifier of the same tier free area to which the data has been migrated.

In a case where the post-suspend migration policy of the target affected PM is not policy (b) (Step S806: NO), the suspend instruction program 1234 determines whether or not the post-suspend migration policy of the target affected PM is policy (c), that is, the policy for migrating data to an accessible area of a tier 2651 at the highest possible level than the tier 2651 allocated when the inter-tier page migration is suspended (Step S807).

In a case where the post-suspend migration policy of the target affected PM is policy (c) (Step S807:YES), the suspend instruction program 1234 determines whether or not there exists an unallocated segment 271 (hereinafter referred to as "higher-level tier free area"), which is not the affected segment and which belongs to a tier 2651 of a higher level than the tier 2651 to which the affected segment allocated to the target affected virtual segment belongs (Step S811).

In a case where a higher-level tier free area exists (Step S811: YES), the suspend instruction program 1234 instructs the storage apparatus 2 in which the target affected pool exists to migrate the data of the target affected virtual segment to the higher-level tier free area, and to change the allocation source of the target affected virtual segment to the relevant higher-level tier free area (Step S812). The storage apparatus 2, which receives this instruction, migrates the data of the target affected virtual segment to the higher-level tier free area. Then, this instruction-receiving storage apparatus 2 changes the allocation source of the target affected virtual segment to the higher-level tier free area to which the data has been migrated by changing the value of the physical page ID 2254 corresponding to the target affected virtual segment in the ST-side virtual volume management information 225 to the identifier of the higher-level tier free area to which the data has been migrated.

In a case where the post-suspend migration policy of the target affected PM is not policy (c) (Step S807: NO), the suspend instruction program 1234 determines whether or not the post-suspend migration policy of the target affected PM is policy (d), that is, the policy for migrating data to an accessible area of a tier 2651 at the lowest possible level than the tier 2651 allocated when the inter-tier page migration suspends (Step S808).

In a case where the post-suspend migration policy of the target affected PM is policy (d) (Step S808:YES), the suspend instruction program 1234 determines whether or not there exists an unallocated physical page 271 (hereinafter referred to as "lower-level tier free area"), which is not the affected physical page and which belongs to a tier 2651 of a lower level than the tier 2651 to which the affected physical page allocated to the target affected virtual segment belongs (Step S813).

In a case where a lower-level tier free area exists (Step S813: YES), the suspend instruction program 1234 instructs the storage apparatus 2 in which the target affected pool exists to migrate the data of the target affected virtual segment to the lower-level tier free area, and to change the allocation source of the target affected virtual segment to the relevant lower-level tier free area (Step S814). The storage apparatus 2, which receives this instruction, migrates the data of the target affected virtual segment to the lower-level tier free area. Then, this instruction-receiving storage apparatus 2 changes the allocation source of the target affected virtual segment to the lower-level tier free area to which the data has been migrated by changing the value of the physical page ID 2254 corresponding to the target affected virtual segment in the ST-side virtual volume management information 225 to the identifier of the lower-level tier free area to which the data has been migrated.

In a case where the post-suspend migration policy of the target affected PM is not policy (d) (Step S808: NO), a case where a same tier free area does not exist (Step S809: NO), a case where a higher-level tier free area does not exist (Step S811: NO), or a case where a lower-level tier free area does not exist (Step S813: NO), the suspend instruction program 1234 determines whether or not an unallocated physical page 271, which is not an affected physical page (hereinafter referred to as "free accessible area") exists in the target affected pool (Step S815).

In a case where a free accessible area exists (Step S815: YES), the suspend instruction program 1234 instructs the storage apparatus 2 in which the target affected pool exists to migrate the data of the target affected virtual segment to the free accessible area, and to change the allocation source of the target affected virtual segment to the relevant free accessible area (Step S816). The storage apparatus 2, which receives this instruction, migrates the data of the target affected virtual segment to the free accessible area. Then, this instruction-receiving storage apparatus 2 changes the allocation source of the target affected virtual segment to the free accessible area to which the data has been migrated by changing the value of the physical page ID 2254 corresponding to the target affected virtual segment in the ST-side virtual volume management information 225 to the identifier of the free accessible area to which the data has been migrated.

Alternatively, in a case where a free accessible area does not exist (Step S815: NO), the suspend instruction program 1234 notifies the administrator to the effect that a free accessible area does not exist in the target affected pool. Then, the suspend instruction program 1234 instructs the storage apparatus 2 in which the target affected pool exists to add an unused logical volume 264 to the target affected pool, to migrate the data of the target affected virtual segment to a physical page 271 (hereinafter referred to as "added segment") included in the added logical volume 264, and to change the allocation source of the target affected virtual segment to the relevant added segment (Step S817). The storage apparatus 2, which receives this instruction, migrates the data of the target affected virtual segment to the added segment. Then, this instruction-receiving storage apparatus 2 changes the allocation source of the target affected virtual segment to the added segment to which the data has been migrated by changing the value of the physical page ID 2254 corresponding to the target affected virtual segment in the ST-side virtual volume management information 225 to the identifier of the added segment to which the data has been migrated. The logical volume 264, which has been added to the target affected pool, is a logical volume 264, which is not affected by either the storage apparatus 2 being stopped or the storage area being blocked, that is, a logical volume 264, which does not belong to the stop-target storage apparatus 2 in a case where the storage apparatus 2 is stopped, and a logical volume 264, which is not related to the block-target RAID group 262 in a case where the storage area is blocked.

The suspend instruction program 1234, after ending the execution of the processing of Steps S805 through S818 for all the target virtual segments identified in Step S804, instructs the storage apparatus 2 in which the target affected pool exists to change the value of the inter-tier page migration 2264 of the target affected pool in the ST-side pool management information 226 to "OFF" (Step S819). The storage apparatus 2, which receives this instruction, changes the value of the inter-tier page migration 2264 of the target affected pool in the ST-side pool management information 226 to "OFF". The management-side pool management information 129 is also updated to the same data as that of the ST-side pool management information 226.

The suspend instruction program 1234 ends the inter-tier page migration suspend instruction process after ending the execution of the processing of Steps S801 through S820 for all the affected inter-tier page migrations regarded as suspend targets.

After migrating the data of the target affected virtual segment and changing the allocation source of the target affected virtual segment in Steps S810, S812, S814, S816, and S817, the storage apparatus 2, which received the instruction, in the ST-side physical page management information 223, changes the allocation status 2234 of the physical page 271 allocated up until then to the target affected virtual segment to "unallocated", and changes the allocation status 2234 of the physical page 271 allocated anew to the target affected virtual segment to "allocated". The management-side virtual volume management information 128 and the management-side physical page management information 126 are also updated to the same data as the ST-side virtual volume management information 225 and the ST-side physical page management information 223.

(5-6) User-Specified Migration Required Time Computation Process

Figure 28:
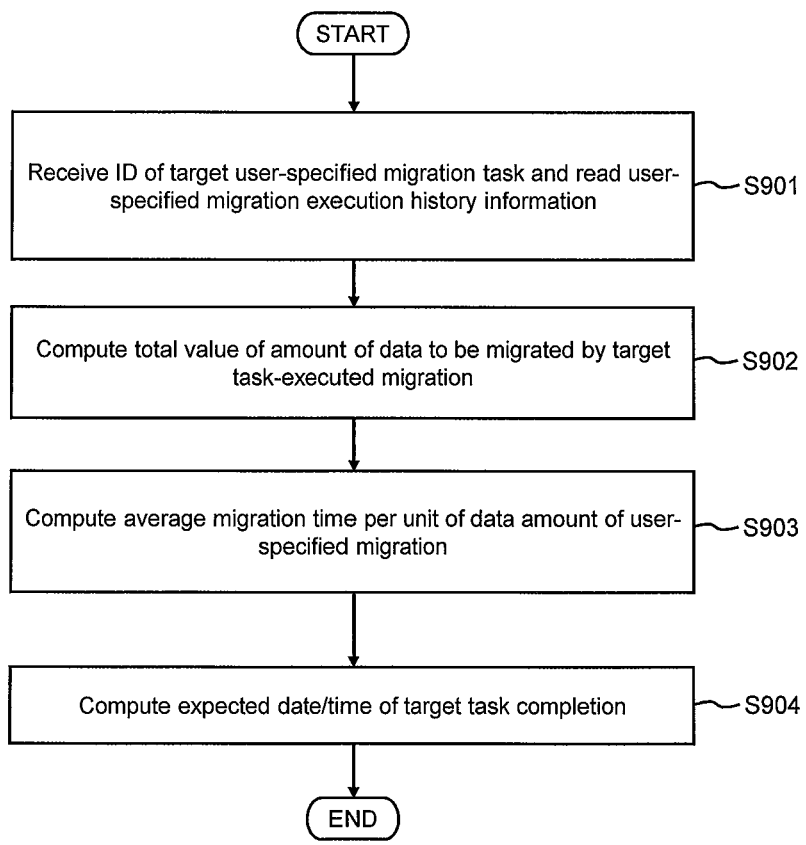
FIG. 28 is a flowchart of a user-specified migration required time computation process related to the example 1.

FIG. 28 is a flowchart of a user-specified migration required time computation process related to the example 1.

The UM required time computation program 1235 receives a parameter comprising the identifier of a user-specified migration task (hereinafter referred to as "computation target task") constituting the target of computation processing when the user-specified migration required time computation process starts. The UM required time computation program 1235 reads the user-specified migration execution history information 132 (Step S901).

Next, the UM required time computation program 1235 computes the total value of the amount of data to be migrated in accordance with the user-specified migration (hereinafter referred to as "computation target UM"), which the computation target task executes (Step S902).

Thereafter, the UM required time computation program 1235 computes an average migration time per unit of amount of data of the user-specified migration (Step S903). The average migration time per unit of amount of data of the user-specified migration, for example, is obtained by dividing the value of the total value of execution time periods 1322 in the user-specified migration execution history information 132 by the value of the total value of migration data amounts 1323.

Thereafter, the UM required time computation program 1235 computes the time expected to be needed for the computation-target UM, and computes the expected completion date/time of the computation-target task (Step S904). The time expected to be needed for the computation-target UM, for example, is obtained by multiplying the average migration time per unit of amount of data of the user-specified migration computed in Step S903 by the total value of the amount of data computed in Step S902. The expected completion date/time of the computation-target task is obtained by adding the expected time needed for the computation-target UM to the task execution start date/time.

(5-7) Inter-Tier Page Migration Required Time Computation Process

An inter-tier page migration required time computation process related to the example 1 will be explained hereinbelow.

The PM required time computation program 1236 receives a parameter comprising the identifier of an inter-tier page migration (hereinafter referred to as "computation target PM") constituting the target of computation processing when the inter-tier page migration required time computation process starts. The PM required time computation program 1236 reads the inter-tier page migration execution history information 133 (Step S2501).

Next, the PM required time computation program 1236 computes the used capacity of the pool 265, in which the computation-target PM is performed (Step S2502).

Thereafter, the PM required time computation program 1236 computes an average migration time per unit of amount of data of the inter-tier page migration (Step S2503). The average migration time per unit of amount of data of the inter-tier page migration, for example, is obtained by dividing the value of the total value of execution time periods 1322 in the inter-tier page migration execution history information 133 by the value of the total value of migration data amounts 1323.

Thereafter, the PM required time computation program 1236 computes the time expected to be needed for the computation-target PM, and computes the expected completion date/time of the computation-target PM (Step S2504). The time expected to be needed for the computation-target PM, for example, is obtained by multiplying the average migration time per unit of amount of data of the inter-tier page migration computed in Step S2503 by the used capacity computed in Step S2502. The expected completion date/time of the computation-target PM, for example, is obtained by adding the expected time needed for the computation-target PM to the execution start date/time of the computation-target PM.

(6) Performance Information Acquisition Process

Figure 29:
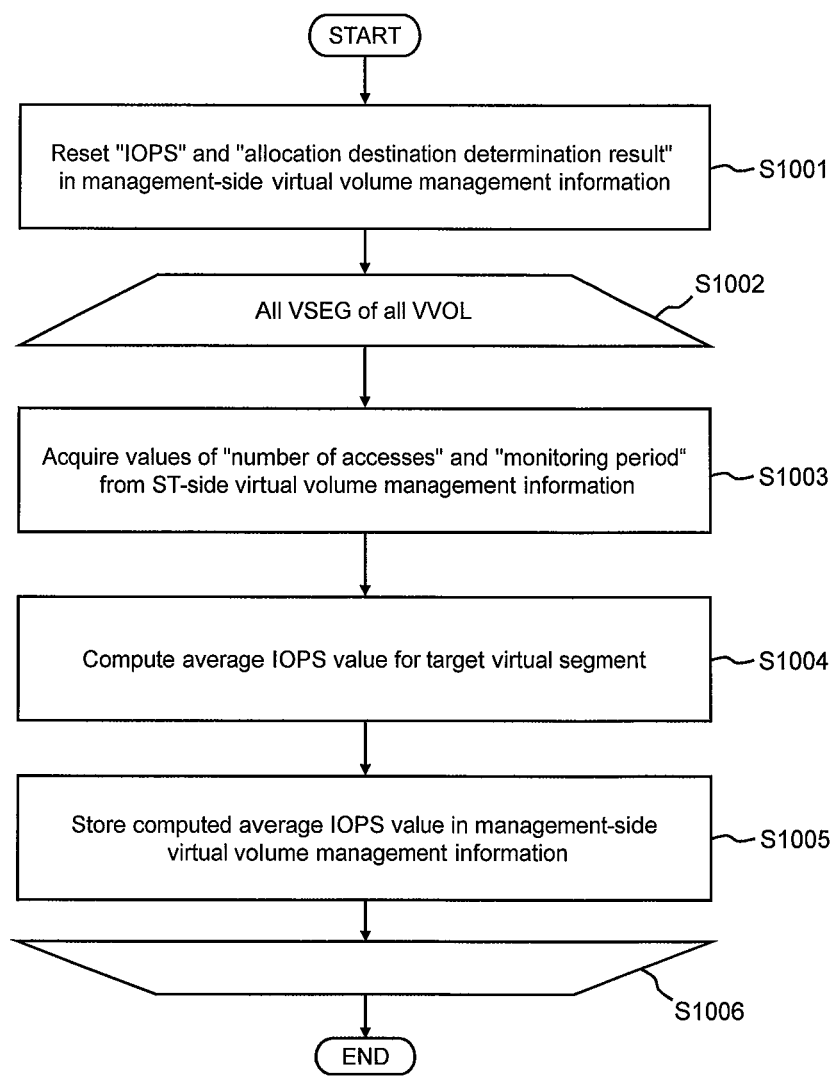
FIG. 29 is a flowchart of a performance information acquisition process related to the example 1.

FIG. 29 is a flowchart of a performance information acquisition process related to the example 1.

First, the performance information acquisition program 1211 resets the value of the IOPS 1286 and the value of the reallocation destination determination result 1287 of the management-side virtual volume management information 128 (Step S1001).

The performance information acquisition program 1211 executes the processing of Steps S1002 through S1006 for each virtual segment 272 of each virtual volume 266. The processing-target virtual segment 272 will be called "target virtual segment" hereinbelow.

The configuration management program 121 acquires the value of the number of accesses 2255 and the value of the monitoring period 2256 corresponding to the target virtual segment from the ST-side virtual volume management information 225 (Step S1003). For example, the configuration management program 121 sends a request to the storage apparatus 2 requesting information on the number of accesses corresponding to the target virtual segment. This request comprises the identifier of the target virtual segment.

The performance information acquisition program 1211 computes an average IOPS value for the target virtual segment based on the number of accesses and monitoring period of the target virtual segment (Step S1004). The performance information acquisition program 1211 stores the computed average IOPS value in the IOPS 1286 corresponding to the target virtual segment in the management-side virtual volume management information 128 (Step S1005).

The performance information acquisition program 1211 ends the performance information acquisition process after ending the processing of Steps S1002 through S1006 for each virtual segment 272 of each virtual volume 266.

(7) Reallocation Process

Figure 30:
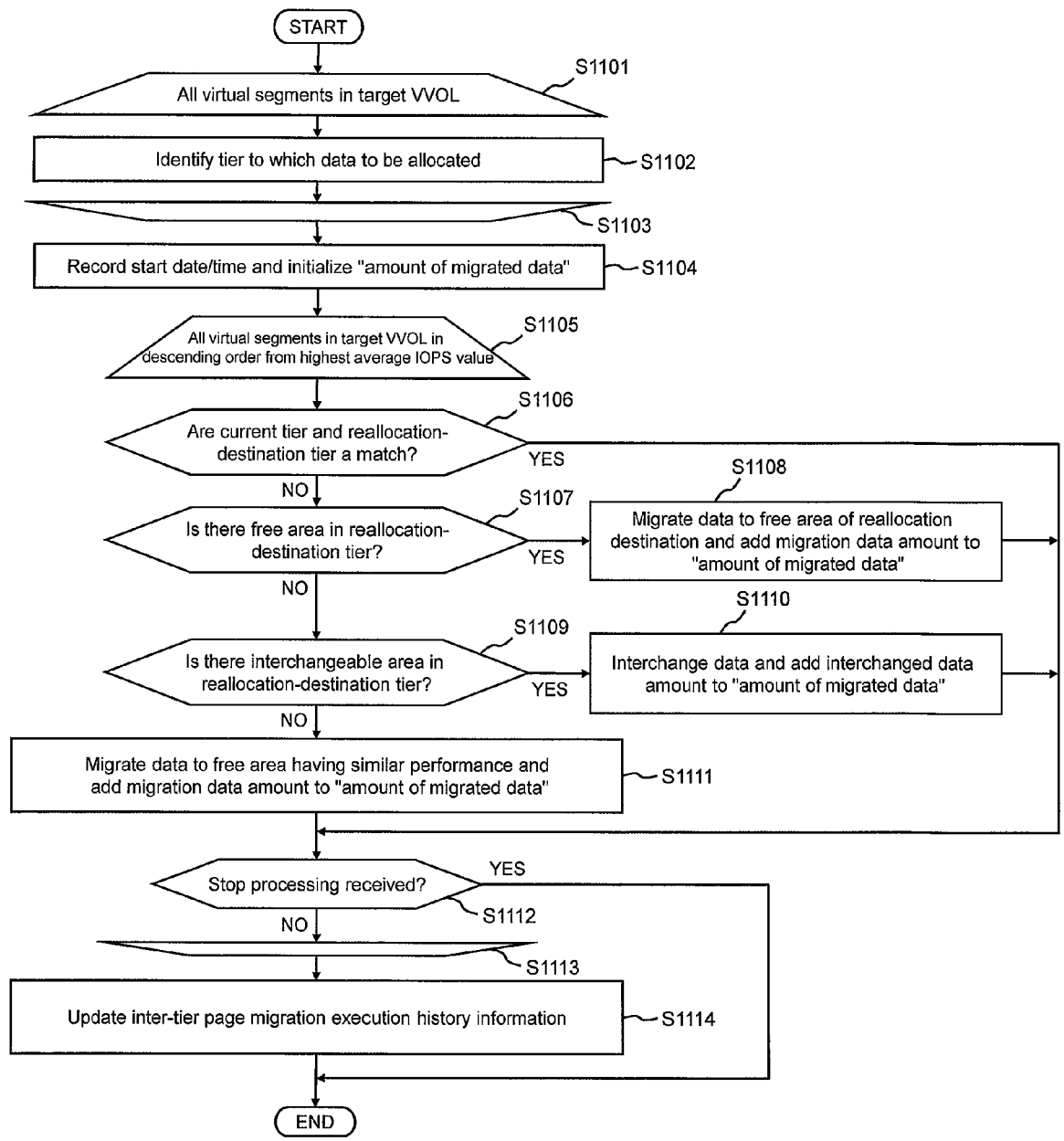
FIG. 30 is a flowchart of a reallocation process related to the example 1.

FIG. 30 is a flowchart of a reallocation process related to the example 1.

First, the reallocation program 1212 references the management-side virtual volume management information 128 and the management-side pool management information 129, and identifies a virtual volume 266 (hereinafter "target virtual volume") constituting the target of a reallocation process. The target virtual volume here is a virtual volume 266, which is associated with a pool 265 for which an inter-tier page migration is valid, that is, a virtual volume 266 to which is allocated a physical page 271 included in a pool 265 for which the inter-tier page migration 2264 of the management-side pool management information 129 is configured to "ON".

The reallocation program 1212 executes the processing of Steps S1101 through S1103 for each virtual segment 272 of the target virtual volume. The processing-target virtual segment 272 will be called "target virtual segment" hereinbelow.

The reallocation program 1212 identifies a tier 2651 to be allocated to the target virtual segment (Step S1102). Specifically, the reallocation program 1212 acquires the average IOPS value for the target virtual segment from the management-side virtual volume management information 128, references the allocation condition 1244 in the tier management information 124, and identifies the tier 2651 having the allocation condition, which comprises the acquired average IOPS value within its range. This identified tier 2651 is the tier 2651 to be allocated to the target virtual segment. The reallocation program 1212 stores the identifier of the identified tier 2651 in the reallocation destination determination result 1287 corresponding to the target virtual segment in the management-side virtual volume management information 128. The identified tier 2651 may be the same tier 2651 to which the physical page 271 allocated to the target virtual segment belongs, or may be a different tier 2651.

The reallocation program 1212 stores the start date/time of the reallocation process, for example, in the memory 12 after ending the execution of the processing of Steps S1101 through S1103 for each virtual segment 272 in the target virtual volume. The reallocation program 1212, for example, initializes (clears to zero) the value of a variable "amount of migrated data" stored in the memory 12 (Step S1104). The start date/time of the reallocation process is used for computing the time required to migrate data in the reallocation process, and the variable "amount of migrated data" is used for computing the total value of the amounts of data migrated in accordance with the reallocation process.

The reallocation program 1212 executes the processing of Steps S1105 through S1113 in descending order from the highest average IOPS value for each virtual segment 272 in the target virtual volume. The processing-target virtual segment 272 will be called "target virtual segment" hereinbelow.

The reallocation program 1212 determines whether or not the tier 2651 (hereinafter referred to as "current tier") to which the physical page 271 allocated to the target virtual segment belongs matches the tier 2651 (hereinafter referred to as "reallocation-destination tier") shown by the reallocation destination determination result 1287 corresponding to the target virtual segment in the management-side virtual volume management information 128 (Step S1106).

In a case where the current tier and the reallocation-destination tier are a match (Step S1106: YES), it is not necessary to migrate the data of the target virtual segment. The reallocation program 1212 advances the processing to Step S1112.

Alternatively, in a case where the current tier and the reallocation-destination tier do not match (Step S1106: NO), the reallocation program 1212 references the management-side physical page management information 126, and determines whether or not an unallocated physical page 271 exists in the reallocation-destination tier (Step S1107).

In a case where an unallocated physical page 271 exists in the reallocation-destination tier (Step S1107: YES), the reallocation program 1212 instructs the storage apparatus 2, which provides the target virtual volume, to migrate the data of the target virtual segment to the unallocated physical page 271 (hereinafter referred to as "reallocation-destination free area") in the reallocation-destination tier, and to change the allocation source of the target virtual segment to the relevant reallocation-destination free area (Step S1108). The storage apparatus 2, which receives this instruction, migrates the data of the target virtual segment to the reallocation-destination free area. Then, this instruction-receiving storage apparatus 2 changes the allocation source of the target virtual segment to the reallocation-destination free area to which the data has been migrated by changing the value of the physical page ID 2254 corresponding to the target virtual segment in the ST-side virtual volume management information 225 to the identifier of the reallocation-destination free area to which the data has been migrated. Also, this instruction-receiving storage apparatus 2, in the ST-side physical page management information 223, changes the allocation status 2234 of the physical page 271 allocated up until then to the target virtual segment to "unallocated", and changes the allocation status 2234 of the physical page 271 allocated anew to the target virtual segment to "allocated". The management-side virtual volume Management information 128 and the management-side physical page management information 126 are also updated to the same data as the ST-side virtual volume management information 225 and the ST-side physical page management information 223.

The reallocation program 1212 adds the amount of data migrated in Step S1108 to the variable "amount of migrated data". Thereafter, the reallocation program 1212 advances the processing to Step S1112.

Alternatively, in a case where an unallocated physical page 271 does not exist in the reallocation-destination tier (Step S1107: NO), the reallocation program 1212 determines whether or not there exists in the reallocation-destination tier a physical page 271 (hereinafter referred to as "interchangeable area") capable of interchanging data with the physical page 271 allocated to the target virtual segment (Step S1109).

In a case where an interchangeable area exists (Step S1109: YES), the reallocation program 1212 instructs the storage apparatus 2, which provides the target virtual volume, to interchange data between the segment 271 allocated to the target virtual segment and the interchangeable area (Step S1110). The storage apparatus 2, which receives this instruction, for example, interchanges the data by performing the following processing. The cache memory area in the following processing may be an unallocated physical page 271 of the storage apparatus 2. The target virtual segment will be written as "virtual segment 1" here, and the physical page 271 allocated to the target virtual segment will be written as "physical page 1". In addition, the virtual segment to which the interchangeable area is allocated will be written as "virtual segment 2", and the interchangeable area will be written as "physical page 2".

Process 1: The storage apparatus 2 writes data in the physical page 1 to a cache memory area.

Process 2: The storage apparatus 2 writes data in the physical page 2 to the cache memory area.

Process 3: The storage apparatus 2 writes the data of the physical page 1 from the cache memory area to the physical page 2.

Process 4: The storage apparatus 2 writes the data of the physical page 2 from the cache memory area to the physical page 1.

Process 5: The storage apparatus 2 stores the identifier of the physical page 2 in the physical page ID 2254 corresponding to the virtual segment 1 in the ST-side virtual volume management information 225.

Process 6: The storage apparatus 2 stores the identifier of the physical page 1 in the physical page ID 2254 corresponding to the virtual segment 2 in the ST-side virtual volume management information 225.

Furthermore, the same data as that of the ST-side virtual volume management information 225 is also updated in the management-side virtual volume management information 128.

The reallocation program 1212 adds the amount of data interchanged in Step S1110 to the variable "amount of migrated data". Thereafter, the reallocation program 1212 advances the processing to Step S1112.

Alternatively, in a case where an interchangeable area does not exist (Step S1109: NO), the reallocation program 1212 instructs the storage apparatus 2, which provides the target virtual volume, to migrate the data of the target virtual segment to an unallocated physical page 271 (hereinafter referred to as "similar-performance free area") in a tier 2651 having performance most closely approximating that of the reallocation-destination tier, and to change the allocation source of the target virtual segment to the relevant similar-performance free area (Step S1111). The storage apparatus 2, which receives this instruction, migrates the data of the target virtual segment to the similar-performance free area. Then, this instruction-receiving storage apparatus 2 changes the allocation source of the target virtual segment to the similar-performance free area to which the data has been migrated by changing the value of the physical page ID 2254 corresponding to the target virtual segment in the ST-side virtual volume management information 225 to the identifier of the similar-performance free area to which the data has been migrated. In addition, this instruction-receiving storage apparatus 2, in the ST-side physical page management information 223, changes the allocation status 2234 of the physical page 271 allocated up until then to the target virtual segment to "unallocated", and changes the allocation status 2234 of the physical page 271 allocated anew to the target virtual segment to "allocated". The management-side virtual volume management information 128 and the management-side physical page management information 126 are also updated to the same data as the ST-side virtual volume management information 225 and the ST-side physical page management information 223.

The reallocation program 1212 adds the amount of data migrated in Step S1111 to the variable "amount of migrated data". Thereafter, the reallocation program 1212 advances the processing to Step S1112.

In Step S1112, the reallocation program 1212 determines whether or not an end-program instruction has been received (Step S1112).

In a case where an end-program instruction has been received (Step S1112: YES), the reallocation program 1212 ends the reallocation process.

Alternatively, in a case where an end-program instruction has not been received (Step S1112: NO), the reallocation program 1212 continues the processing of Steps S1105 through S1113.

The reallocation program 1212, after ending the execution of the processing of Steps S1105 through S1113 for all the virtual segments 272 in the target virtual volume, reflects the actual value of the reallocation processing in the inter-tier page migration execution history information 133 (Step S1114). Specifically, the reallocation program 1212 adds the time required for reallocation processing to the total value of execution time periods 1322, and adds the total value of the amount of data migrated in accordance with the reallocation processing, that is, the value of the variable "amount of migrated data" to the total value of migration data amounts 1323. The time required for reallocation processing, for example, is obtained by subtracting the reallocation process start date/time stored in Step S1104 from the reallocation process completion date/time (the current date/time). Thereafter, the reallocation program 1212 ends the reallocation process.

According to the example 1, the management computer 1 identifies an affected migration prior to either stopping the storage apparatus 2 or blocking the storage area, presents the administrator with information related to the identified affected migration, receives an action change with respect to the identified affected migration, and suspends the affected migration, which is regarded as the suspend target.

The management computer 1, when suspending the affected migration (an affected user-specified migration and an affected inter-tier page migration), migrates data, which is in an area (either the migration-source volume or physical page 271 (affected physical page)), which will become inaccessible in a case where either the storage apparatus 2 is stopped or the storage area is blocked, to an area accessible by the host 3 (either a free volume or physical page 271) subsequent to either stopping the storage apparatus 2 or blocking the storage area. In accordance with this, the administrator no longer needs to identify an area, which will become inaccessible subsequent to suspending the affected migration, and perform a data migration, lessening the burden on the administrator.

According to this example, the same effects can be achieved from the aspect of being able to lessen the burden on the administrator even in the case of an in-pool page migration in a pool in which affected migrations are not hierarchized.

Example 2

In an example 2, in addition to the post-suspend migration policy change, an action change is also possible as a setting change with respect to an affected inter-tier page migration. As actions with respect to an affected inter-tier page migration, there is "suspend", which suspends the affected inter-tier page migration, and "degenerate and resume", which resumes the affected inter-tier page migration by avoiding the affected physical page, that is, by using a physical page 271 in the pool 265, which is not an affected physical page.

The configuration of the computer system related to the example 2 is substantially the same as the configuration of the computer system related to the example 1 with the exception of the management-side pool management information 129 stored in the management computer 1.

Management-side pool management information related to the example 2 will be explained hereinbelow.

The management-side pool management information 129 related to the example 2 comprises the information items change mode 1291 and inaccessible pool-configured volume 1292 in addition to the respective information items comprising the management-side pool management information 129 related to the example 1. In a case where an inter-tier page migration to be performed in the pool 265 has been identified as an affected inter-tier page migration, data showing an action with respect to this migration, that is, either "suspend" or "degenerate and resume", is stored in the change mode 1291. From among the logical volumes 264 comprising the pool 265, the identifier of the logical volume 264, which is affected by either the stopping of the storage apparatus 2 or the blocking of the storage area, is stored in the inaccessible pool-configured volume 1292. Here, the logical volume 264, which is affected by either the stopping of the storage apparatus 2 or the blocking of the storage area refers to either a logical volume 264, which exists in the stop-target storage apparatus 2, or a logical volume 264, which is related to the block-target RAID group 262. For example, the PM change instruction program 1233 identifies a logical volume 264, which is affected by either the stopping of the storage apparatus 2 or the blocking of the storage area from among the logical volumes 264 comprising the pool 265, and stores the identifier of this identified logical volume 264 in the inaccessible pool-configured volume 1292.

The operation of the management computer 1 related to the example 2 will be explained below with respect to the differences with the example 1. Otherwise, the operation of the storage apparatus 2 related to the example 2 is substantially the same as the operation of the storage apparatus 2 related to the example 1.

Figure 31:
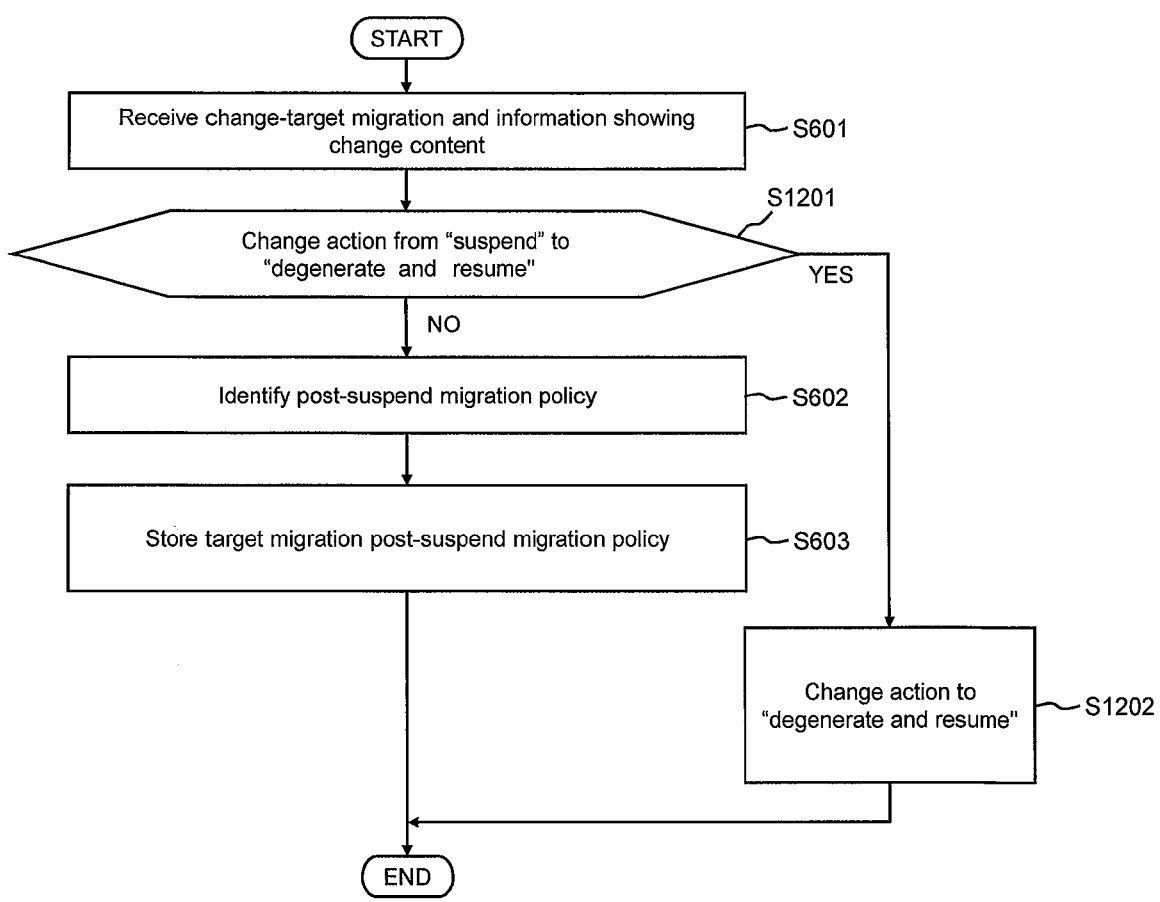
FIG. 31 is a flowchart of an inter-tier page migration change instruction process related to an example 2.

FIG. 31 is a flowchart of an inter-tier page migration change instruction process related to the example 2.

In this drawing, the same reference signs are assigned to processes, which are substantially the same as those of the inter-tier page migration change instruction process (FIG. 24) related to the example 1.

At the start of an inter-tier page migration change instruction process, the PM change instruction program 1233 receives a parameter, which comprises the identifier of an affected inter-tier page migration targeted for a setting change (hereinafter referred to as "target affected PM" in the explanation of FIG. 31) and information showing the contents of a setting change inputted by the administrator in the inter-tier page migration action change screen 54 (Step S601).

The inter-tier page migration action change screen 54 related to the example 2 comprises an area for receiving a specification as to whether the action with respect to the affected inter-tier page migration is "suspend" or "degenerate and resume" in addition to the area 541 for receiving a post-suspend migration policy specification for the affected inter-tier page migration. Therefore, the information showing the contents of the setting change in Step S1201 comprises information showing the post-suspend migration policy of the target affected PM, and data showing the action with respect to the target affected PM.

The PM change instruction program 1233 determines whether or not the setting change with respect to the target affected PM is an action change from "suspend" to "degenerate and resume" (Step S1201).

In a case where the setting change with respect to the target affected PM is an action change from "suspend" to "degenerate and resume" (Step S1201: YES), the PM change instruction program 1233 changes the action with respect to the target affected PM to "degenerate and resume" (Step S1202). Specifically, the PM change instruction program 1233 stores data showing "degenerate and resume" in the change mode 1291 of the management-side pool management information 129 for the pool 265 in which the target affected PM is performed. Thereafter, the PM change instruction program 1233 ends the inter-tier page migration change instruction process.

Alternatively, in a case where the setting change with respect to the target affected PM is not an action change from "suspend" to "degenerate and resume" (Step S1201: NO), the PM change instruction program 1233 performs the same processing as Steps S602 and S603 of FIG. 24. Thereafter, the PM change instruction program 1233 ends the inter-tier page migration change instruction process.

In the example 2, the stop program 123 does not perform the inter-tier page migration suspend instruction process shown in FIG. 27 for an affected inter-tier page migration regarded as a resumption target, that is, an affected inter-tier page migration for which the action is configured to "degenerate and resume", and allows this affected inter-tier page migration to remain valid as-is. That is, the affected inter-tier page migration regarded as being targeted for resumption (reallocation process) is performed on either a regular or irregular basis. The suspend program 123 may also performs the processing of Steps S804 through S818 in the inter-tier page migration suspend instruction process with respect to the affected inter-tier page migration regarded to be targeted for resumption, and may migrate the data of the affected virtual segment from the affected physical page to the physical page 271, which is not an affected physical page, that is, to a physical page 271, which is also accessible subsequent to either stopping the storage apparatus 2 or blocking the storage area.

The reallocation process related to the example 2 will be explained hereinbelow with respect to the differences with the example 1 by referring to the reallocation process shown in FIG. 30 related to the example 1.

A virtual volume (target virtual volume), which is the target of the reallocation process related to the example 2, is a virtual volume 266 associated with a pool 265 in which the inter-tier page migration is valid, and, in addition, the action with respect to the inter-tier page migration is configured to "degenerate and resume", that is, a pool 265 for which "ON" is configured in the inter-tier page migration 2264 of the management-side pool management information 129, and, in addition, "degenerate and resume" is configured in the change mode 1291.

In the example 2, the reallocation program 1212 in Step S1106 determines whether or not the tier 2651 (current tier) in which the physical page 271 allocated to the target virtual segment is not an affected physical page, and, in addition, to which the physical page 271 allocated to the target virtual segment belongs, matches the tier 2651 (reallocation-destination tier) shown by the reallocation-destination determination result 1287 corresponding to the target virtual segment in the management-side virtual volume management information 128.

In the example 2, the reallocation program 1212 in Step S1107 references the management-side physical page management information 126, and determines whether or not there exists an unallocated physical page 271, which belongs to the reallocation-destination tier and which is not an affected physical page (hereinafter referred to as "reallocation-destination accessible area").

In the example 2, the reallocation program 1212 in Step S1108 instructs the storage apparatus 2, which provides the target virtual volume, to migrate data of the target virtual segment to the reallocation-destination accessible area, and to change the allocation source of the target virtual segment to the relevant reallocation-destination accessible area. The reallocation program 1212 adds the amount of data migrated in Step S1108 to the variable "amount of migrated data".

In the example 2, the reallocation program 1212 in Step S1109 determines whether or not a physical page 271, which is capable of interchanging data with the physical page 271 allocated to the target virtual segment and which is not an affected physical page (hereinafter referred to as "accessible interchange area"), exists in the reallocation-destination tier.

In the example 2, the reallocation program 1212 in Step S1110 instructs the storage apparatus 2, which provides the target virtual volume, to perform a data interchange between the physical page 271 allocated to the target virtual segment and the accessible interchange area. The reallocation program 1212 also adds the amount of data interchanged in Step S1110 to the variable "amount of migrated data".

In the example 2, the reallocation program 1212 in Step S1111 instructs the storage apparatus 2, which provides the target virtual volume, to migrate data of the target virtual segment to an unallocated physical page 271, which belongs to a tier 2651 most closely approximating the performance of the reallocation-destination tier and which is not an affected physical page (hereinafter referred to as "similar-performance accessible area"), and to change the allocation source of the target virtual segment to the relevant similar-performance accessible area. The reallocation program 1212 also adds the amount of data migrated in Step S1111 to the variable "amount of migrated data".

In the reallocation process related to the example 2, the determination of Step S1112 is not performed.

According to the example 2, it is possible to resume an affected inter-tier page migration by using a physical page 271, which is accessible physical page 271 from the host 3 (not using an affected physical page) subsequent to either the storage apparatus 2 being stopped or the storage area being blocked. This makes it possible to either stop the storage apparatus 2 or block the storage area without an administrator setting or selection related to how to suspend the affected inter-tier page migration. Since an inter-tier page migration can be resumed subsequent to the storage apparatus 2 having been stopped or the storage area having been blocked, the data of the virtual segment 272 can be allocated to an accessible physical page 271 in an appropriate storage tier 2651 based on the host 3 access frequency with respect to this virtual segment 272 even after the storage apparatus 2 has been stopped or the storage area has been blocked. Performance-wise, this makes it possible to enhance the utilization efficiency of a storage area in the storage apparatus 2.

In addition, according to the example 2, for example, in a pool 265 comprising a high-performance logical volume 264 of the internal storage apparatus and a low-performance logical volume 264 of an external storage apparatus, it is necessary to resume an affected inter-tier page migration in order to satisfy the host 3 application performance condition (SLA/SLO), and, in addition, in a case where the affect on the operation of the host 3 application in accordance with stopping the external storage apparatus for maintenance purposes or the like is trifling due to the fact that the capacity of the logical volume 264 allocated from the external storage apparatus is small, it is possible to stop the external storage apparatus without suspending the affected inter-tier page migration, and, in addition, without the administrator having to take the trouble to migrate data, which had been migrated to a physical page 271 in the stop-target storage apparatus 2, to an accessible physical page 271.

Example 3

In an example 3, the administrator is presented with information showing the affect on the host 3 from the standpoint of performance in a case where an affected inter-tier page migration was suspended, and information showing the affect from the standpoint of the capacity of the pool 265 (hereinafter referred to as "affected pool"), which is performing the relevant affected inter-tier page migration, with respect to the relevant affected inter-tier page migration identified using the affected migration identification process shown in FIG. 21 of the example 1. As the information showing the affect from the standpoint of performance here, for example, there is a by-tier allocation rate computed for each host 3, which is accessing the virtual volume 266 associated with the affected pool. The by-tier allocation rate refers to the percentage by tier 2651 of physical pages 271 (for example, the number of physical pages 271 and the capacity of the physical pages 271) allocated to the virtual volume 266 accessed by a target host 3. In this example, the by-tier allocation rate is a percentage of the total capacity by tier 2651 of the physical pages 271 allocated to the virtual volume 266 accessed by the target host 3 with respect to the total capacity of all the physical pages 271 allocated to the virtual volume 266 accessed by the target host 3. Also, as the information showing the affect from the standpoint of the capacity, for example, there is pool usage, which is the usage of the physical page 271 in the pool 265.

The configuration of the computer system related to the example 3 is substantially the same as the configuration of the computer system related to the example 1 with the exception of the suspend program 123, the management-side physical page management information 126, and the management-side virtual volume management information 128 stored by the management computer 1.

The suspend program 123 related to the example 3 executes a tier allocation status prediction process, which will be explained further below, performs a simulation with respect to how data stored in an affected physical page is to be migrated in a case where an affected inter-tier page migration has been suspended, and computes the by-tier allocation rate based on the result of the simulation.

The suspend program 123 related to the example 3 further comprises a pool usage computation program 1237. The pool usage computation program 1237 computes for an affected pool a pool usage (hereinafter referred to as "pool usage prior to either stop or block") prior to either the storage apparatus 2 being stopped or the storage area being blocked, and the pool usage (hereinafter referred to as "pool usage after either stop or block") after either the storage apparatus 2 has been stopped or the storage area has been blocked.

Management-side physical page management information related to the example 3 will be explained hereinbelow.

The management-side physical page management information 126 related to the example 3 comprises the information item allocation status simulation 1262 in addition to the respective information items in the management-side physical page management information 126 related to the example 1. The allocation status simulation 1262 is used for storing a simulation result related to the allocation status of a physical page 271 in the tier allocation status prediction process.

The management-side virtual volume management information related to the example 3 will be explained hereinbelow.

The management-side virtual volume management information 128 related to the example 3 comprises the information item reallocation-destination simulation determination result 1288 in addition to the respective information items in the management-side virtual volume management information 128 related to the example 1. The reallocation-destination simulation determination result 1288 is used for storing a simulation result related to a migration-destination tier 2651 for data in a virtual segment 272 to which an affected physical page is allocated in the tier allocation status prediction process.

The operation of the management computer 1 related to the example 3 will be explained hereinbelow with respect to the differences with the example 1. Otherwise, the operation of the storage apparatus 2 related to the example 3 is substantially the same as the operation of the storage apparatus 2 related to the example 1.

Figure 32:
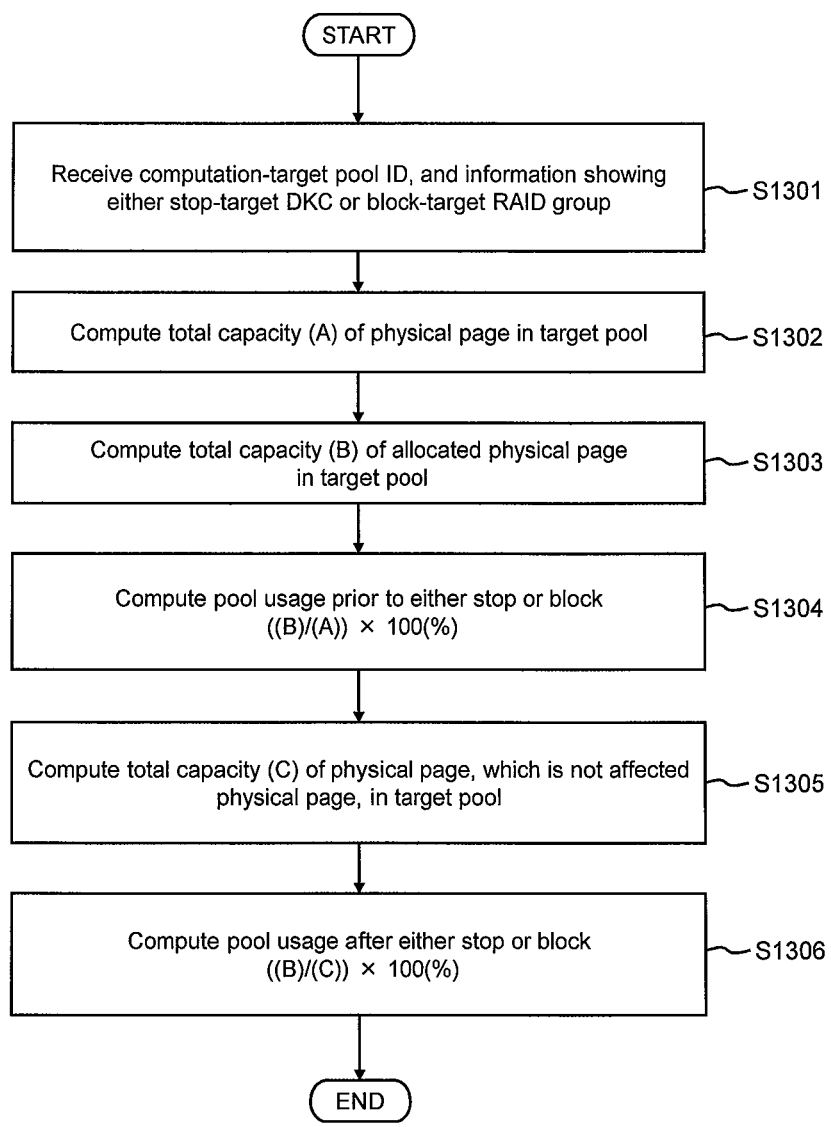
FIG. 32 is a flowchart of a pool usage computation process related to an example 3.

FIG. 32 is a flowchart of a pool usage computation process related to the example 3.

The pool usage computation program 1237, at the start of the execution of the pool usage computation process, receives a parameter, which comprises the identifier of a pool 265 (hereinafter referred to as "computation-target pool"), which is the target of the computation process, and information showing either a stop-target storage apparatus 2 or a block-target RAID group 262 specified by the administrator (Step S1301). Normally, the computation-target pool is the affected pool.

Next, the pool usage computation program 1237 computes the total capacity (A) of a physical page 271 in the computation-target pool (Step S1302).

Next, the pool usage computation program 1237 computes the total capacity (B) of a physical page 271 in the computation-target pool, which has been allocated to a virtual volume 266 (Step S1303).

Thereafter, the pool usage computation program 1237 computes the pool usage prior to either stop or block for the computation-target pool (Step S1304). The pool usage prior to either stop or block for the computation-target pool, for example, is computed in accordance with the formula "((B)/(A))×100 (unit: %)".

Thereafter, the pool usage computation program 1237 computes the total capacity (C) of a physical page 271, which is not an affected physical page, in the computation-target pool (Step S1305).

Thereafter, the pool usage computation program 1237 computes the pool usage after either stop or block for the computation-target pool (Step S1306). The pool usage after either stop or block for the computation-target pool, for example, is computed in accordance with the formula "((B)/(C))×100 (unit: %)". Thereafter, the pool usage computation program 1237 ends the pool usage computation process.

The pool usage (pool usage prior to either stop or block and pool usage after either stop or block) computed in accordance with the pool usage computation process, for example, is displayed in the migration suspend screen 52 (FIG. 20). For example, the management computer 1 performs the pool usage computation process for each affected inter-tier page migration, computes the pool usage for the pool 265 in which each affected inter-tier page migration is performed, and displays the computed pool usage in the area 5222 of the migration suspend screen 52.

Figure 33:
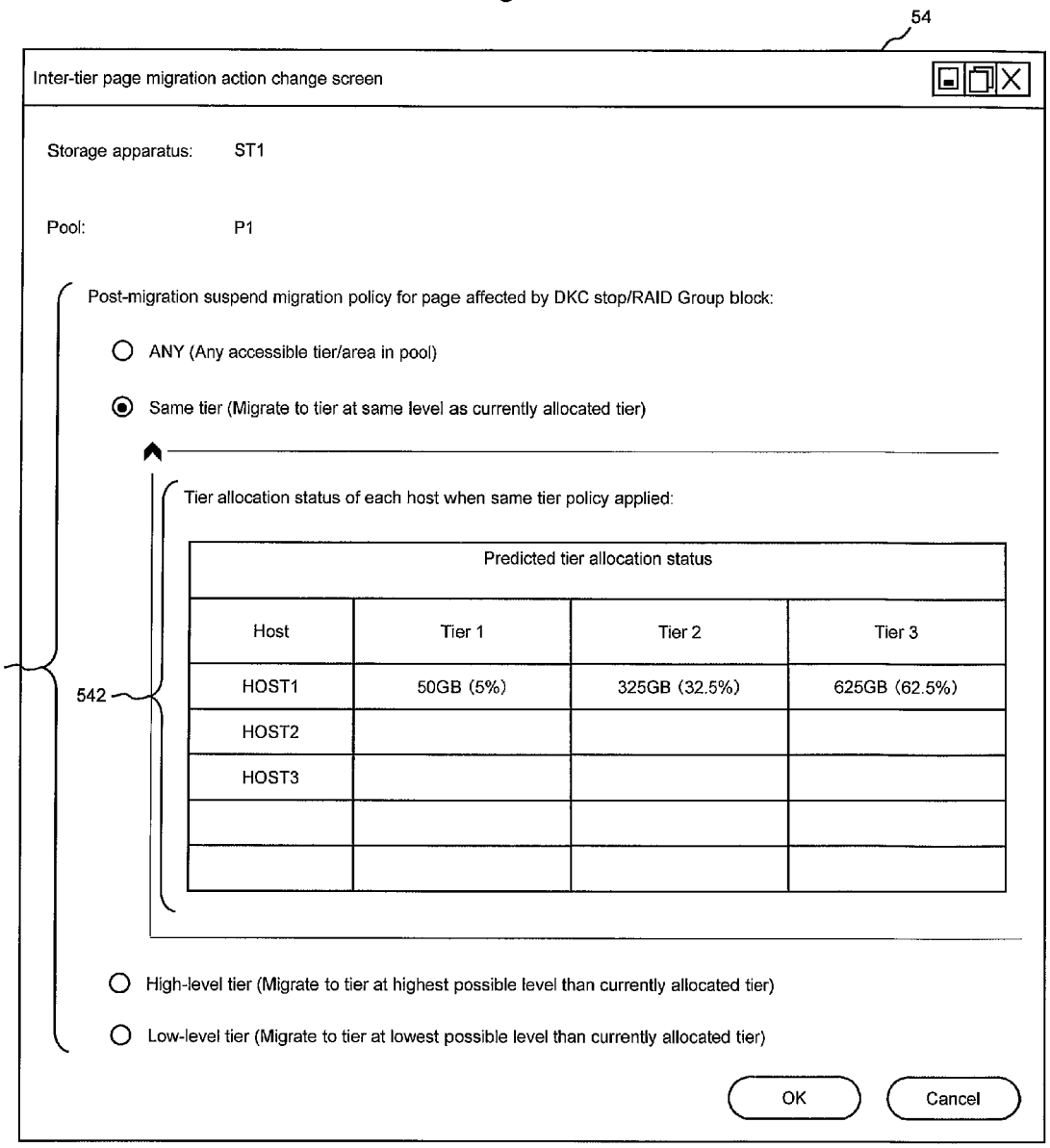
FIG. 33 is a block diagram of an example of an inter-tier page migration action change screen related to the example 3.

FIG. 33 is a block diagram of an example of an inter-tier page migration action change screen related to the example 3.

An area 542 for displaying the by-tier allocation rate computed for each host 3, which accesses the virtual volume 266 associated with the affected pool, is included in the area 541 of the inter-tier page migration change screen 54 related to the example 3.

When a post-suspend migration policy for an affected inter-tier page migration is selected in the inter-tier page migration change screen 54 related to the example 3, the storage program 123 executes the tier allocation status prediction process, and computes the by-tier allocation rate in a case where data stored in an affected segment has been migrated based on the selected migration policy. Then, the suspend program 123 displays the computer by-tier allocation rate in the area 542.

In the example of the drawing, the by-tier allocation rate for tier 1, which is related to host "HOST 1", is 5%, the by-tier allocation rate for tier 2 is 32.5%, and the by-tier allocation rate for tier 3 is 62.5%. The by-tier allocation rate for tier 1 is computed in accordance with the formula "(Total capacity of physical page 271 belonging to tier 1, which is allocated to virtual volume 266 accessed by Host "HOST 1" (50 GB))/ (total capacity of all physical pages 271 allocated to virtual volume 266 accessed by "HOST 1" (1000 GB))×100". The by-tier allocation rate for tier 2 is computed in accordance with the formula "(Total capacity of physical page 271 belonging to tier 2, which is allocated to virtual volume 266 accessed by Host "HOST 1" (325 GB))/(total capacity of all physical pages 271 allocated to virtual volume 266 accessed by "HOST 1" (1000 GB))×100". The by-tier allocation rate for tier 3 is computed in accordance with the formula "(Total capacity of physical page 271 belonging to tier 3, which is allocated to virtual volume 266 accessed by Host "HOST 1" (625 GB))/(total capacity of all physical pages 271 allocated to virtual volume 266 accessed by "HOST 1" (1000 GB))× 100".

Thus, the displaying of the by-tier allocation rate makes it possible for the administrator, for example, to determine whether or not enough high-performance storage tiers (SSD and the like) are allocated with respect to a host 3 application for which there exists a performance request (SLO).

A tier allocation status prediction process related to the example 3 will be explained hereinbelow.

First, the suspend program 123 stores the identifier of the tier 2651 to which the physical page 271 currently allocated to the corresponding virtual segment 272 belongs in the reallocation-destination simulation determination result 1288 for each virtual segment 272 in the management-side virtual volume management information 128 (Step S2601).

Next, the suspend program 123 stores the same value as that of the allocation status 2234 of the corresponding physical page 271 in the allocation status simulation 1262 for each physical page 271 in the management-side physical page management information 126 (Step S2602).

The suspend program 123 executes the processing of Steps S2603 through S2620 for each affected inter-tier page migration regarded as a suspend target, that is, for each affected inter-tier page migration for which the action is configured to "suspend". In the explanation of the tier allocation status prediction process hereinbelow, the processing-target affected inter-tier page migration will be called "target affected PM".

The suspend program 123, for example, references data showing the migration policy stored in the memory 12, and identifies the post-suspend migration policy of the target affected PM (Step S2604).

Next, the suspend program 123 references the management-side logical volume management information 127, the management-side virtual volume management information 128, and the management-side pool management information 129, and identifies the virtual segment 272 (affected virtual segment) to which is allocated an affected physical page in the pool 265 (target affected pool), which is performing the target affected PM (Step S2605).

The suspend program 123 executes the processing of Steps S2606 through S2619 for each affected virtual segment identified in Step S2605. Hereinafter, the processing-target affected virtual segment will be called the "target affected virtual segment".

The suspend program 123 determines whether or not the post-suspend migration policy of the target affected PM is policy (b), that is, the policy for migrating data as much as possible to an accessible area of a tier 2651 at the same level as the tier 2651 allocated when the inter-tier page migration stops (Step S2607).

In a case where the post-stop migration policy of the target affected PM is policy (b) (Step S2607: YES), the stop program 123 determines whether or not there exists an unallocated physical page 271 (same tier free area), which belongs to the same tier 2651 as the affected physical page allocated to the target affected virtual segment and which is not an affected physical page (Step S2610). In the tier allocation status prediction process, a determination as to whether or not a physical page 271 is allocated is performed based on the value of the allocation status simulation 1262 in the management-side physical page management information 126.

In a case where a same tier free area exists (Step S2610: YES), the suspend program 123 selects one same tier free area, and changes the allocation status simulation 1262 of the selected same tier free area to "allocated" for the management-side physical page management information 126 (Step S2611).

In a case where the post-suspend migration policy of the target affected PM is not policy (b) (Step S2607: NO), the suspend program 123 determines whether or not the post-suspend migration policy of the target affected PM is policy (c), that is, the policy for migrating data to an accessible area of a tier 2651 at the highest possible level than the tier 2651 allocated when the inter-tier page migration suspends (Step S2608).

In a case where the post-suspend migration policy of the target affected PM is policy (c) (Step S2608: YES), the suspend program 123 determines whether or not there exists an unallocated physical page 271 (higher-level tier free area), which belongs to a tier 2651 of a higher level than the tier 2651 to which the affected physical page allocated to the target affected virtual segment belongs and which is not the affected physical page (Step S2612).

In a case where a higher-level tier free area exists (Step S2612: YES), the suspend program 123 selects one higher-level tier free area, and changes the allocation status simulation 1262 of the selected higher-level tier free area to "allocated" for the management-side physical page management information 126. The suspend program 123 stores the identifier of the tier 2651 to which the selected higher-level tier free area belongs in the reallocation-destination simulation determination result 1288 of the target affected virtual segment in the management-side virtual volume management information 128 (Step S2613).

In a case where the post-suspend migration policy of the target affected PM is not policy (c) (Step S2608: NO), the suspend program 123 determines whether or not the post-suspend migration policy of the target affected PM is policy (d), that is, the policy for migrating data to an accessible area of a tier 2651 at the lowest possible level than the tier 2651 allocated when the inter-tier page migration suspends (Step S2609).

In a case where the post-suspend migration policy of the target affected PM is policy (d) (Step S2609: YES), the suspend program 123 determines whether or not there exists an unallocated physical page 271 (lower-level tier free area), which belongs to a tier 2651 of a lower level than the tier 2651 to which the affected physical page allocated to the target affected virtual segment belongs and which is not the affected physical page (Step S2614).

In a case where a lower-level tier free area exists (Step S2614: YES), the suspend program 123 selects one lower-level tier free area, and changes the allocation status simulation 1262 of the selected lower-level tier free area to "allocated" for the management-side physical page management information 126. The suspend program 123 stores the identifier of the tier 2651 to which the selected lower-level tier free area belongs in the reallocation-destination simulation determination result 1288 of the target affected virtual segment in the management-side virtual volume management information 128 (Step S2615).

In a case where the post-suspend migration policy of the target affected PM is not policy (d) (Step S2609: NO), a case where a same tier free area does not exist (Step S2610: NO), a case where a higher-level tier free area does not exist (Step S2612: NO), or a case where a lower-level tier free area does not exist (Step S2614: NO), the suspend program 123 determines whether or not an unallocated physical page 271, which is not an affected physical page (free accessible area) exists in the target affected pool (Step S2616).

In a case where a free accessible area exists (Step S2616: YES), the suspend program 123 selects one free accessible area, and changes the allocation status simulation 1262 of the selected free accessible area to "allocated" for the management-side physical page management information 126. The suspend program 123 stores the identifier of the tier 2651 to which the selected free accessible area belongs in the reallocation-destination simulation determination result 1288 of the target affected virtual segment in the management-side virtual volume management information 128 (Step S2617).

Alternatively, in a case where a free accessible area does not exist (Step S2616: NO), the suspend program 123 notifies the administrator to the effect that a free accessible area does not exist in the target affected pool (Step S2618).

The suspend program 123, after ending the execution of the processing of Steps S2606 through S2619 for each affected virtual segment identified in Step S2605, and after ending the execution of the processing of Steps S2603 through S2620 for each affected inter-tier page migration regarded as a suspend target, references the host management information 120 and identifies the host 3, which accesses the virtual volume 266 associated with the target pool (Step S2621).

The suspend program 123 executes the processing of Steps S2622 through S2624 for each host 3 identified in Step S2621. Hereinafter, the processing-target host 3 will be called "target host".

The suspend program 123 computes the by-tier allocation rate for the target host (Step S2623). Specifically, the suspend program 123 references the virtual volume LBA range 1284 of the management-side virtual volume management information 128, and computes the total capacity (hereinafter referred to as "total allocated capacity") of all the physical pages 271 allocated to the virtual volume 266 accessed by the target host. The suspend program 123 references the virtual volume LBA range 1284 and the reallocation-destination simulation determination result 1288 of the management-side virtual volume management information 128, and computes the total capacity (hereinafter referred to as "by-tier allocated capacity") of a physical page 271, which is allocated to the virtual volume 266 accessed by the target host and which belongs to the relevant tier 2651, for each tier 2651 in the affected pool. For example, the by-tier allocated capacity for tier 1 is computed by totaling the capacity of the physical page 271 for which "Tier 1" is configured in the reallocation-destination simulation determination result 1288 in the management-side virtual volume management information 128. Thereafter, the suspend program 123 computes the percentage of the by-tier allocated capacity relative to the total allocated capacity for each tier 2651 in the affected pool. The percentage of the by-tier allocated capacity relative to the total allocated capacity computed for each tier 2651 constitutes the by-tier allocation rate for the target host.

After ending the execution of the processing of Steps S2622 through S2624 for each host 3 identified in Step S2621, the suspend program 123 ends the tier allocation status prediction process.

According to the example 3, the administrator is presented with information showing the affect on performance with respect to the host 3 when an affected inter-tier page migration is suspended, and information showing the affect on the capacity of the affected pool. This makes it possible for the administrator to check prior to stopping the storage apparatus 2 or blocking the storage area the extent to which the affected pool will be affected capacity-wise when either the storage apparatus 2 is stopped or the storage area is blocked, and to determined whether or not there is a danger of the capacity being exhausted. Then, in a case where there is a danger of the capacity being exhausted, the administrator can plan in advance for the expansion of the capacity of the affected pool.

In addition, since the administrator is able to check beforehand the by-tier allocation rate in a case where data stored in an affected physical page is migrated based on a migration policy for each migration policy of the affected inter-tier page migration, the administrator is able to examine beforehand which policy is appropriate to use as the post-suspend migration policy of the affected inter-tier page migration.

Thus, the administrator is able to check the affect on the performance of the host 3 and the affect on the capacity of the affected pool prior to suspending the affected inter-tier page migration, to examine beforehand a plan for enabling the affected inter-tier page migration to be suspended appropriately, and to formulate a plan.

It goes without saying that the present invention is not limited to the examples explained hereinabove, and that various changes can be made without departing from the gist thereof. For example, the host is not limited to a physical computer, and may be a virtual computer.

REFERENCE SIGNS LIST

1 Management computer
2 Storage apparatus
3 Host
41 SAN
42 LAN

The invention claimed is:

1. A management system for managing a computer system comprising: multiple storage apparatuses, which, upon receiving a write request for a virtual volume formed of multiple virtual segments, allocate a page to a write-destination virtual segment from a pool formed of multiple pages of multiple logical volumes and write write-target data to the allocated page; and a host computer, which sends a data write request to the virtual volume, the management system comprising:
a storage device; and
a control device coupled to the storage device,
wherein the storage device is configured to store:
logical volume management information for managing, with respect to a logical volume in the computer system, a corresponding relationship between a storage apparatus in which the logical volume resides and a page forming the logical volume; and virtual volume management information for managing, with respect to the virtual volume in the computer system, the corresponding relationship between a virtual segment in the virtual volume and a page allocated to the virtual segment, wherein the control device is configured to:

receive a selection of either a determination-target storage apparatus, which is regarded as a determination target from among the multiple storage apparatuses, or a first storage area, which is regarded as a determination target of a storage area formed of a page within a storage apparatus corresponding to the page;

identify from among either one or multiple page migrations, which are migrations of data between pages, a first page migration, which is affected by either the determination-target storage apparatus being stopped or the first storage area being blocked, based on the logical volume management information and the virtual volume management information; and display information related to the first page migration.

2. A management system according to claim 1, wherein the storage device is further configured to store volume migration management information for managing, with respect to a volume migration, which is the migration of data between the logical volumes, a migration-source logical volume and a migration-destination logical volume of the relevant volume migration, and wherein the control device is configured to:

identify, based on the logical volume management information and the volume migration management information, from among either one or multiple volume migrations a first volume migration, which is affected by either the determination-target storage apparatus being stopped or the first storage area being blocked, and display information related to the first page migration and information related to the first volume migration.

3. A management system according to claim 2, wherein the control device is configured to:

receive an instruction to either set an action for the first volume migration to suspend or to resume, and a specification of a post-change migration-destination logical volume in a case where the action with respect to the first volume migration is set to resume, do not execute the first volume migration in a case where an instruction to set the action with respect to the first volume migration to suspend has been received, and change the migration-destination logical volume of the first volume migration which is being managed in accordance with the volume migration management information to the specified post-change migration-destination logical volume in a case where an instruction to set the action with respect to the first volume migration to resume has been received.

4. A management system according to claim 3, wherein the control device is configured to:

receive a specification of a migration policy, which is a policy in a case where the action with respect to the first volume migration is set to suspend, and which denotes a condition related to a migration destination, and instruct the computer system to migrate data in the migration-source logical volume of the first volume migration to an accessible logical volume after the first volume migration suspends, and wherein the accessible logical volume is a logical volume, which does not belong to the determination-target storage apparatus to be stopped, and is not comprised of physical pages belonging to the first storage area targeted to be blocked, and wherein the accessible logical volume is a logical volume, which conforms to the migration policy, and in a case where a logical volume conforming to the migration policy does not exist, is a different logical volume than the logical volume, which conforms to the specified migration policy.

5. A management system according to claim 2, wherein the control device is configured to:

determine, upon receiving the determination-target storage apparatus selection, with respect to the volume migration performed in the computer system, whether or not either a storage apparatus in which the migration-source logical volume of the relevant volume migration exists, or a storage apparatus in which the migration-destination logical volume of the relevant volume migration exists matches the determination-target storage apparatus, and in a case where the result of the relevant determination is affirmative, identify the relevant volume migration as the first volume migration, and determine, upon receiving the first storage area selection, with respect to the volume migration performed in the computer system, whether or not either the migration-source logical volume of the relevant volume migration exists or the migration-destination logical volume of the relevant volume migration is the logical volume formed of the page forming the first storage area, and in a case where the result of the relevant determination is affirmative, identify the relevant volume migration as the first volume migration, wherein information related to the first volume migration comprises any one or more of information showing a policy related to the migration destination of data in the migration-source logical volume after the first volume migration has suspended, information denoting a new migration-destination logical volume for data in the migration-source logical volume after the first volume migration has suspended, information showing a host computer, which accesses the migration-source volume of the first volume migration, an expected completion date/time of a task for executing the first volume migration, and an importance of the first volume migration, and wherein the importance of the first volume migration is based on the importance of the host computer, which accesses the migration-source volume of the first volume migration.

6. A management system according to claim 1, wherein the pool is a hierarchical pool in which pages are hierarchized in accordance with the page performance, and wherein the control device is configured to:

determine, upon receiving the determination-target storage apparatus selection, with respect to the hierarchical pool for which the page migration is valid, whether or not a logical volume, which is based on the determination-target storage apparatus, is included among the logical volumes forming the relevant hierarchical pool, and in a case where the result of the relevant determination is affirmative, identify a page migration performed in the relevant hierarchical pool as the first page migration, and determine, upon receiving the first storage area selection, with respect to the hierarchical pool for which the page migration is valid, whether or not a logical volume formed of a page forming the first storage area is included among the logical volumes forming the relevant hierarchical pool, and in a case where the result of the relevant determination is affirmative, identify the page migration performed in the relevant hierarchical pool as the first page migration.

7. A management system according to claim 1,
wherein the control device is configured to:
(A) set an execution of the first page migration to invalid;
(B) identify, based on the virtual volume management information, a first virtual segment to which is allocated a first page, which forms the first storage area, and which is either a page included in a logical volume, which forms the pool in which the first page migration is performed and exists in the determination-target storage apparatus, or a page of the logical volume forming the pool in which the first page migration is performed; and
(C) change the storage destination of data of the first virtual segment to an unallocated page, which is not the first page, and which is included in a logical volume forming the pool in which the first page migration is performed.

8. A management system according to claim 7, wherein the control device is configured to decide a page in the logical volume conforming to a migration policy, which shows a condition related to a migration destination as the unallocated page in the (C).

9. A management system according to claim 8,
wherein the control device is configured to:
execute a process for displaying information related to the first page migration,
receive an instruction to set the action for the first page migration to either suspend or resume,
execute the (A), (B), and (C) upon receiving an instruction to set the action for the first page migration to suspend, and
upon receiving an instruction to set the action for the first page migration to resume,
(D) implement control so that the first page is not allocated to a virtual segment forming the virtual volume during the implementation of the first page migration.

10. A management system according to claim 1, wherein information related to the first page migration includes any one or more of:
(a) information showing the host computer, which accesses the virtual volume associated with the pool in which the first page migration is performed;
(b) an expected completion date/time of the first page migration;
(c) an importance of the first page migration;
(d) page usage in the pool in which the first page migration is performed prior to either stopping the determination-target storage apparatus or blocking the first storage area; and
(e) page usage in the pool in which the first page migration is performed after either stopping the determination-target storage apparatus or blocking the first storage area.

11. A management system according to claim 10,
wherein the pool is a hierarchical pool in which pages are hierarchized in accordance with the page performance, and
wherein information related to the first page migration comprises, either instead of or in addition to any one or more of the (a) through the (e), (f) a by-tier percentage of pages of the hierarchical pool allocated to a virtual volume accessed by the relevant host computer with respect to each host computer, which accesses a virtual volume associated with the hierarchical pool in which the first page migration is performed.

12. A management system according to claim 10, wherein the importance of the first page migration is based on the importance of the host computer, which accesses a virtual volume to which is allocated a page from the pool regarding the first page migration.

13. A management system according to claim 1, wherein the control device is configured to display, with respect to the first page migration, information showing an affect on performance with respect to the host computer in a case where the first page migration is suspended, and information showing the affect on a capacity of the pool in which the first page migration is performed.

14. A management method of a computer system comprising: multiple storage apparatuses, which, upon receiving a write request for a virtual volume formed of multiple virtual segments, allocate a page to a write-destination virtual segment from a pool formed of multiple pages of multiple logical volumes and write write-target data to the allocated page; and a host computer, which sends a data write request to the virtual volume,
the management method comprising:
receiving a selection of either a determination-target storage apparatus, which is regarded as a determination target from among the multiple storage apparatuses, or a first storage area, which is regarded as a determination target of a storage area formed of a page within a storage apparatus corresponding to the page;
identifying a first page migration, which is affected in a case where either the determination-target storage apparatus is stopped or the first storage area is blocked, based on logical volume management information for managing, with respect to the logical volume in the computer system, a corresponding relationship between a storage apparatus in which the logical volume resides and a page forming the logical volume, and virtual volume management information for managing, with respect to the virtual volume in the computer system, the corresponding relationship between a virtual segment in the relevant virtual volume and a page allocated to the virtual segment; and
displaying information related to the first page migration.

15. A non-transitory computer-readable storage medium storing a computer program executed by a computer for managing a computer system comprising: multiple storage apparatuses, which, upon receiving a write request for a virtual volume formed of multiple virtual segments, allocate a page to a write-destination virtual segment from a pool formed of multiple pages of multiple logical volumes and write write-target data to the allocated page; and a host computer, which sends a data write request to the virtual volume,
the computer program causing the computer to:
receive a selection of either a determination-target storage apparatus, which is regarded as a determination target from among the multiple storage apparatuses, or a first storage area, which is regarded as a determination target of a storage area formed of a page within a storage apparatus corresponding to the page;
identify a first page migration, which is affected in a case where either the determination-target storage apparatus is stopped or the first storage area is blocked, based on logical volume management information for managing, with respect to the logical volume in the computer system, a corresponding relationship between a storage apparatus in which the logical volume resides and a page forming the logical volume, and virtual volume management information for managing, with respect to the virtual volume in the computer system, the corresponding relationship between a virtual segment in the relevant virtual volume and a page allocated to the virtual segment; and
display information related to the first page migration.

* * * * *